Nov. 24, 1936.   J. W. BRYCE   2,062,119
SUCCESSIVE DISCOUNT ACCOUNTING MACHINE
Filed Oct. 15, 1932    23 Sheets-Sheet 1

James W. Bryce
INVENTOR

BY Cooper, Kerr & Dunham
ATTORNEYS

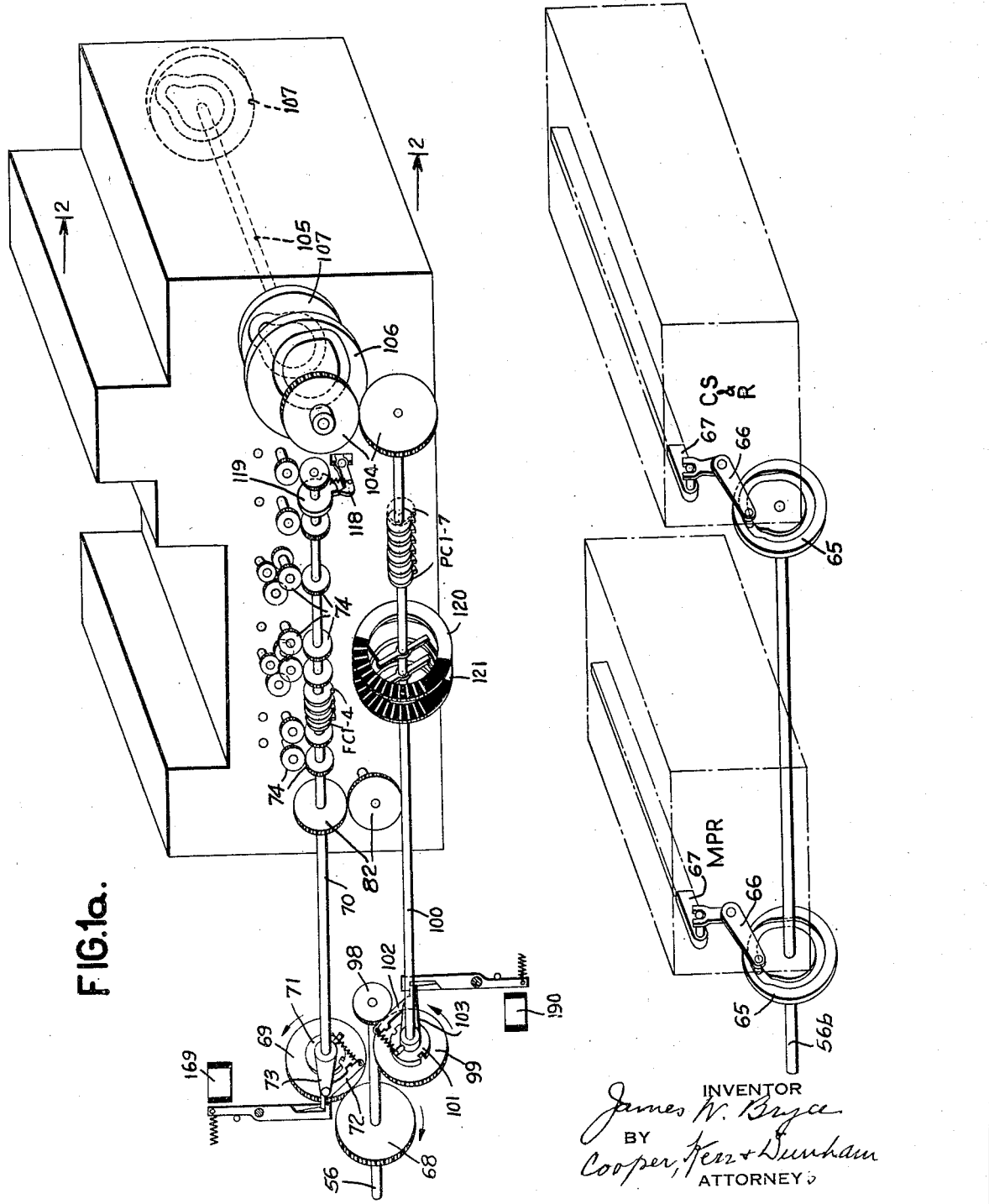

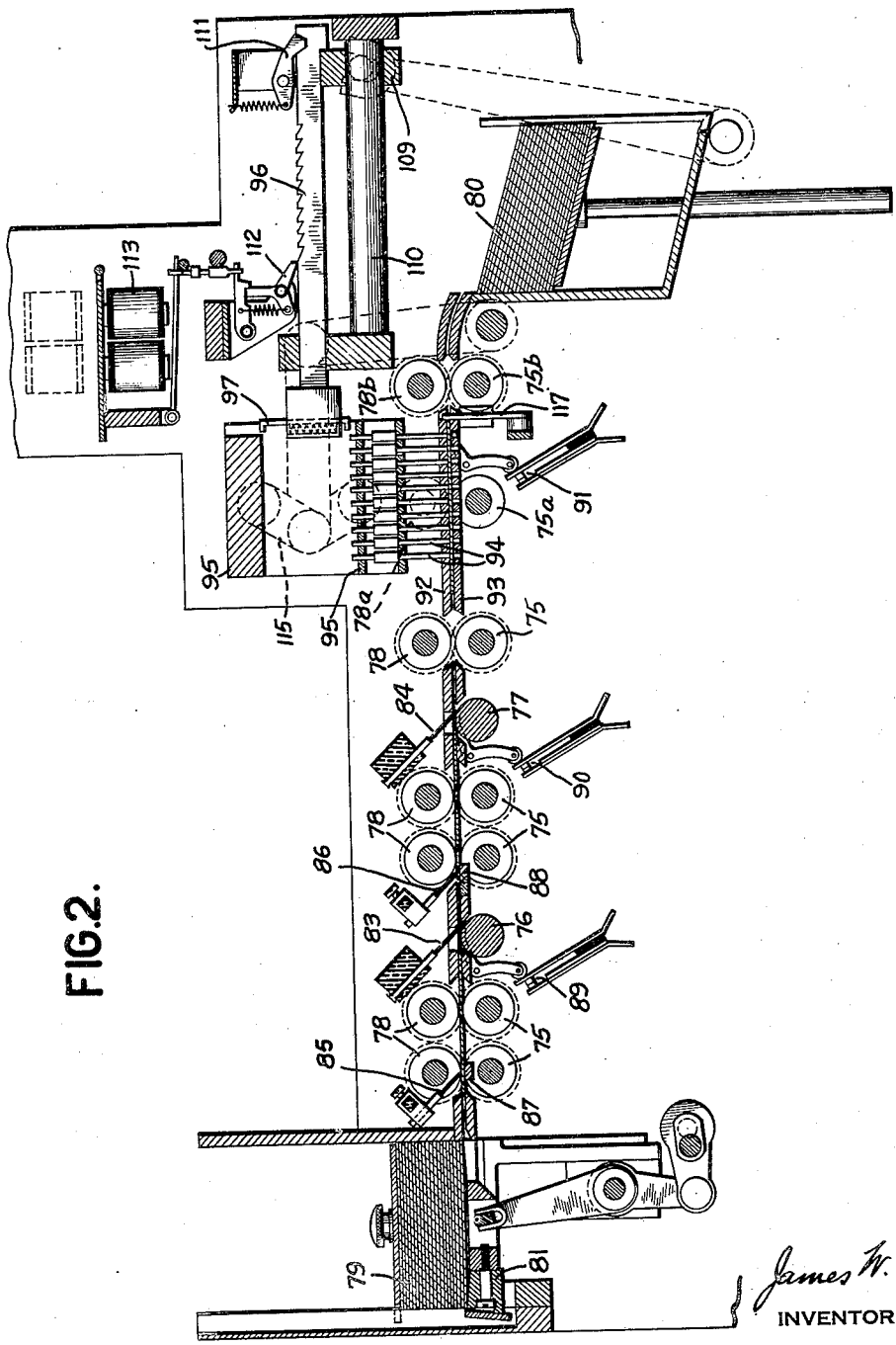

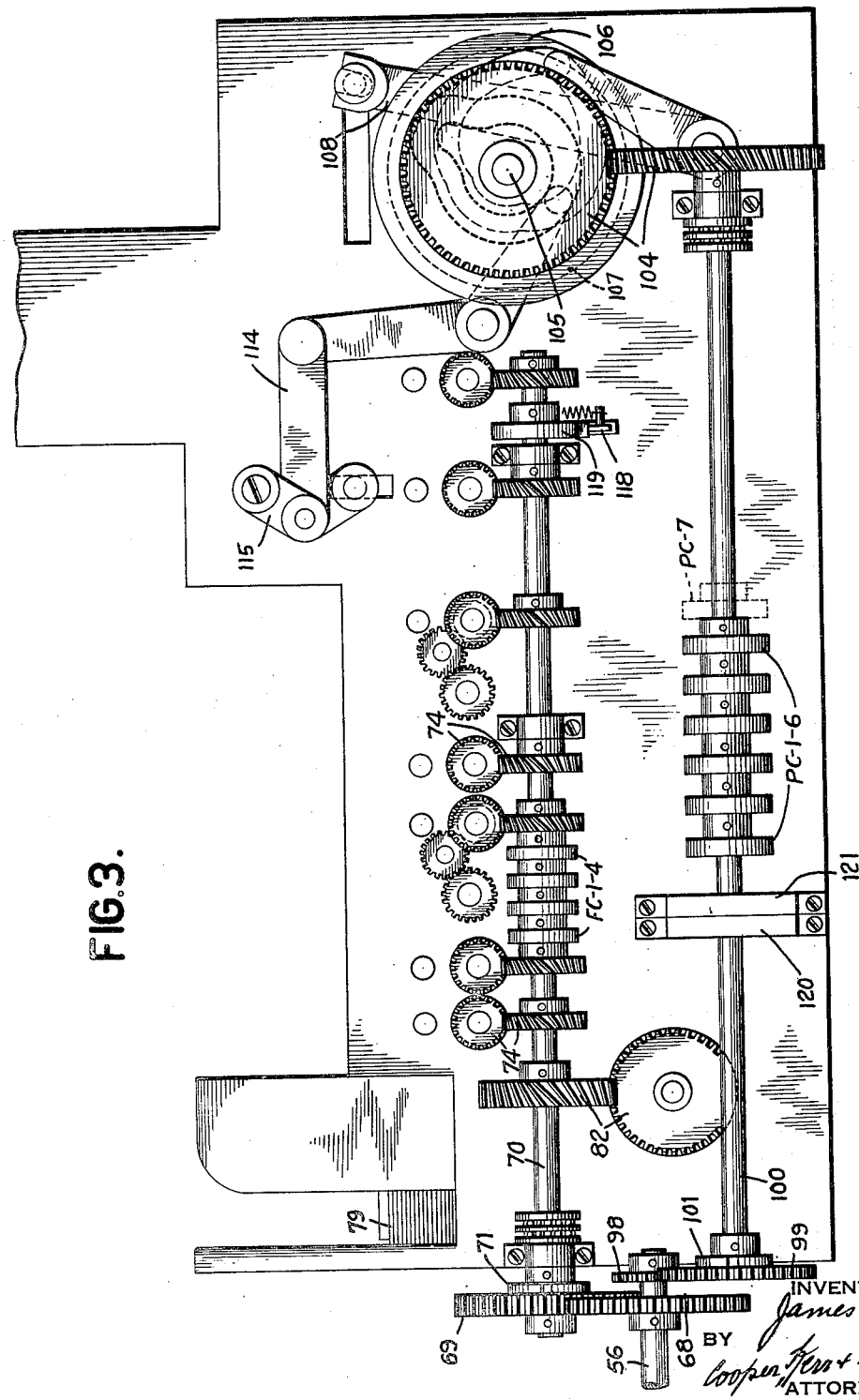

Nov. 24, 1936.   J. W. BRYCE   2,062,119
SUCCESSIVE DISCOUNT ACCOUNTING MACHINE
Filed Oct. 15, 1932   23 Sheets—Sheet 6
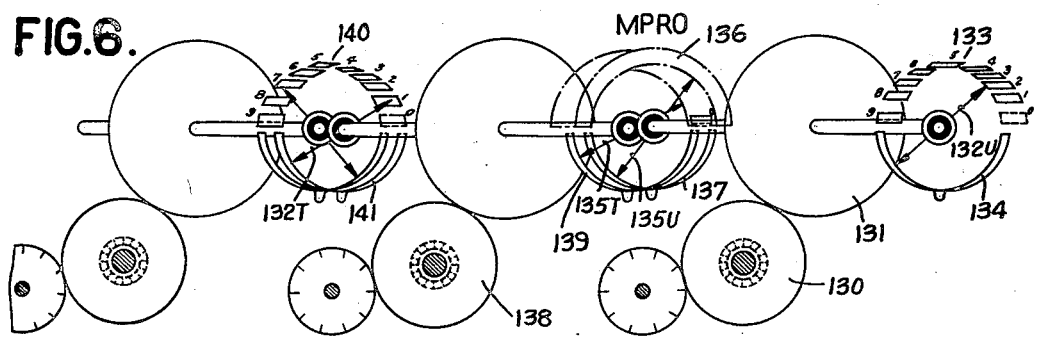
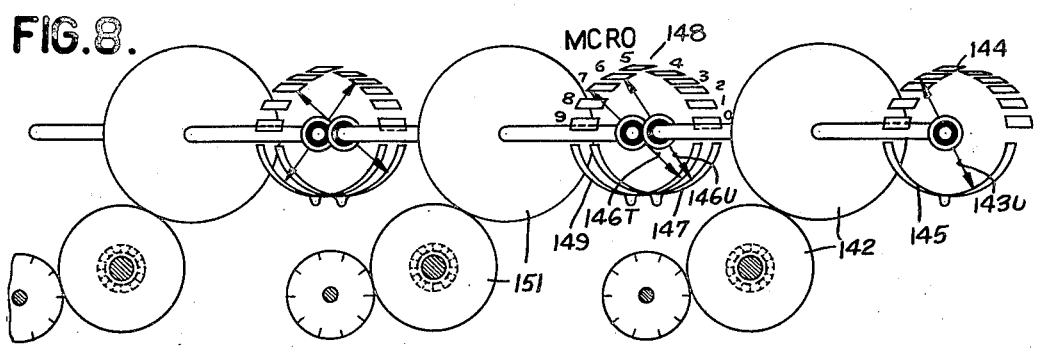
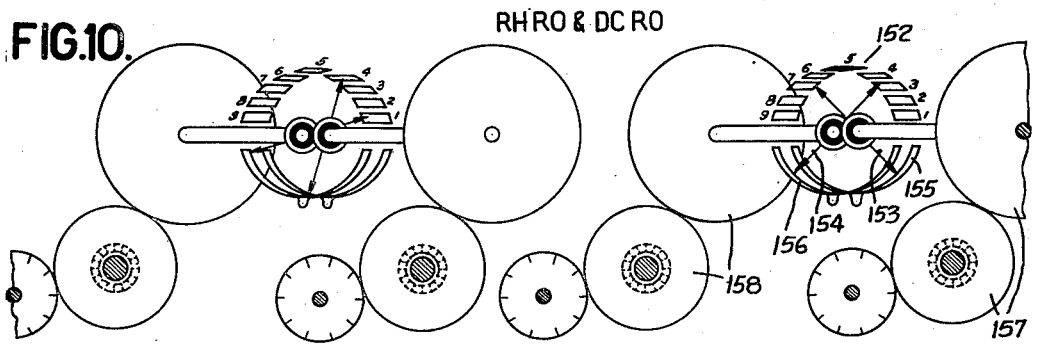
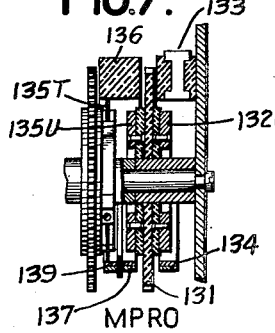
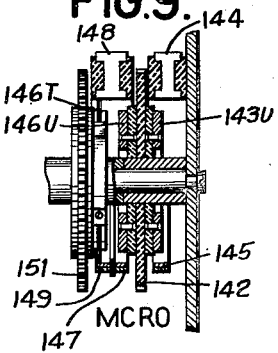
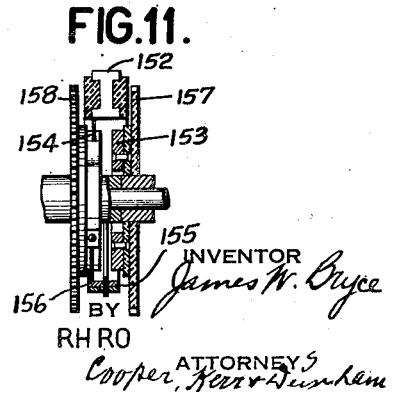

Nov. 24, 1936. J. W. BRYCE 2,062,119
SUCCESSIVE DISCOUNT ACCOUNTING MACHINE
Filed Oct. 15, 1932 23 Sheets-Sheet 7

INVENTOR
James W. Bryce
BY
Cooper, Kerr & Dunham
ATTORNEYS

Nov. 24, 1936.  J. W. BRYCE  2,062,119
SUCCESSIVE DISCOUNT ACCOUNTING MACHINE
Filed Oct. 15, 1932  23 Sheets-Sheet 8

Nov. 24, 1936.   J. W. BRYCE   2,062,119
SUCCESSIVE DISCOUNT ACCOUNTING MACHINE
Filed Oct. 15, 1932    23 Sheets-Sheet 9
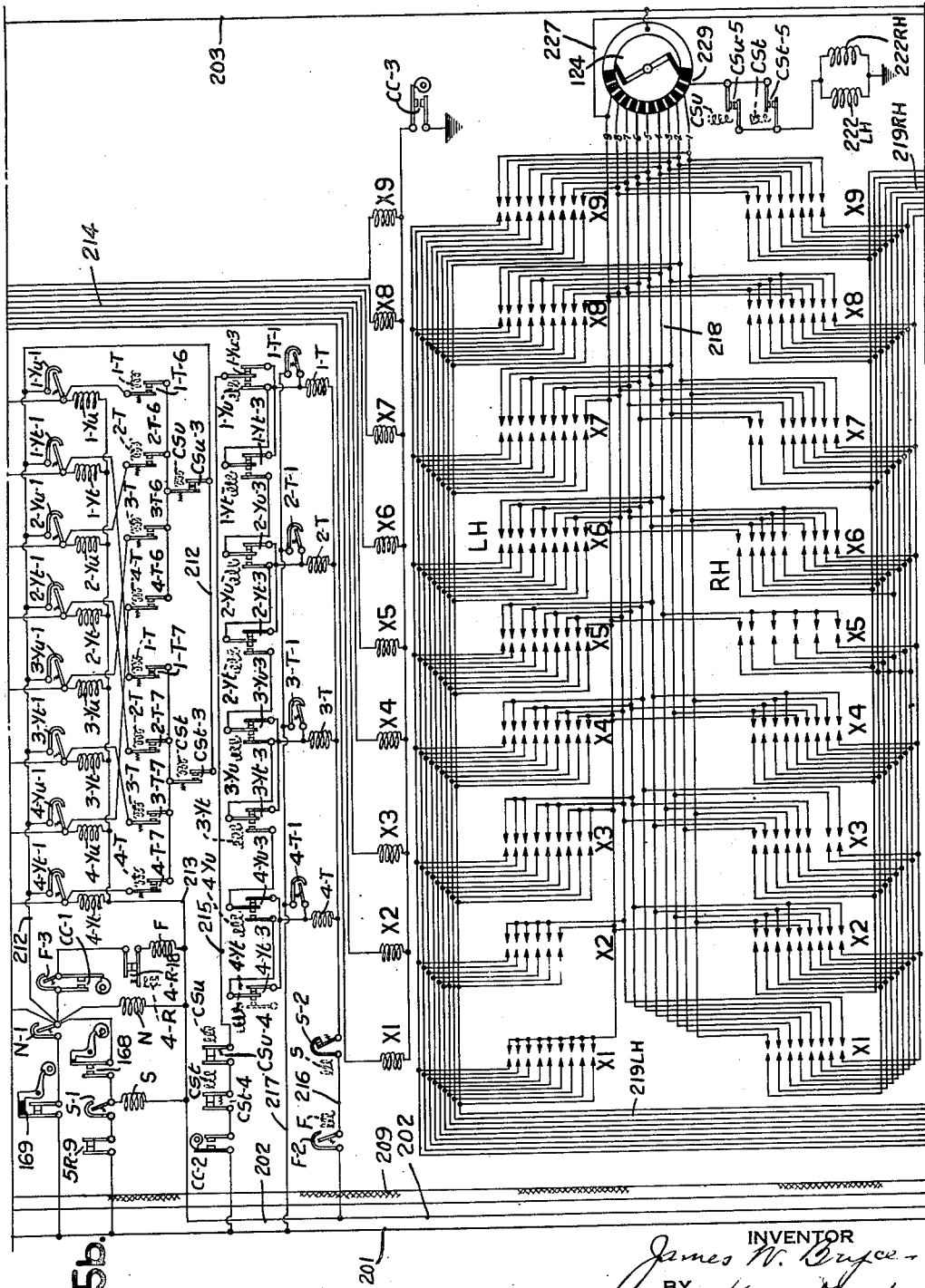
INVENTOR
James W. Bryce
BY
Cooper, Kerr & Dunham
ATTORNEYS

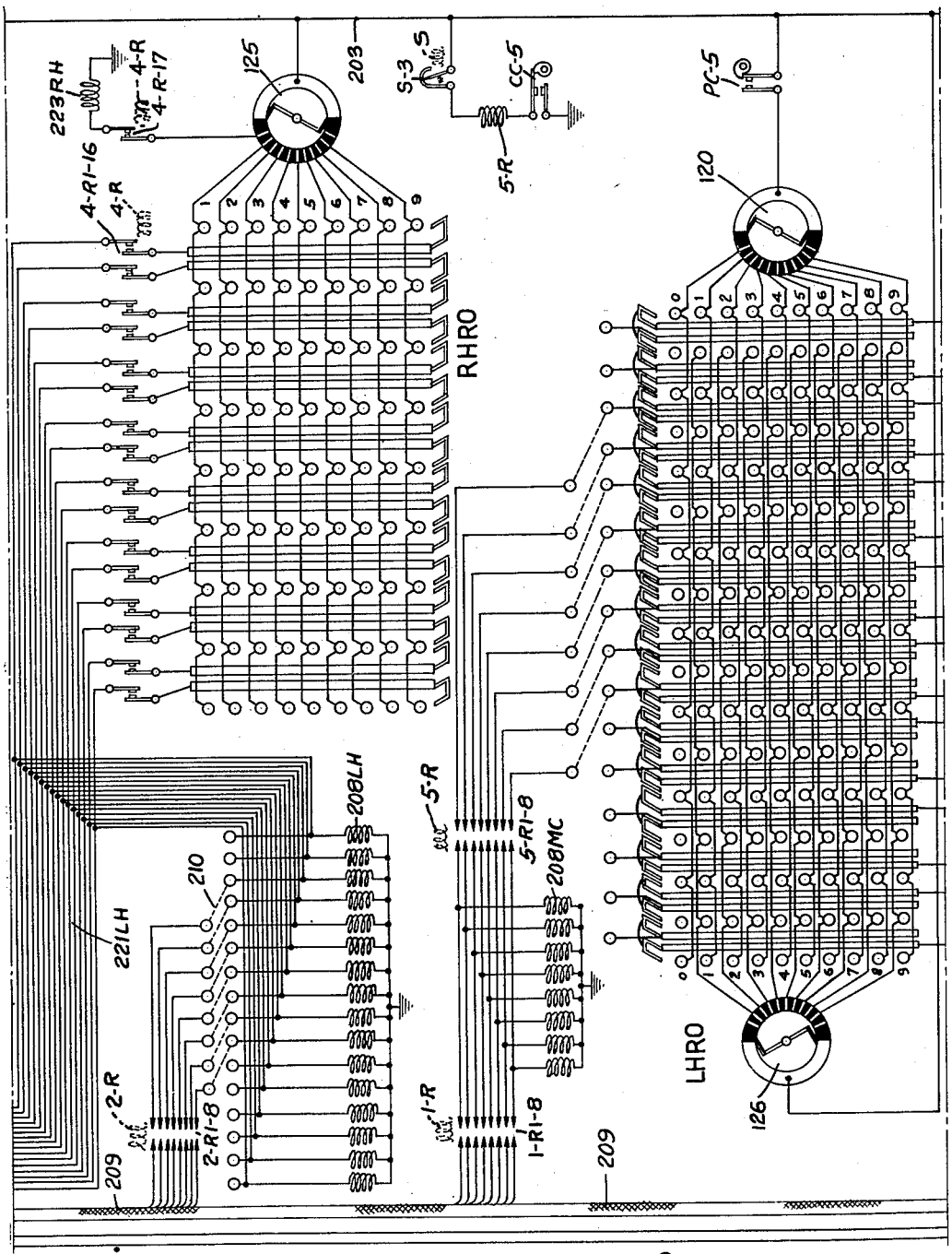

Nov. 24, 1936.    J. W. BRYCE    2,062,119
SUCCESSIVE DISCOUNT ACCOUNTING MACHINE
Filed Oct. 15, 1932    23 Sheets-Sheet 12

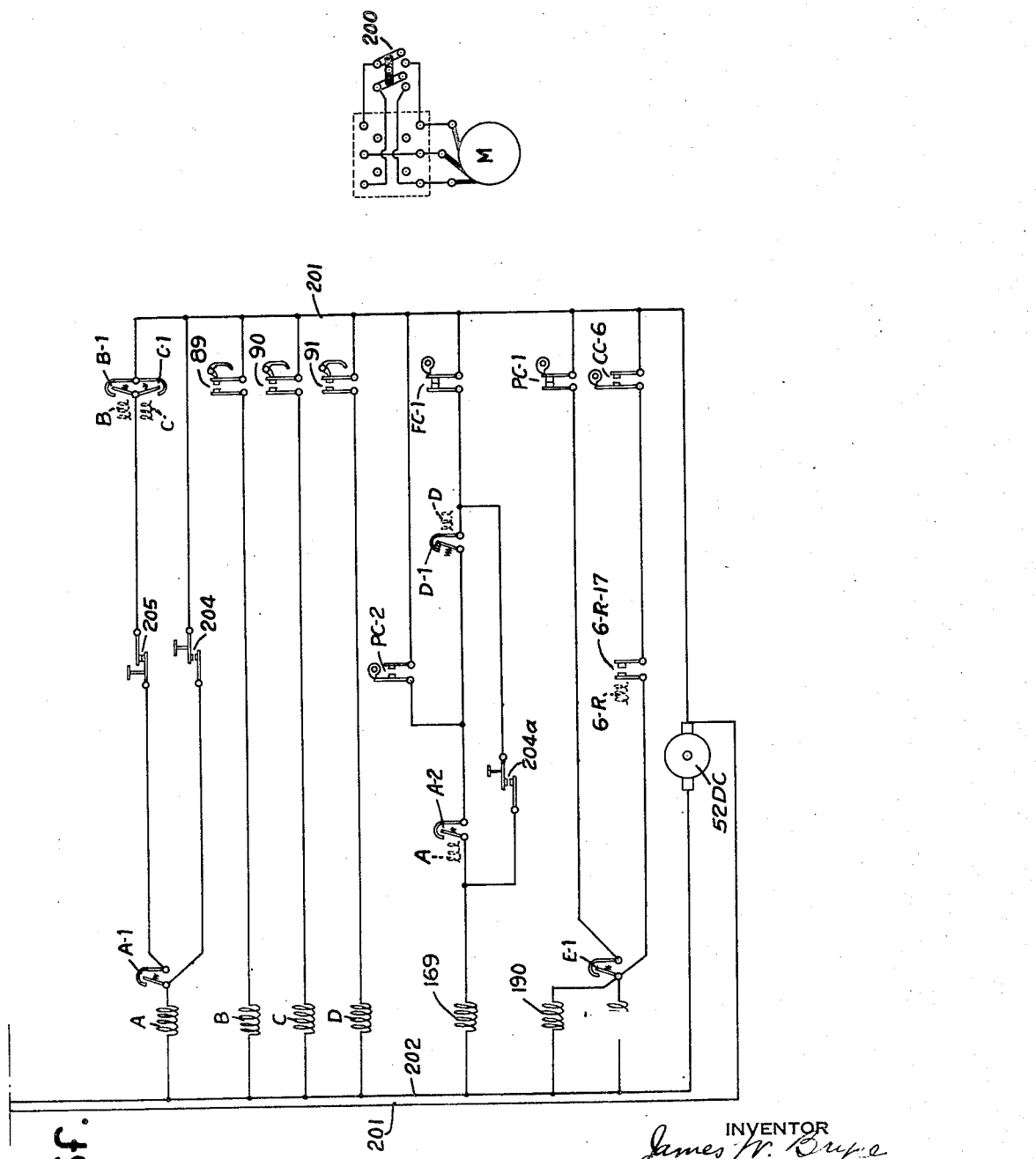

Nov. 24, 1936.    J. W. BRYCE    2,062,119
SUCCESSIVE DISCOUNT ACCOUNTING MACHINE
Filed Oct. 15, 1932    23 Sheets-Sheet 14

James W. Bryce
INVENTOR

BY Cooper, Kerr & Dunham
ATTORNEYS

Nov. 24, 1936.  J. W. BRYCE  2,062,119
SUCCESSIVE DISCOUNT ACCOUNTING MACHINE
Filed Oct. 15, 1932  23 Sheets-Sheet 16

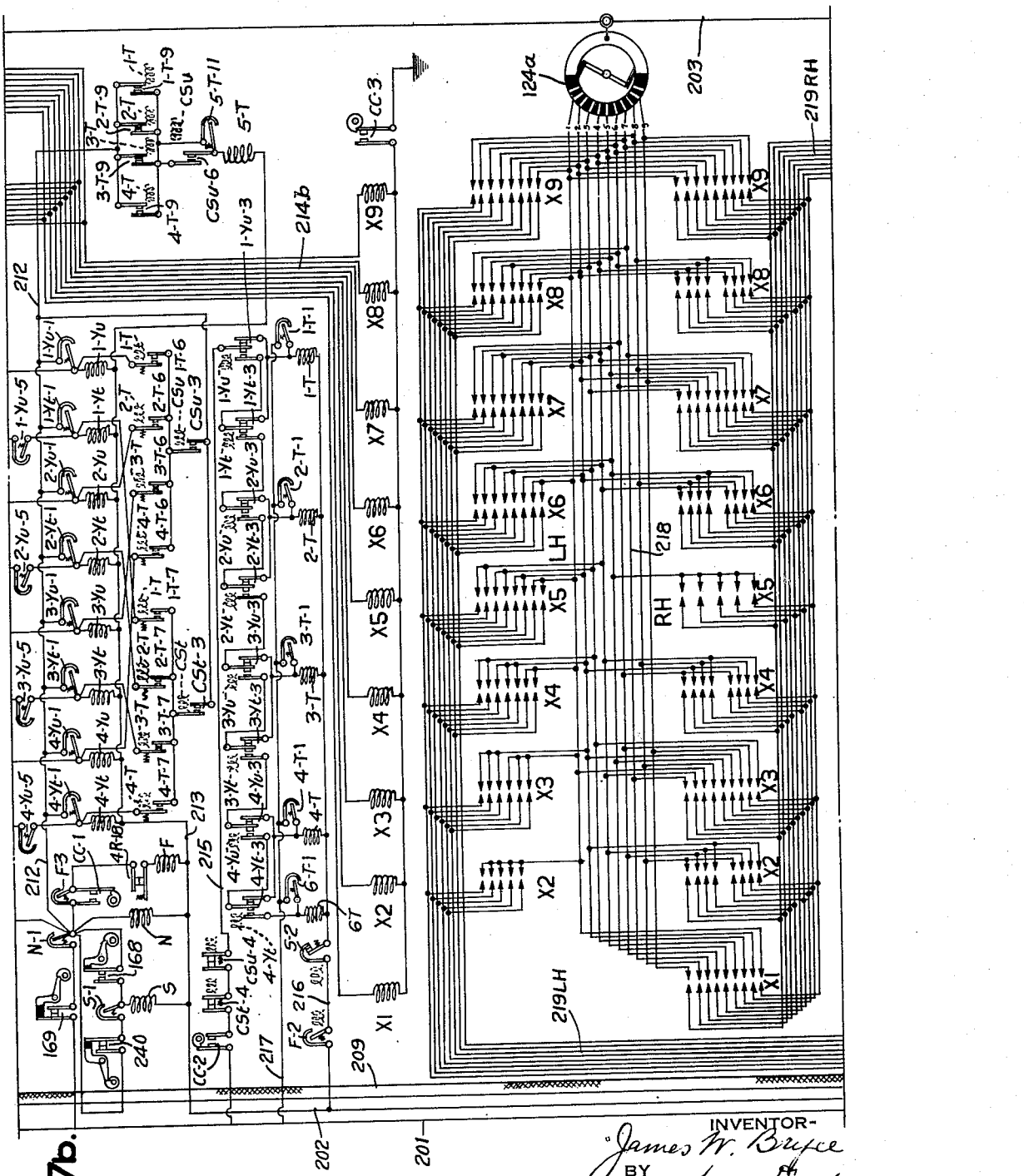

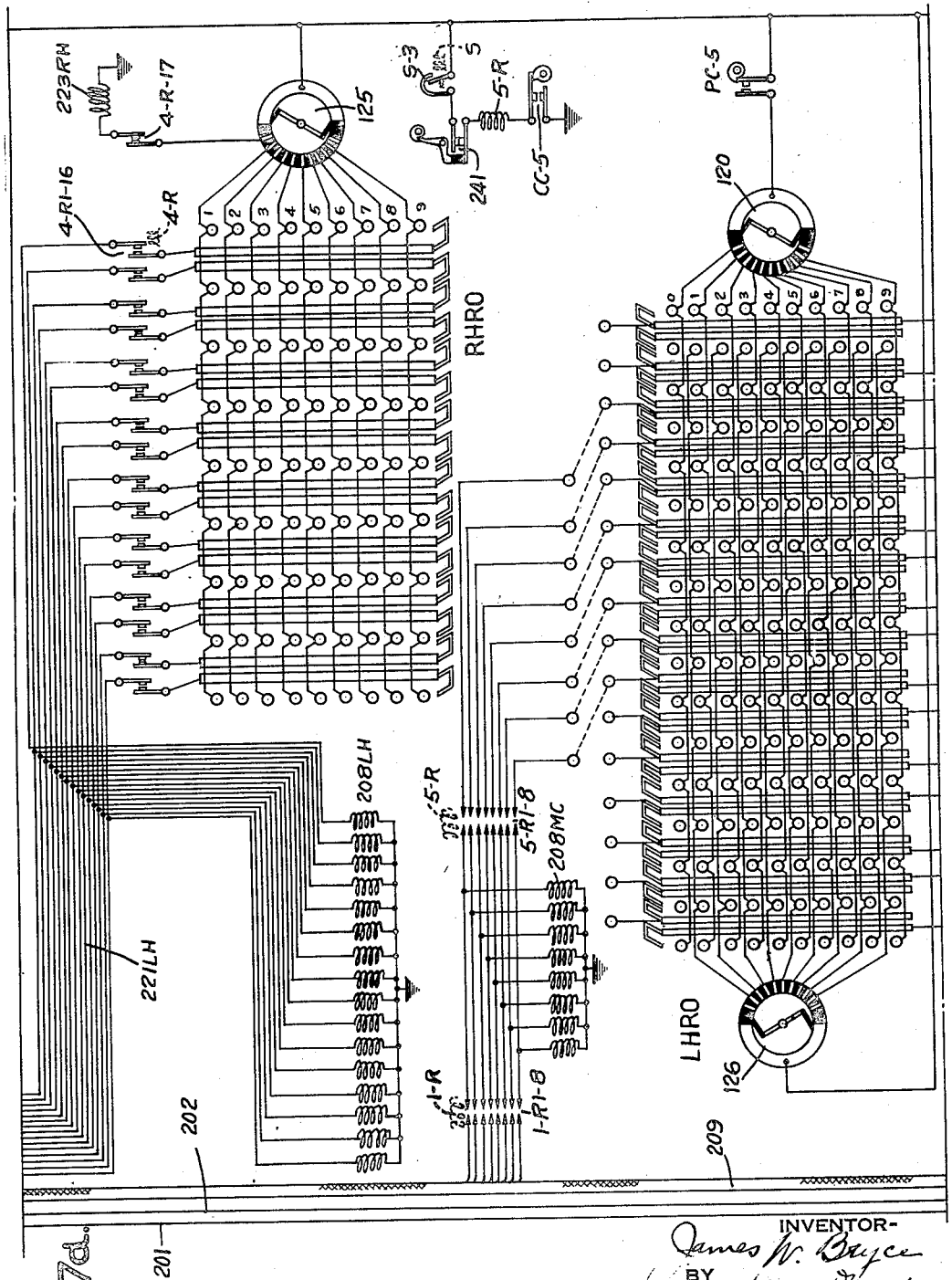

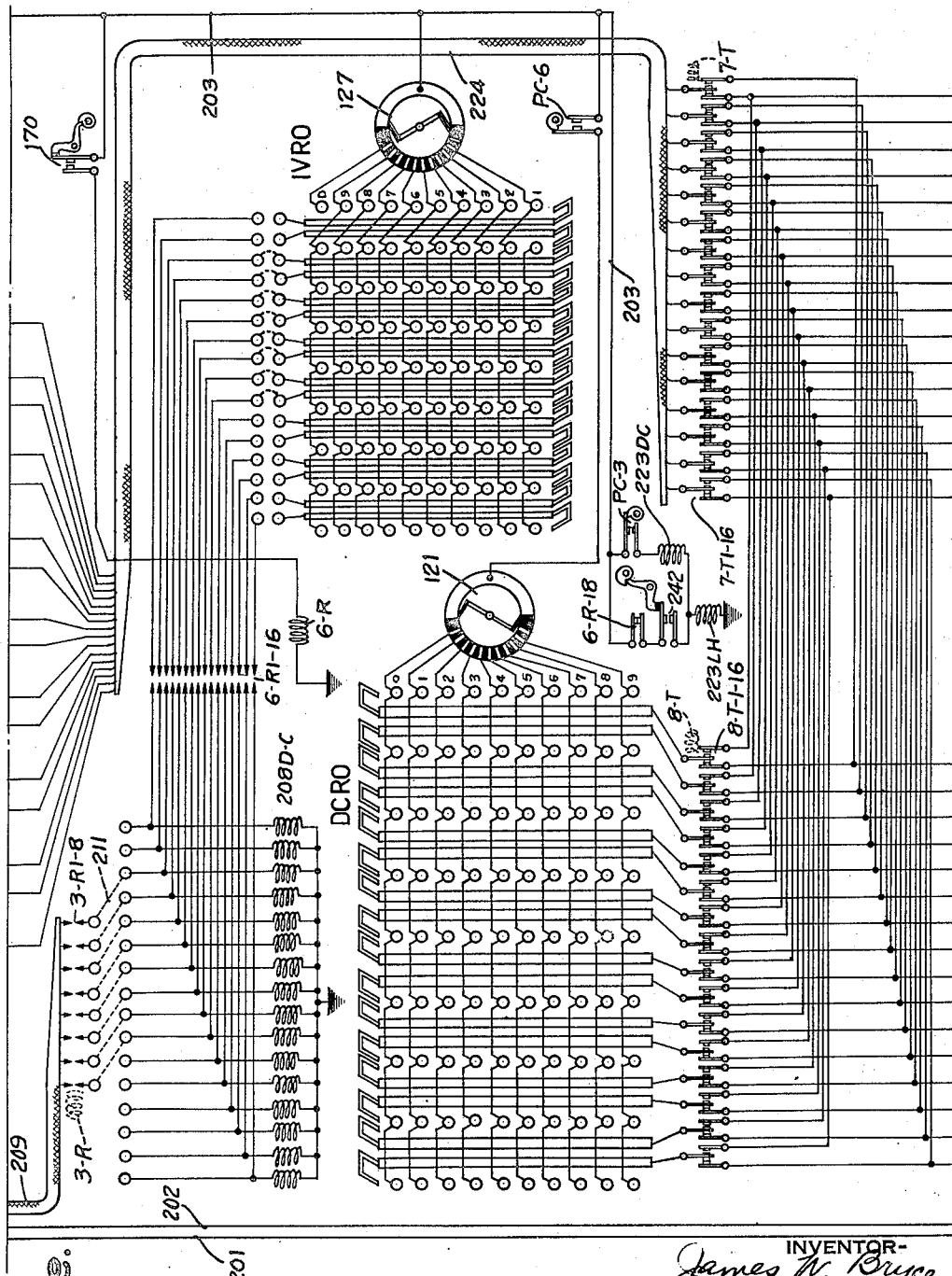

Nov. 24, 1936.   J. W. BRYCE   2,062,119
SUCCESSIVE DISCOUNT ACCOUNTING MACHINE
Filed Oct. 15, 1932   23 Sheets-Sheet 22

Patented Nov. 24, 1936

2,062,119

UNITED STATES PATENT OFFICE 2,062,119

SUCCESSIVE DISCOUNT ACCOUNTING MACHINE

James W. Bryce, Bloomfield, N. J., assignor, by mesne assignments, to International Business Machines Corporation, New York, N. Y., a corporation of New York Application October 15, 1932, Serial No. 637,948

29 Claims. (Cl. 235—92)

This invention relates to improvements in accounting machines.

In various commercial transactions occasion frequently arises where a number of successive discounts must be taken from an amount and it is desirable to know the net amount after these discounts have been taken. Heretofore, the taking of successive discounts has been effected by multiplying the initial amount by the first percentage of discount and then subtracting the first discount amount from the initial amount, then proceeding with another multiplication, effecting another subtraction and so on until the final net amount is obtained. The operation has also been performed by multiplying by complements of the successive discount percentages but in the previous practice no machine has been devised in which multiple successive discounts can be automatically secured wholly by the operation of the machine. Previously it has been necessary to perform a series of manual operations to obtain the ultimate net discount.

The present invention has for its object the provision of a machine which will automatically by the operation of the machine itself enable a net amount to be secured which is derived from an initial amount from which successive discount amounts have been taken.

A further object of the present invention resides in the provision of a record controlled calculating machine in which the initial amounts and a series of successive discount percentages can be pre-punched upon a record card and in which the machine by an automatic series of operations will successively compute the successive discounted amounts and finally obtain the ultimate net amount which amount the machine is adapted to record upon the record from which the original factors were derived.

A further object of the present invention resides in the provision of a machine in which multiple multiplying computations may be effected and in which provision is made in the machine for utilizing an intermediate product as a new multiplicand for a succeeding computation.

A further object of the present invention resides in the provision of a machine wherein an intermediate product may be used as a new multiplicand for a succeeding computation and in which the setting up of the new or intermediate multiplicand is effected wholly automatically by the operation of the machine.

A further object of the present invention resides in the provision of a record controlled accounting machine wherein an entry receiving device is arranged at certain cycles of operation to receive its entry from a card and at other cycles of operation to receive its entry from another receiving device or accumulator.

A further object of the present invention resides in the provision of a computing machine with provisions for receiving multiplier factors as true amounts and for automatically by the operation of the machine converting these amounts into complemental amounts for subsequent complementary multiplication.

A further object of the present invention resides in the provision of an accounting machine wherein an accumulator or entry receiving device is provided with a readout device of novel form adapted for reading out from the accumulator, amounts which are in complementary relation to the amounts which stand on the accumulator or entry receiving device.

In the taking of successive discounts it is also desirable not only that the final net amount be computed, but also provision be made for obtaining the total amount of discount deductions. Accordingly, a further object of the present invention resides in the provision of a successive discount accounting machine wherein provision is made for the obtaining of the total amount of discount deductions.

Furthermore in successive discount accounting operations it sometimes occurs that the number of discount deductions to be taken varies. On one problem there may be a gross amount from which say three discount deductions are to be taken and another problem may involve deductions by for example only two discounts instead of three or only one discount instead of three.

According to the present invention the improved accounting machine is capable of automatically and of itself varying its operation in accordance with the number of discount percentages which are entered therein. For example the machine may be running upon problems which uniformly involve four discount percentages, then a record card may pass into the machine which includes for example, only three discount percentages. Under these conditions the machine is arranged to automatically adjust its cycle of operation so that three discounts may be taken and idle machine cycles which otherwise would be related to the extra discount or discounts omitted.

Accordingly, a further object of the present invention resides in the provision of a successive discount type of accounting machine with improved means of machine control to enable the machine to automatically compute according to the number of discounts which are to be taken.

A further object of the present invention resides in the provision of a machine of the successive discount type wherein a cycle controller is provided for eliminating idle machine cycles when zero or zeros appear in a given discount in all columns or in certain columns thereof.

A further object of the present invention resides in the provision of a machine wherein an improved cycle controller is employed for controlling machine operations and for eliminating machine cycles upon the presence of zeros in a discount percentage and for controlling the number of discounting computing cycles according to the number of discounts to be taken in accordance with zero amounts in the discount percentage or percentages.

A further object of the present invention resides in the provision of a machine for taking successive discounts wherein provision is made for recording not only the final net amount but also the total of discount deductions. Preferably such recording is made by punching back the final net amount and data representative of the total of discount deductions upon the card or record from which the gross amount and the discount or discounts were derived.

A further object of the present invention, according to one embodiment, resides in the provision of a successive discount accounting machine wherein discounts are taken by complementary multiplication instead of being derived by multiplying by the complement of the discount or discounts.

A further object of the present invention, according to one of the embodiments thereof, resides in the provision of a computing machine with provisions for receiving multiplier factors as true amounts and for automatically by the operation of the machine itself, converting these amounts into complemental amounts for subsequent complemental multiplication.

A further object of the present invention, according to one embodiment thereof, resides in the provision of an accounting machine wherein an accumulator or entry receiving device is provided with a readout device of novel form adapted for the reading out from the accumulator of amounts which are in complementary relation to the amounts which stand on the accumulator or entry receiving device.

Further and other objects of the present invention will be hereinafter set forth in the accompanying specification and claims and shown in the drawings which by way of illustration show what I now consider to be preferred embodiments of the invention.

The present application constitutes a continuation in part of my copending application, Serial No. 553,940, filed July 30, 1931 for Successive discount accounting machines.

In the drawings:

Figures 1 and 1a taken together, show a diagrammatic view of the various units of the machine and also show the driving devices for the units;

Fig. 2 is a central transverse sectional view of the card handling, reading and punching section of the machine. The section is taken substantially on line 2—2 of Fig. 1a;

Fig. 3 is an enlarged front elevational view of the card handling, reading and punching section of the machine and this view also shows certain of the operating cams, cam contacts and emitters;

Fig. 6 shows somewhat diagrammatically the arrangement of the MPRO (multiplier) readout device. In the present invention such multiplier readout is used for the setting up of the discount;

Fig. 7 is a fragmentary sectional view of the MPRO readout device;

Fig. 8 shows somewhat diagrammatically the arrangement of the MCRO (multiplicand) readout device and the driving train therefor;

Fig. 9 is a fragmentary sectional view of the MCRO readout device;

Fig. 10 shows somewhat diagrammatically the arrangement of the RHRO (right hand partial product) readout device and the DCRO (computed discount) readout device and the driving train therefor;

Fig. 11 is a fragmentary sectional view of one of the readout devices shown in Fig. 10;

Figure 16:
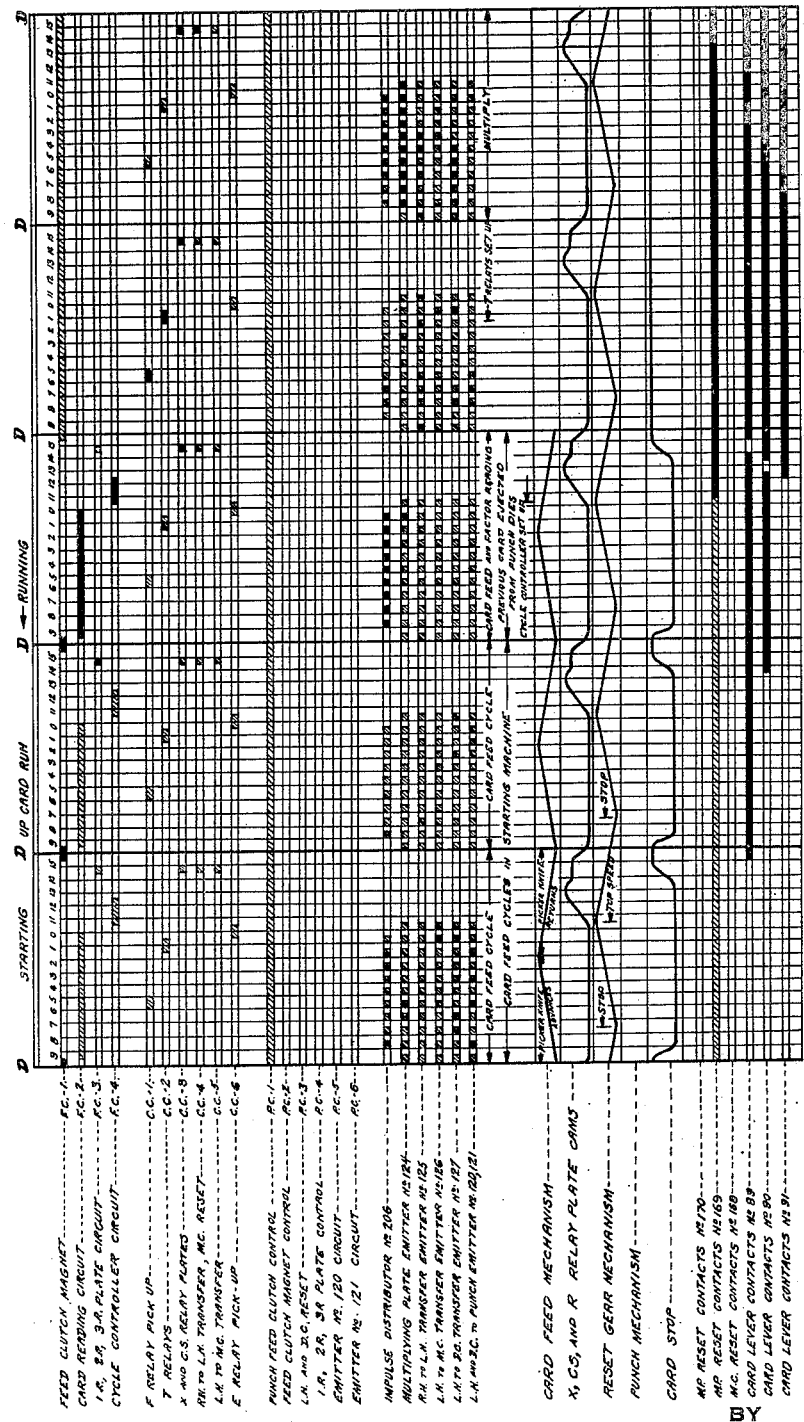
Figure 16A:
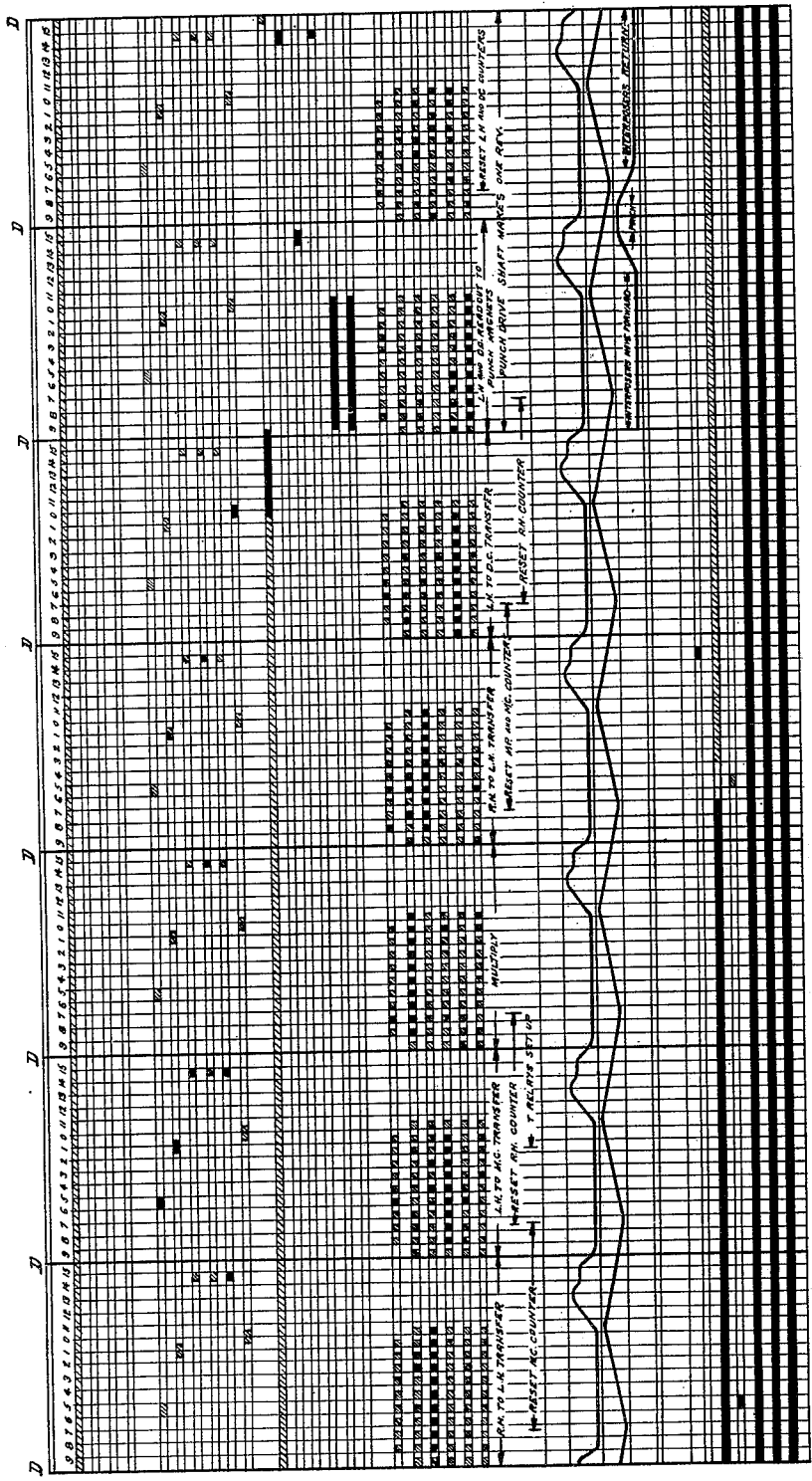
Figure 17A:
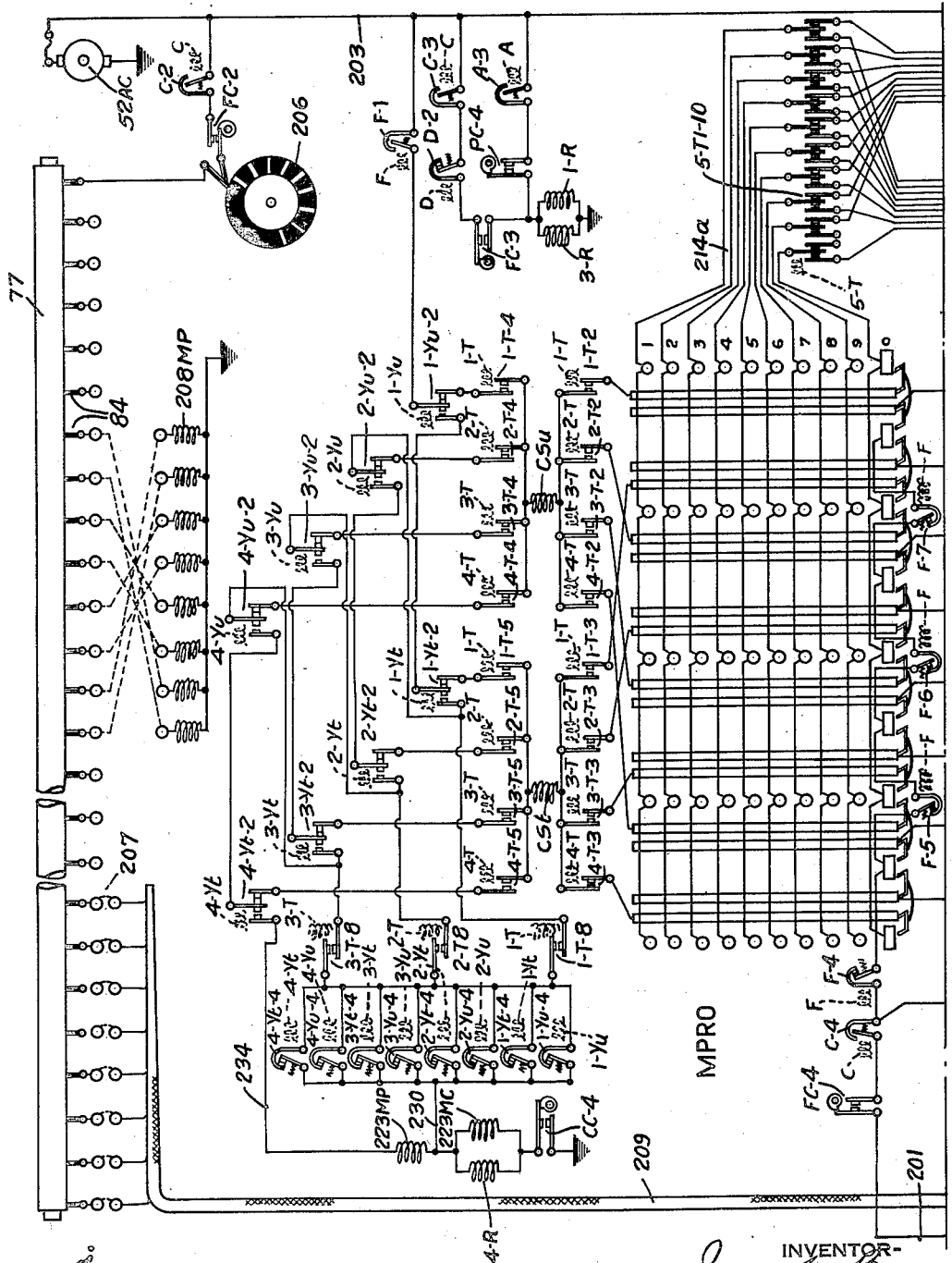
Figure 17C:
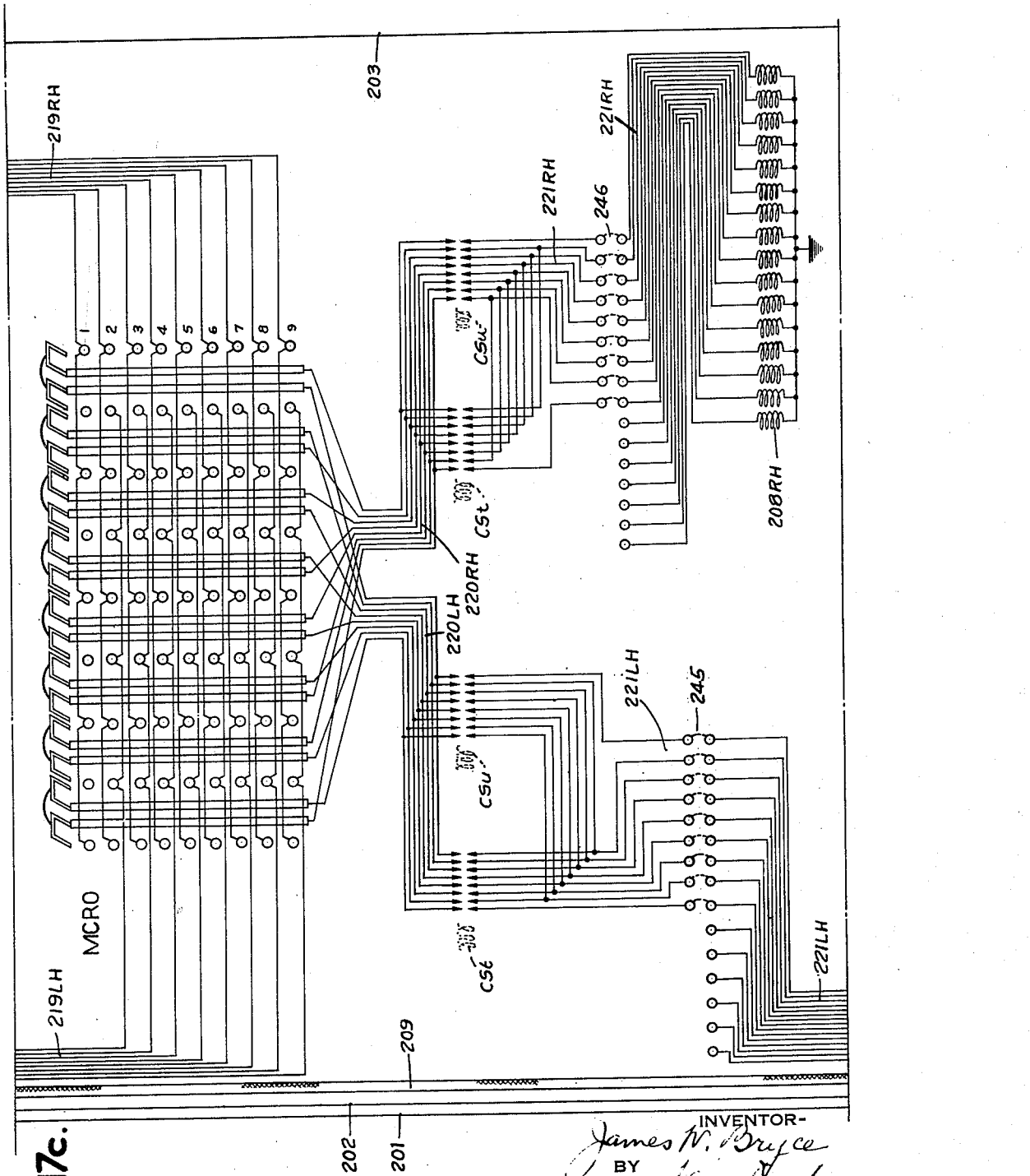
Figure 17F:
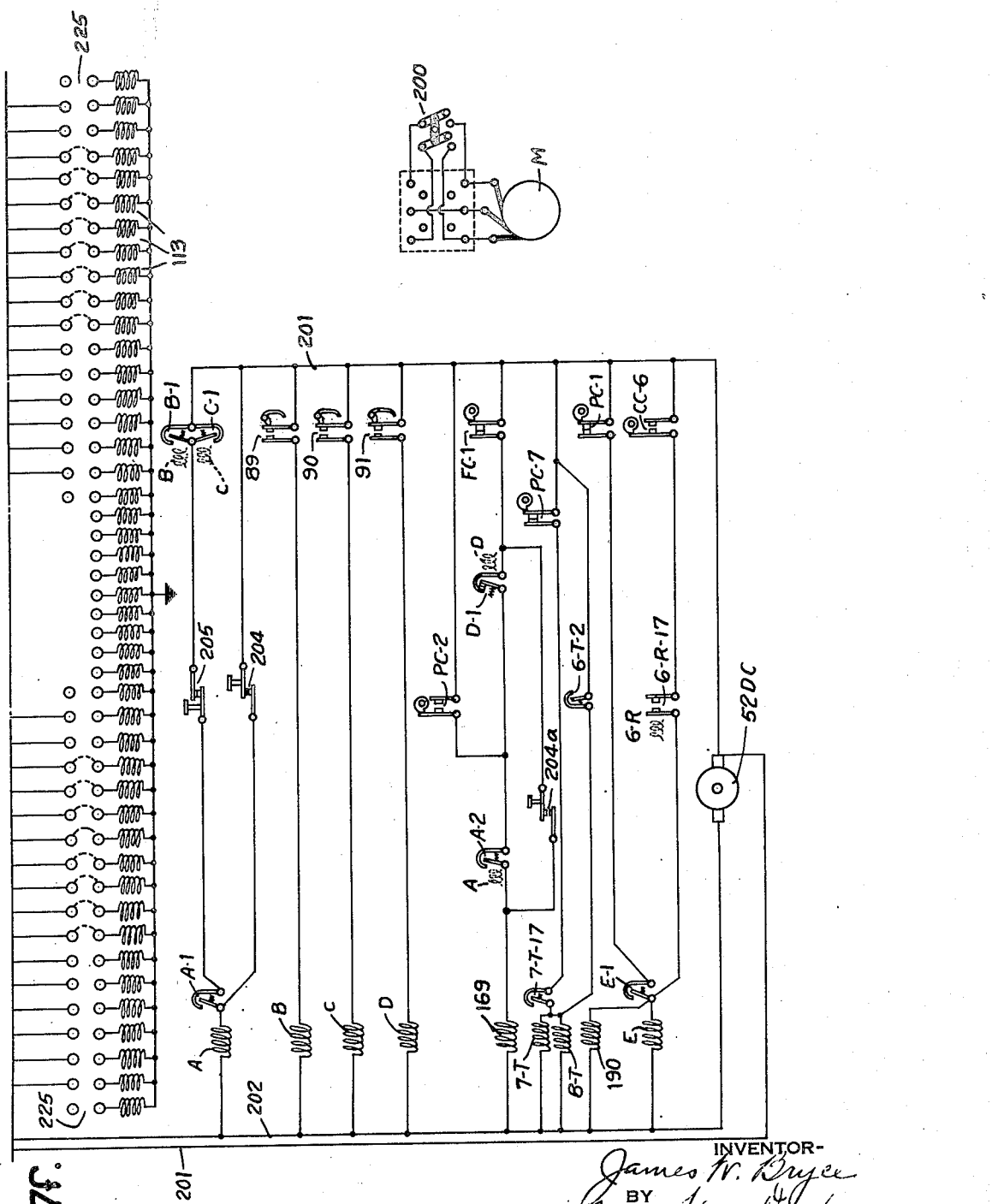
Figure 18:
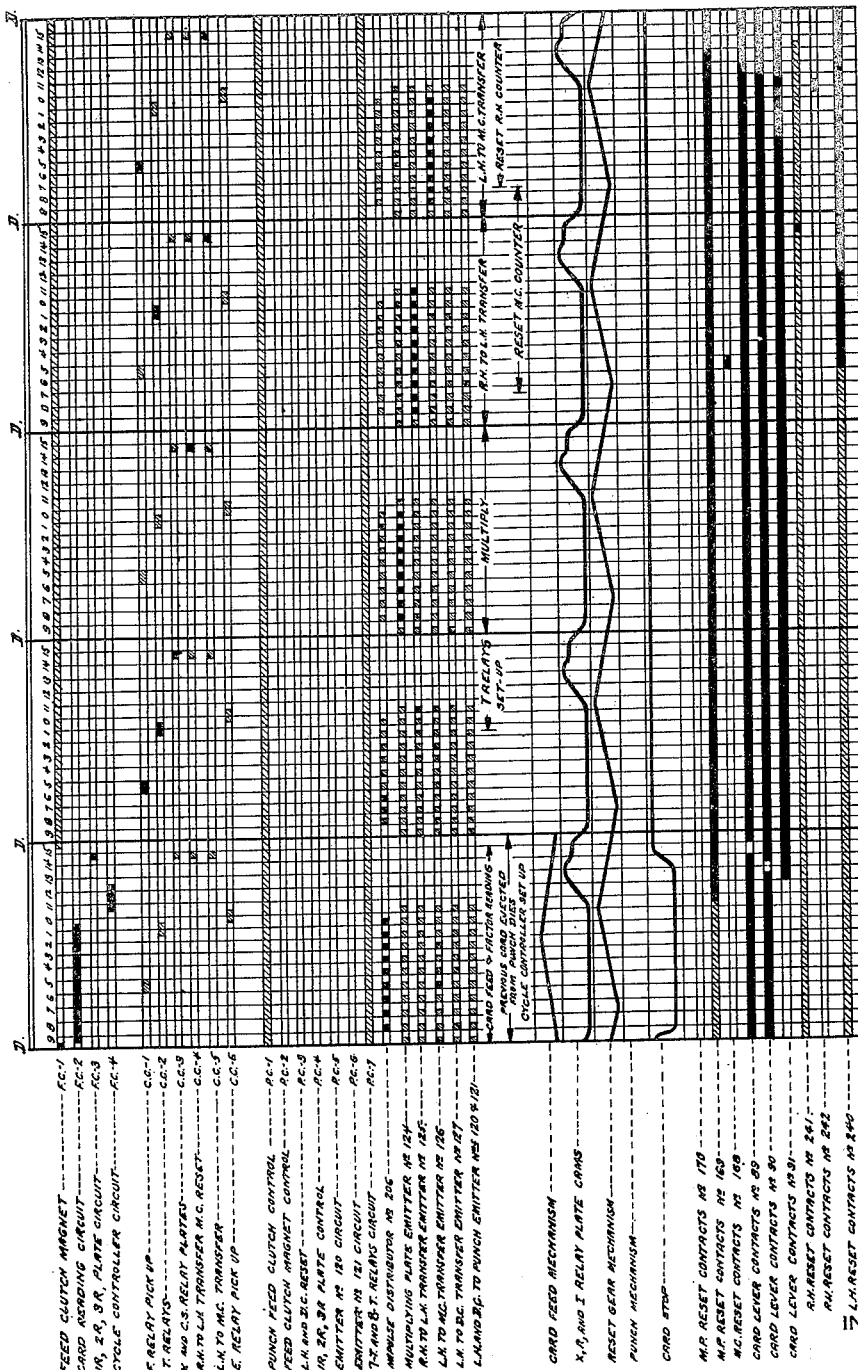
Figure 18A:
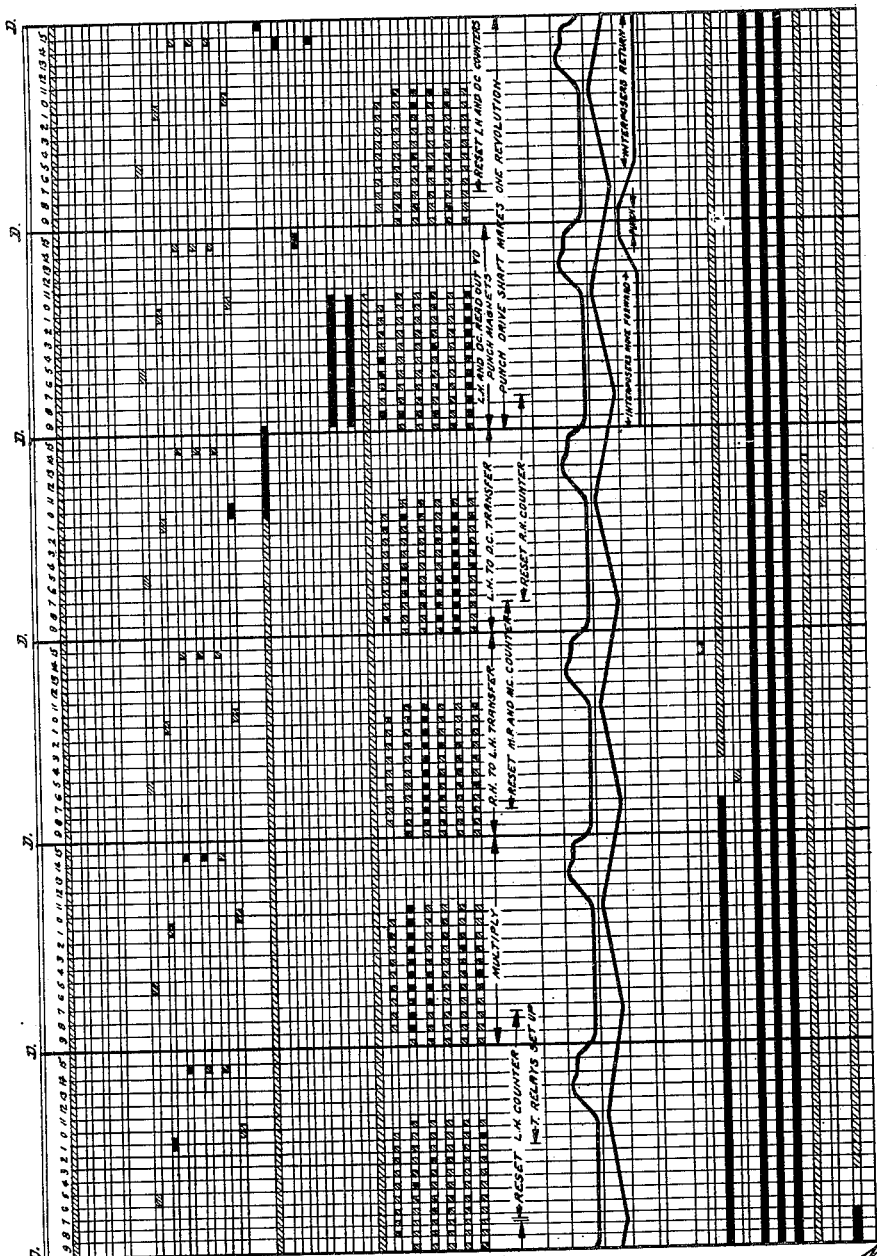

Figs. 15a, 15b, 15c, 15d, 15e and 15f, taken together and arranged vertically in the order mentioned, show the complete circuit diagram of the machine which forms one embodiment of the invention and wherein computation of discounts is effected by complemental multiplication;

Figs. 16 and 16a taken together, show the timing diagram of the machine which computes by complemental multiplication;

Figs. 17a, 17b, 17c, 17d, 17e and 17f, taken together and arranged vertically in the order named, show the complete circuit diagram of a machine incorporating a different embodiment of the invention, which machine effects computation and deduction of discounts by reading out a complement of each entered discount and effecting straight multiplication by such complementary amount; and Figs. 18 and 18a taken together show the timing diagram of the modified machine, the circuit diagram of which is shown in Figs. 17a to 17f inclusive.

Before describing the details of the various parts of the machine, a general description will be given of the various units and their location in the machine. The machine embodies a card feed, card handling and a punching section which are shown in the upper right hand corner of Fig. 1a and also shown in transverse cross-section in Fig. 2. This part of the machine is arranged to feed cards and derive readings therefrom and afterwards pass each card into a punching mechanism where each card is punched. This punching mechanism is a punching mechanism of the gang punch type wherein there is a preliminary selection of punches for punching and a subsequent concurrent displacement of the selected punches through the card.

The machine also includes a number of accumulators and entry receiving devices which may be enumerated as follows. In the upper part of the machine (Fig. 1) there is shown the usual RH (right hand) accumulator and LH (left hand) accumulator designated RH and LH on Fig. 1. Also disposed in the upper part of the machine is a DC accumulator for computed discounts. In the lower part of the machine there are two accumulators or entry receiving devices for receiving the multiplicand and the multiplier or discount. These are respectively designated MC and MP.

The machine also includes a multiplying panel relay unit which is in the lower part of the machine and generally designated MPR in Fig. 1a. In the lower part of the machine there is also provided the column shift unit generally designated CS. Certain additional electromagnetic multi-contact relays generally designated CR are also located in the CS section of the machine.

The machine also includes a number of emitter mechanisms and cam contact devices which will be subsequently described.

Machine drive

Figure 1:
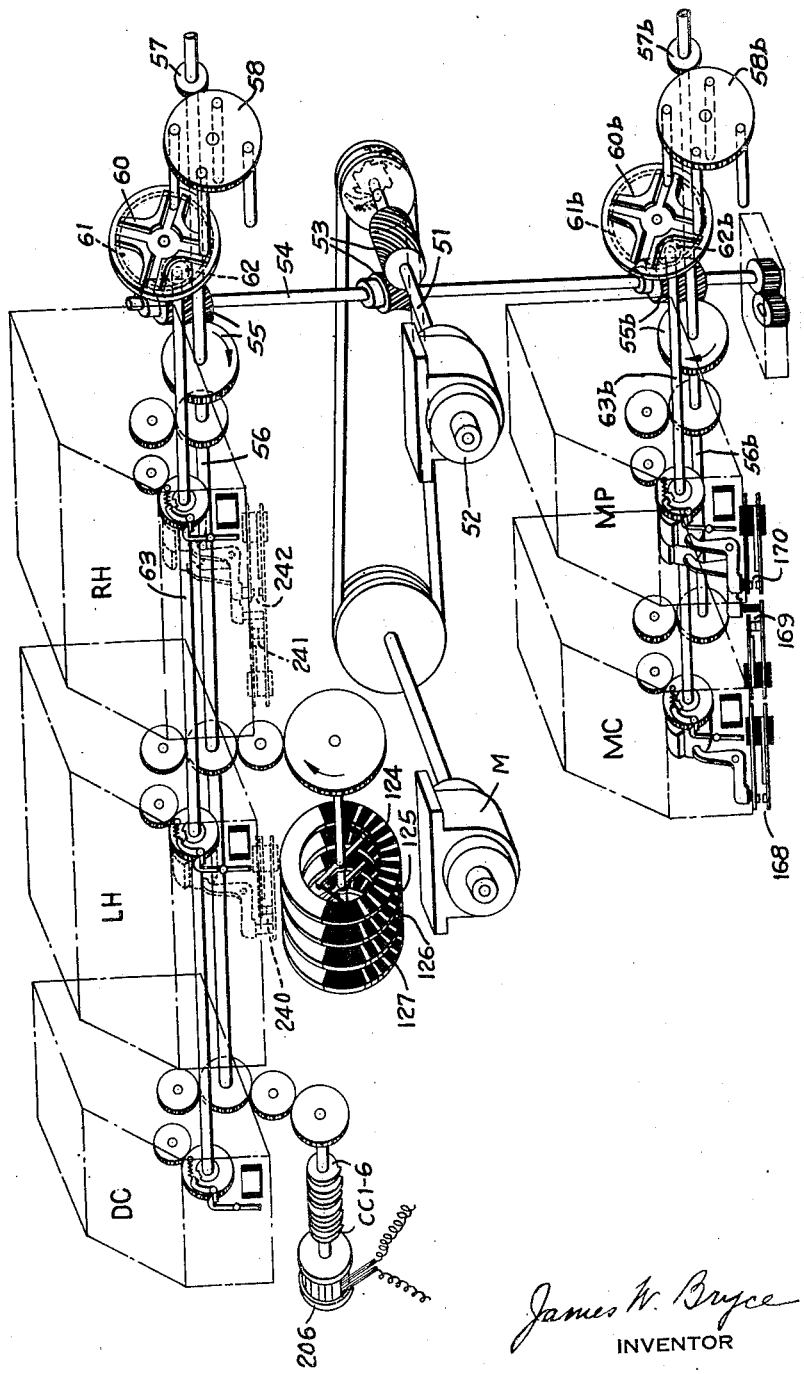

The machine is adapted to be driven by a constantly running motor M (Fig. 1). This motor, through a belt and pulley and ratchet drive, drives a shaft 51 which shaft drives an A. C.—D. C. generator 52. The A. C. end of this generator is adapted to produce the alternating current impulses for actuating various accumulators and relay magnets and the generator 52 also has a D. C. (direct current) take-off section. Thus the generator is provided with both slip rings for taking off the A. C. impulses and commutators and brushes for taking off direct current. Shaft 51 through worm gear drive 53 drives a vertical shaft 54, which shaft drives the units in the upper section of the machine and the units in the lower section of the machine. The drive to the units in the upper section will be first described.

Shaft 54 at its upper end, through worm gearing 55, is adapted to drive the drive shaft 56 of the machine. The various accumulators and receiving devices in the upper section of the machine are driven from this counter drive shaft. The drive for the reset of the various upper units is effected in the following manner. Shaft 56 is provided with a spur gear 57 driving a gear 58 with a four to one drive ratio. Gear 58 has extending from it four Geneva pins cooperating with the cross element of the Geneva designated 60. Secured to the element 60 is an internal gear 61 which gear has cooperating with it a spur gear 62 mounted on the end of the reset shaft 63.

The drive for the units in the lower part of the machine is substantially the same as previously described, that is shaft 54 through worm gearing 55b drives the lower counter drive shaft 56b. A similar Geneva drive 57b, 58b, 59b and 60b is adapted to drive an internal gear 61b which in turn drives the pinion 62b mounted on the end of the lower reset shaft 63b. The upper and lower reset shafts 63 and 63b reset the accumulators in the upper section of the machine and the accumulators and/or entry receiving devices in the lower section of the machine. The lower drive shaft 56b also extends to the right and drives operating cams 65, which cams are adapted to operate bell crank follower members 66 and slidably shift serrated operating bars 67 for the multi-contact relay devices.

Card feed, card handling and reading and card punching unit drive

Referring to Figs. 1a and 3, the shaft 56 at its extreme right hand end is provided with a gear 68 which drives a gear 69 freely rotatable upon a shaft 70, but having fast to it the notched element 71 of a one revolution clutch. The complemental part of this one revolution clutch comprises a pawl 72 carried by an arm 73 which is fixed to shaft 70. This one revolution clutch is of the type used in tabulating machines and the clutch is engaged by the energization of the usual clutch magnet 169. With the clutch engaged, shaft 70 will rotate in unison with gears 69 and 68 and in unison with the drive shaft 56. With the clutch disengaged, shaft 70 will be stationary, while shaft 56 will continue its rotational movement. Shaft 70 through spiral gearing generally designated 74, drives the lower of a series of pairs of card feed rolls designated 75, 75a and 75b. The shaft 70 also drives the two gears on contact rolls 76 and 77 (see Fig. 2) by gearing extending to certain of the lower rolls 75 (see Fig. 3). Cooperating with the lower feed rolls 75 are upper feed rolls 78. These rolls 78 are preferably gear driven in unison with the lower feed rolls. An upper roll 78a is also provided, which roll is frictionally driven. A roll 78b is also provided, which roll may be positively driven in unison with the cooperating lower roll 75b. Preferably the rolls 75a and 78a and 75b and 78b are arranged to rotate at a slightly higher rate of speed than rolls 75 and 78 for a purpose to be hereinafter described.

The machine is provided with the card supply magazine 79 and the usual discharge hopper 80 (see Fig. 2). A crank operated picker 81 is driven in any suitable manner from the driving shaft 70, as by the driving train 82 shown in Fig. 3.

The machine is provided with advance sensing brushes 83 and a second set of sensing brushes 84, which respectively cooperate with the contact rolls 76 and 77. As stated before the contact rolls 76 and 77 are driven from the shaft 70 (see Fig. 3) and preferably the drive is such that these contact rolls slip slightly relatively to the card to cause a slight slipping or creeping action of the contact rolls. A leading and a lagging X brush 85 and 86 are provided which respectively cooperate with segment blocks 87 and 88. The usual card lever operated contacts 89 and 90 are also provided which are adapted to be closed upon the passage of cards thereunder and to open up upon the failure of a card to cooperate with the respective card levers. Another card lever with associated contacts 91 is provided in the punching section of the machine. A card leaving the right hand pair of rolls 78 and 75 enters a punching die comprising upper and lower die plates 92 and 93. Sets of rows of punches 94 are provided suitably supported for sliding movement in a punch operating frame generally designated 95. A series of interposer selector bars 96 are provided, one interposer selector being provided for each row of punches and each selector bar carries on its end a punch operating plunger 97, which plunger slides over the tops of the punches 94 and below the top of the punch operated frame 95.

The drive for the punching section of the machine is as follows. Referring to Figs. 1a and 3, the shaft 56 is provided with a gear 98 which in turn drives a gear 99 freely rotatable on a punch operating drive shaft 100. Gear 99 has fast to it the notched element 101 of a one revolution clutch and the complemental part of this clutch comprises a pawl 102 carried by an arm 103 which is fixed to the shaft 100. This one revolution clutch is of the electromagnetically controlled type and when engaged by the energization of the punch clutch magnet 190, shaft 100 is turned through one complete revolution upon two complete revolutions of the main counter drive shaft 56. In view of the two to one driving ratio the notched element 101 is provided with two notches to receive the pawl 102 in either of two positions. Shaft 100 near its left hand end, through spiral gearing generally designated 104 (see also Fig. 3) drives a cam shaft 105. Cam shaft 105 is provided with an interposer cam 106 (see Fig. 3) and punch operating cams 107. The interposer cam 106 is adapted to shift a crank follower 108 and shift a cross-bail 109 (Fig. 2) back and forth on slide rods 110. The interposers 96 are impositively driven from the cross member 109 in any suitable manner as by spring pressed pawls 111. The interposers are selectively positioned over the punches by means of pawls 112 which engage ratchet teeth in the tops of the interposer bars in the usual manner. Pawls 112 are electromagnetically tripped by punch selector magnets 113. After a given interposer bar or bars have been selectively positioned under the control of the punch selector magnets the punches which are under the ends of the punch operating plungers 97 will be positively forced through the card by the punch operating cams 107 (Fig. 3), which cams through a linkage 114 are adapted to operate a suitable operating means for the punch frame 95, such operating means being here shown as a toggle 115 (Fig. 3).

It will be understood that a card will be picked from the magazine 79 (Fig. 2) and in one counter cycle a card will be passed to a position in which the leading card is about to be read by the set of brushes 83. The card on the next counter cycle will pass to the next reading station and on the following counter cycle it will pass into the punching die. The card is arrested in the punching die by a card stop 117 (Fig. 2) which card stop cooperates with the pivoted arm 118, coacting with a cam 119 disposed on shaft 70 (see Figs. 1a and 3). With the card stop 117 elevated the card will be arrested in proper position in the punching die. The feed rolls 78a and 75a urge the card into cooperation with the card stop and after the card has been intercepted by the card stop slip relatively thereto before their rotational movement terminates. Upon withdrawal of the card stop after punching, the card will be ejected from the punching die by the rapidly moving rolls 78b and 75b and delivered to the discharge stack.

It will be understood that a card is removed rom the die plates 92 and 93 during the card feed cycle, in which a new card is being introduced into the die and being sensed and the one revolution feed clutch permits a card to be advanced through one station and then arrested for an indefinite number of cycles and the one revolution punch clutch permits the punch to be called into operation after the requisite number of computing cycles. Upon the completion of punching, a new card feeding and reading cycle may ensue.

Emitters and cam contacts

The main counter drive shaft 56 is adapted to drive the cams of certain CC cam contact devices, such cams being correspondingly numbered on Fig. 1 as CC—1 to 6 inclusive. Upon the shaft 70 (Fig. 3) there are provided the cams of a number of FC cam contacts. Such cams are correspondingly designated FC—1 to 4 inclusive on Fig. 3. The punch operating drive shaft 100 also drives the cams of a PC group of cam contacts. Such cams are correspondingly designated on Fig. 3 as PC—1 to 7 inclusive. Also on the driven shaft 100 are two emitters 120 and 121. The machine is also provided with another set of emitters and which are driven from the main counter drive shaft 56 (Fig. 1). Four of such emitters are provided which are designated 124, 125, 126 and 127. An impulse distributor 206 is also provided which is driven in unison with the cam contacts CC—1 to 6.

Reset controlled contacts

Referring to Fig. 1, the reset gears of the MC and the MP entry receiving devices are each provided with cam devices adapted upon the reset of the entry receiving device to cause actuation of certain contacts. Such contacts are designated as follows. 168 are the normally open contacts associated with the MC receiving device which close upon reset. Associated with the MP receiving device, there are two pairs of contacts respectively, designated 169 and 170. 169 are normally open and close upon reset and 170 are normally closed and open upon reset.

The foregoing description has described the manner in which cards are withdrawn in succession from the supply magazine and the manner in which the cards are carried past the various sensing brushes and delivered into the punching section of the machine. With the traverse of each card past the sensing brushes 84, the various amounts are read from the card and entered into the receiving devices of the machine. In the present invention the advance reading brushes 83 and the advance control or X brushes 85 and 86 are not used. These are used with machines performing other computations and here shown only for uniformity of illustration in various applications.

The receiving device and accumulators are of the type used in tabulating machines and are provided with electromagnetically actuated clutches. The various accumulators and receiving devices have commutator type readout devices which will now be described.

MP readout

Referring now to Figs. 6 and 7, 130 is a clutch gear pertaining to the units order of the MP (multiplier) receiving device. Gear 131 is driven from this clutch gear and this gear in turn drives two brush assemblages, one designated 132U, which traverses a set of segments 133 and also a current supply segment 134. There is another brush assemblage 135U driven by gear 131 which brush traverses a segment generally designated 136 and which segment is provided with a single conducting spot at the zero position. The brush 135U also traverses a current supply segment 137. There is a similar brush 135T which is positioned from the tens order clutch wheel 138 and which also traverses the segment 136 which contains only the single conducting spot at the zero position. Brush 135T also traverses a separate current supply segment 139. Similarly there is a brush 132T driven in unison with brush 135T which traverses the segment 140 and which receives current from the common current supply segment 141. This arrangement of brushes and segments is repeated for higher orders in the MP readout device, i. e. each alternate segment is like 136 with only a single spot in the zero position on each segment. Alternating with these segments are other segments similar to 133 and 140 with a multiplicity of spots on each segment. The detail construction of this readout with its brush assemblages is shown in the cross-sectional view Fig. 7. The wiring of the readout will be more fully set forth in connection with the circuit diagram (see Fig. 15a).

MC readout

Referring now to Figs. 8 and 9, in Fig. 8 is shown the brush driving arrangement for the MC readout. The segments 144, 148, etc. are of the ten spot type. The wiring of the readout is shown on the circuit diagram. In this embodiment the units clutch gear train 142 drives a units brush assemblage 143U which cooperates with a set of segments 144 and which receives current from a common conductor segment 145. Similarly, units driving train 142 drives a brush assemblage 146U receiving current from a conductor segment 147 and cooperating with segments 148. Also cooperating with segments 148 is another brush assemblage 146T receiving current from a conductor segment 149, which brush assemblage is driven by the tens order clutch train 151. This arrangement is repeated for relatively higher orders.

RH and DC readouts

Fig. 10 shows the general arrangement of the readouts for the RH and the DC accumulator. With a readout mechanism of this sort, it will be noted that the segment spots 152 are common to two sets of brush assemblages designated 153 and 154 respectively and which brushes cooperate respectively with conducting segments 155 and 156. Brush 153 as shown in Fig. 10 is driven from the units order clutch gear train 157. Brush 154 on the other hand is driven from the tens order clutch train 158 by the gearing diagrammatically illustrated.

Figure 15A:
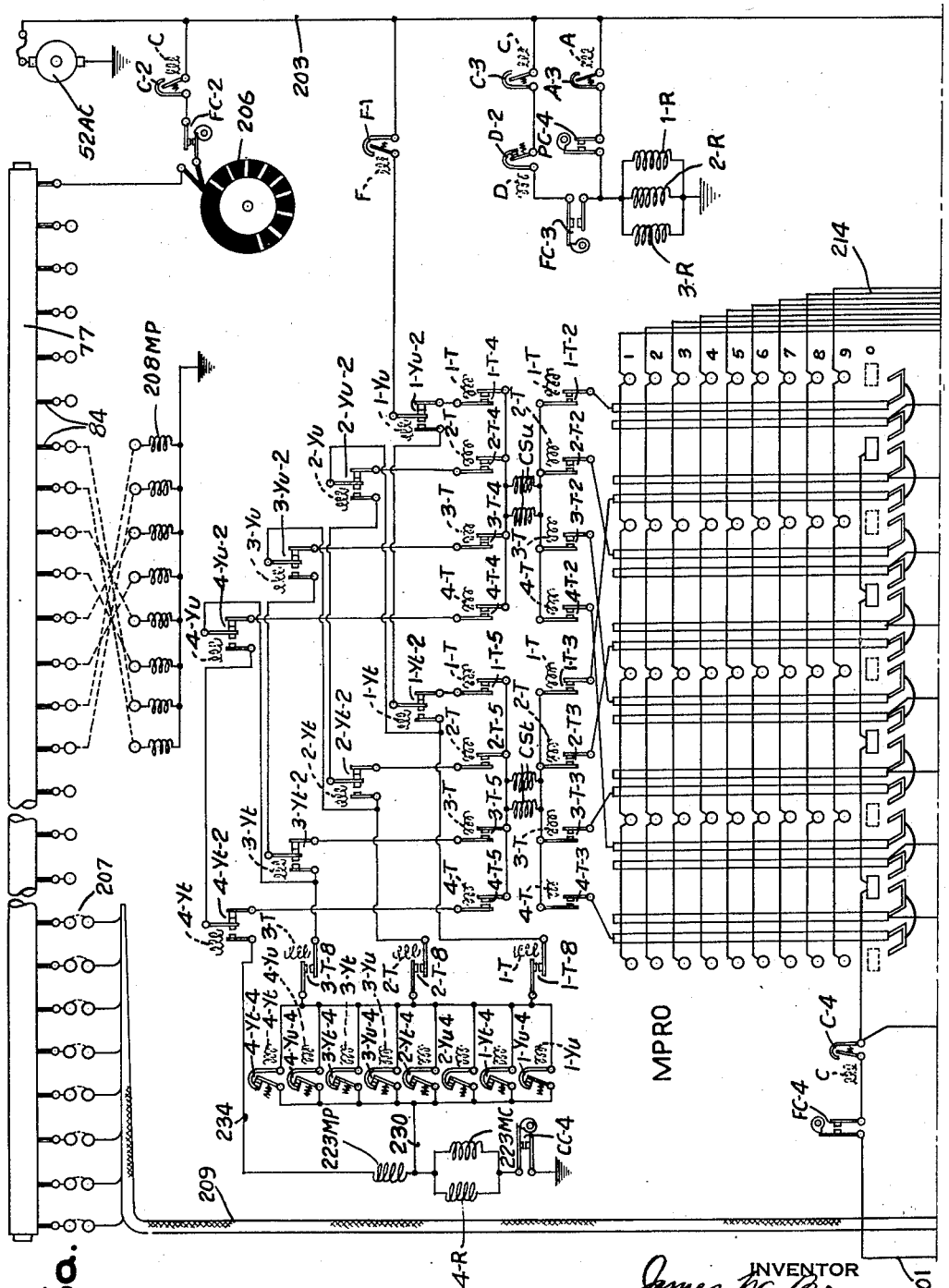
Figure 15C:
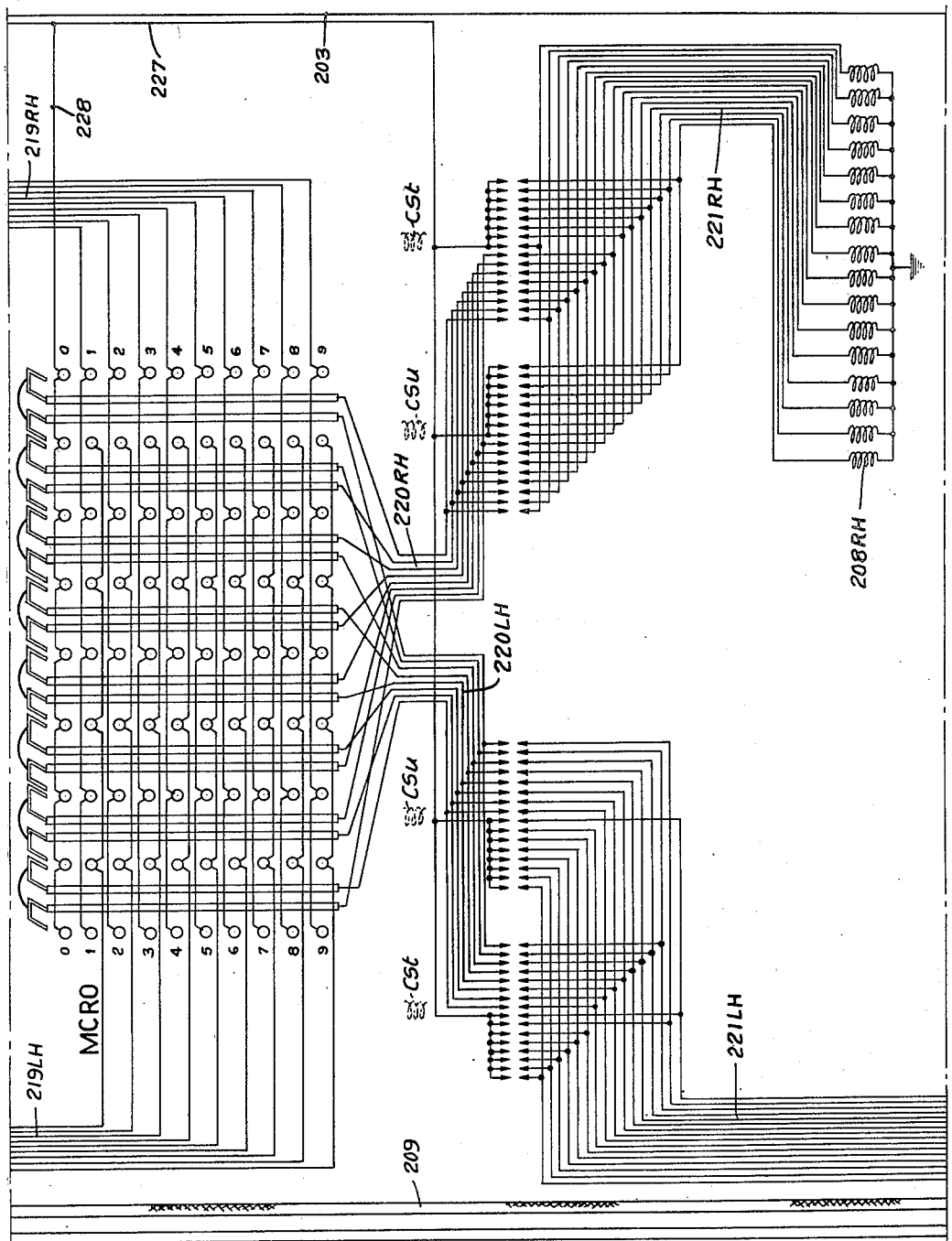
Figure 15E:
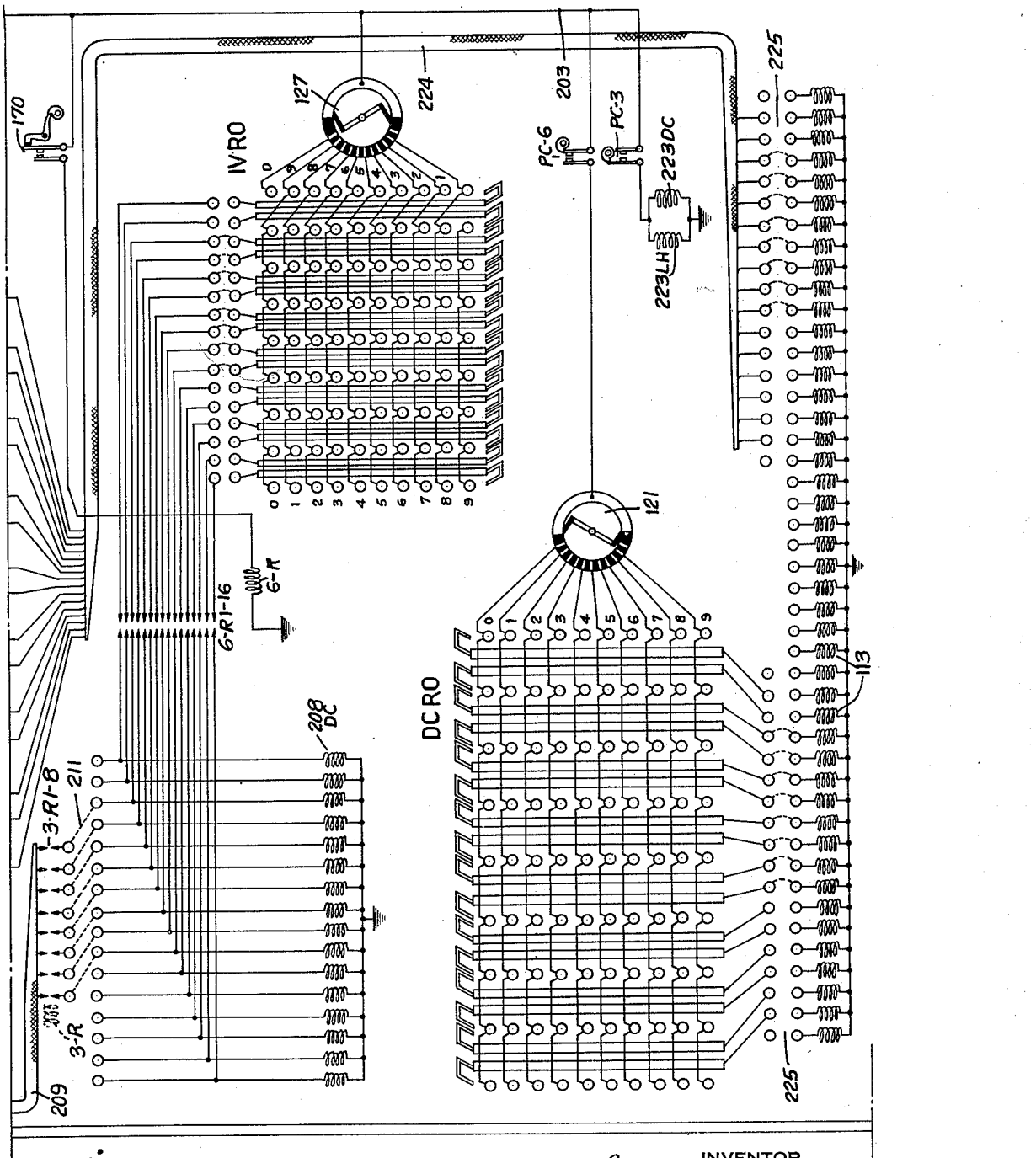

A similar arrangement of brushes and readout spots is provided for the relatively higher orders of these accumulators and the wiring of these readouts is shown on the circuit diagram (see Figs. 15c and 15e). The RH readout is provided with nine segment spots (Fig. 10), while the DC readout is provided with ten segment spots as shown on the circuit diagram. Fig. 11 shows the details of construction.

LH and IVRO readouts

Figure 12:
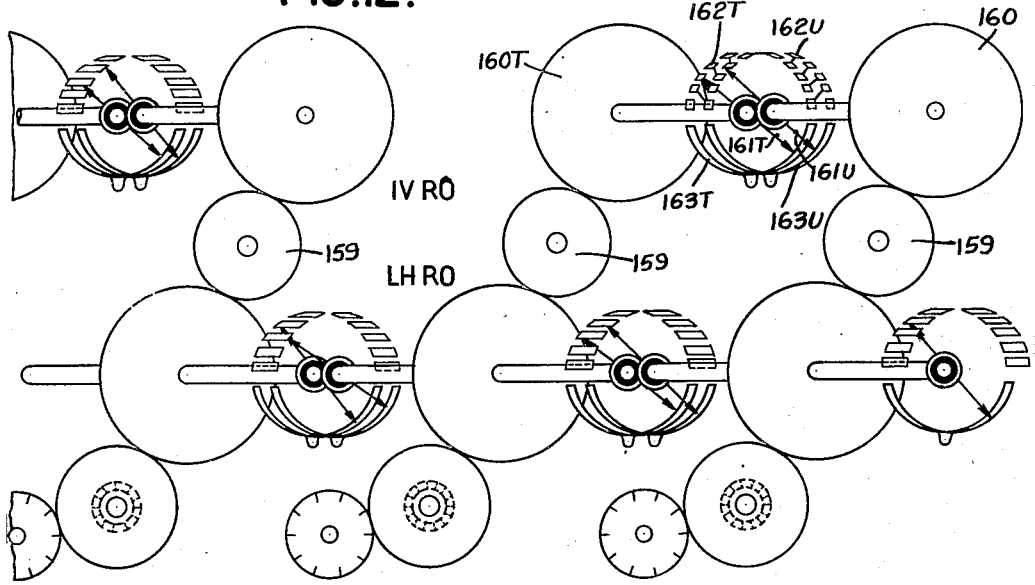
Fig. 12 shows a dual readout device, the lower section of which is used for left hand partial products and which is designated LHRO and the upper section which is used for an inverter readout, the same being designated IVRO.
Figure 13:
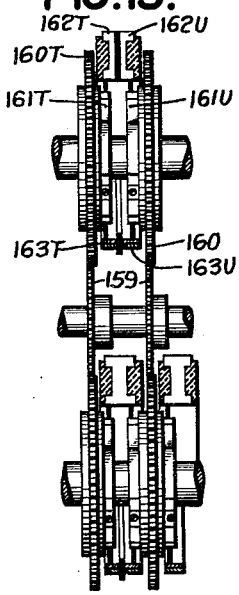
Fig. 13 is a detail sectional view of the dual readout device shown in Fig. 12.

Referring now to Figs. 12 and 13, this readout which is here shown and which is used for the left hand accumulator, comprises a lower section which is substantially identical in construction to the MCRO readout previously described. The readout is, however, provided with a concurrently driven upper section of somewhat different construction and differently wired. The brush parts of the upper section are driven by intermediate gears 159, one of which is provided for each denominational order. The upper section is substantially of the form of readout used for an inverting accumulator wherein readings are to be taken from an accumulator which are complements of the amounts standing thereon. Such upper section will be accordingly designated IVRO. The lower section from which real number amounts are read out is designated LHRO.

The construction of the upper section will now be described. The intermediate gear 159, pertaining to the units order, through gear 160 drives brush 161U which traverses the units segment spots 162U and a supply segment 163U. The tens order intermediate gear 159 drives a brush assemblage 161T through the intermediate gear 160T. Brush assemblage 161T traverses the tens order segment spots 162T and a supply segment 163T. Segment spots 162U and 162T are diagonally transversely wired as shown. The relation of wires is such that the nine spot of the 162U group is wired to the eight spot of the 162T group and so on. The complete wiring of this readout is shown on the circuit diagram. On higher orders the construction of this readout is the same as for the RHRO readout previously described.

Multiplying panel, column shift and multiple circuit controlling relays

Figure 4:
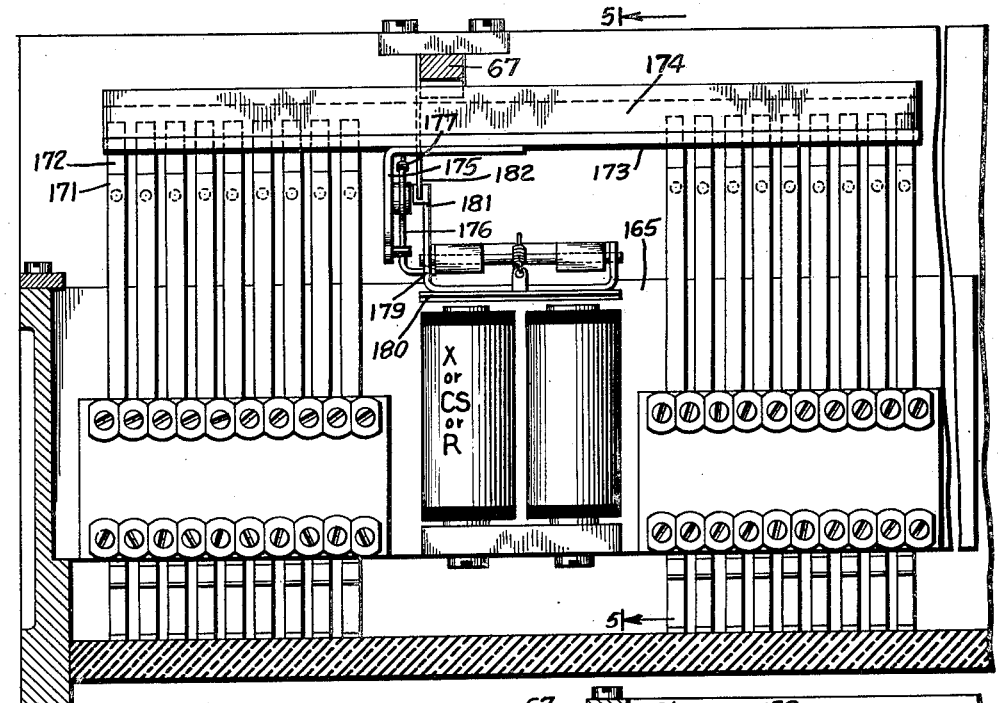
Fig. 4 is an elevational view of one of the power positioned electromagnetically controlled multi-contact relay devices which are used in the machine.
Figure 5:
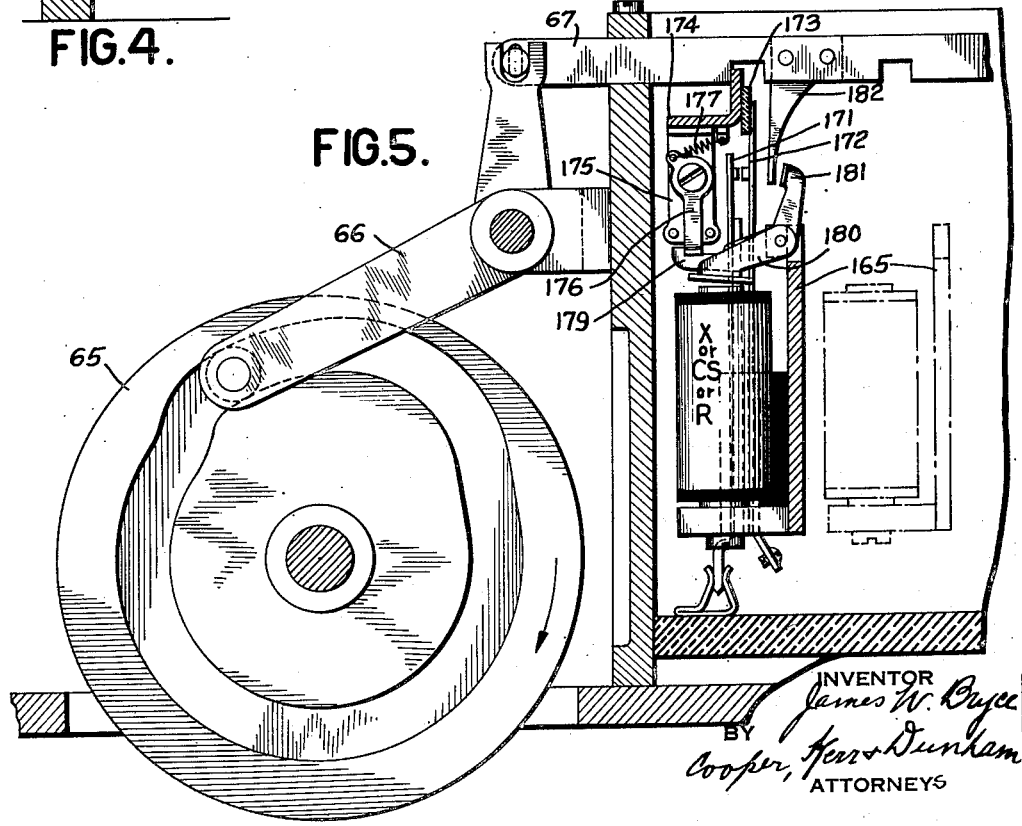
Fig. 5 is a detail sectional and positional view of the multi-contact relay of Fig. 4. The section is taken substantially on line 5—5 of Fig. 4 and shows the parts in preliminary position with the latch preparatory to being electromagnetically tripped and with the strain relieved from the latch point of the latch.

Numerous electro-mechanically controlled and mechanically positioned and restored multi-contact relays are used in the machine. The construction of these relays is shown in Figs. 4 and 5. Suitable side frame plates in the frame of the machine are slotted to receive a number of vertical plates 165. Carried on each plate is a magnet which will be designated CS when the relay is used for column shift purposes and X—1, X—2 and X—3, etc. when the relay is used for multiplier selection purposes and CR when the relay is to be used for simple multiple circuit control purposes. These magnets CS, X or CR when energized, serve to control the establishment or breaking of circuits at the multi-contact points of the relay. The magnets are preferably used as trip magnets only and the armature of these magnets are not required to actually shift their related contacts.

As previously explained the cams 65 shift their respective followers 66 and transversely shift the serrated operating bars 67. Each plate 165 in addition to providing a mounting for the magnets CS, X or CR also affords a mounting for contacts which will be generally designated 171 and 172. Contacts 172 at their upper ends have fastened thereto a strip of insulating material 173, which strip in turn has secured to it an L-shaped member 174. The member 174 has an upper portion which engages into the downwardly extending serrated notches of the serrated bar 67. Member 174 also has downwardly depending from it and fixed thereto a bracket 175, which in turn has pivotally mounted on it a latch member 176. This latch member has slight limited rocking movement between limiting stop pins and is normally urged clockwise by a spring 177. The lower end of the pivoted latch member 176 cooperates with a latch piece 179 fixed to a pivotally mounted armature 180. The armature member 180 also has an upwardly extending tail portion 181 arranged in cooperative relation with a restoring abutment 182 carried upon and depending from the serrated operating bar. With the parts shown in the position of Fig. 5, the cam 65 has shifted its follower 66 and shifted the serrated operating bar 67 to a position in which the contacts 171 and 172 are kept open and to a position in which the strain is removed between the latch 176 and the latch point 179 of the armature assemblage. The relay magnet may now be energized and upon being energized the latch portion 179 will be lowered allowing the latch 176 to trip over the top of the latch point. Thereafter upon further rotational movement of the cam 65, the serrated operating bar 67 moves farther to the left and allows contacts 171 and 172 to close under their own spring action. After a set of multi-contacts have been tripped and closed in the above manner, the operating cycle of the machine ensues and subsequently the cam 65 again shifts its follower, causes the operating bar to take a somewhat larger extent of movement to the right to cause the armature knock-off bracket 182 to intercept 181 and rock the armature assemblage in a clockwise direction to knock off any previously attracted armature. Subsequent movement of the cam allows the serrated operating bar to move back to the position shown in Fig. 5. If a given magnet is not energized, its corresponding armature will not be attracted and the latch member 179 will then prevent a closure of contacts 171 and 172.

In the foregoing description the contacts generally designated 171 and 172 have been described as being normally open contacts. Such contacts either in a complete set or some contacts in a portion of a set may also be of the normally closed type and will be arranged to open up upon the energization of their controlling magnet and upon the shift of the serrated bar. In the subsequent description of the wiring diagram, certain contacts which have been generally designated 171 and 172 in the present mechanical description of the multi-contact relay, will be given designating reference numerals related to their associated control magnets. Thus 1—R 1 to 18 will designate the eighteen contacts controlled by the magnet 1—R, 2—R 1 to 8 will designate the eight multi-contacts controlled by relay magnet 2—R and so on.

Figure 14:
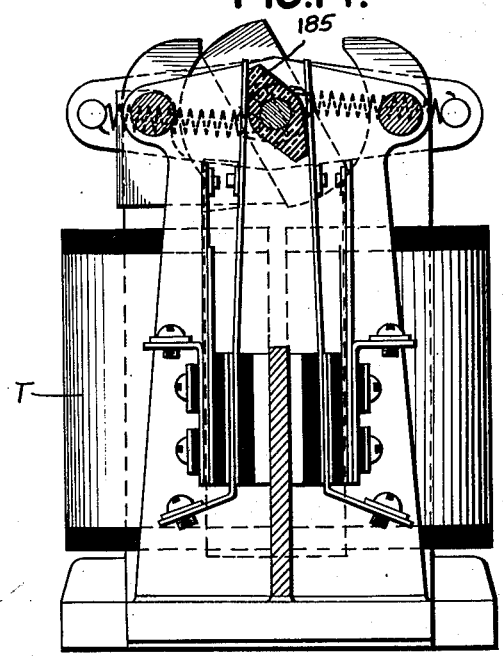
Fig. 14 is an end elevational view of one of the electromagnetic multi-contact relay devices used in the machine.

The purely electromagnetic relay shown in Fig. 14 is substantially of the type shown in United States patent to George F. Daly, No. 1,839,377, dated January 5, 1932. The energization of the electromagnets of such relays are adapted to rock a cam member 185 and closes the related contacts. According to the showing in the Daly patent, three-blade contacts were utilized, but in one of the present embodiments the contacts are simple two-blade contacts arranged to close upon the rocking of the cam 185 by the energization of the electromagnet. In the subsequent description of the circuit diagram such electromagnetic relays will be given designating reference letters which correspond with their contacts. Thus 1—T will designate the relay coil and 1—T 1 to 8 will designate the contacts controlled by the relay coil 1—T and so on.

General operation

Before describing the circuit diagram a brief explanation will be given of the general type of problems which the machine is adapted to handle.

In certain classes of calculating work problems are presented of the following typical forms. There may be a gross amount which is to be entered into the machine and from this gross amount one or more of a plurality of separate discounts are to be deducted. For example, typical computations might involve a gross amount of $52.60 and from this gross amount a discount of 14% should be first taken and the result obtained. A further discount of 9% should be taken from this result and from the second result of this second discounting operation a further discount of say 12% should be taken.

In certain cases no discounts are to be taken and in other cases possibly only one discount is to be taken and in other cases two discounts are to be taken.

The present machine is adapted to handle this class of computations and to automatically adjust itself for a multiple discounting operation or a single discounting operation or any number of multiple discount operations, or in case no discount is to be taken it adjusts itself to eliminate discounting operations altogether.

The machine furthermore accumulates the discount amounts and sets up a sum of the computed discount amounts which have been taken by the operation of the machine. Provision is made for recording back upon the record card from which the gross amount and the various discount percentages were taken, the net amount and the total of the discount amounts. Provision has heretofore been made for taking successive discounts. A means of taking such successive discounts is set forth in my copending application, Serial No. 553,940, filed July 30, 1931. The present machine according to one embodiment functions in a different manner in several respects. According to the previous application the machine operated with a fixed number of discount percentages. According to the present invention a variable number of discount percentages may be handled or no discount percentages may be handled and the machine will automatically adjust its operating cycle accordingly. Discounts of various size can also be taken, i. e. there could be a discount of 9% or 19%.

The present machine furthermore, according to one embodiment of the invention, effects the taking of discounts by so-called complemental multiplication instead of computing the discount by multiplying the gross amount by the complement of the discount. According to the previous application if a discount of say 14% was to be taken, the machine proceeded to convert the 14 into a complement or 86 and then multiplied by 86. According to the first embodiment of the present invention such procedure is not followed, but the machine sets up the discount percentage in true number form and then effects a multiplication of the gross amount by such discount percentage, but in multiplying the partial products which are obtained are in complemetal form. In this way operating time is saved and simplicity of construction is obtained.

The machine is adapted to derive from a card a gross amount and one or several discount percentages. Each discount percentage may comprise one or more orders, e g., a given discount percentage might be 9 or 19. The machine in its operation proceeds by complemental multiplication and first multiplies the original gross amount derived from the record by the first discount percentage to obtain the first net amount. This first net amount is the entered gross amount less the amount of the first discount deduction. The machine then utilizes this first computed net amount as a new gross amount, from which the second discount is to be taken and proceeds by complemental multiplication as before to obtain a second net amount. This procedure is continued until the final net amount has been computed by the operation of the machine. The machine also in carrying out the above computations, is arranged to obtain the total amount of discount deductions. Such total amount of discount deductions is obtained by the machine by subtracting the final computed net amount from the original entered gross amount. Such total amount of discount deductions is automatically set up on the DC accumulator. Finally the machine records back upon the record from which the gross amount and the discount percentage or discount percentages were derived, the final net amount and the total amount of discount deductions.

The machine is so arranged that in the operation of the machine, if any one or several of the discount percentages were zero, the machine eliminates multiplying cycles, but while such cycles are eliminated the machine is still arranged to record back upon the the record the final net amount. In cases where all of the discount percentages were zero, such final net amount would be the same as the originally entered gross amount and also the total of the discount deductions in such instances would be zero.

The machine is also provided with a cycle controller for eliminating multiplying cycles on orders where a zero appears. The cycle controller is modified, however, so that the control may be split to selectively permit the desired machine operations after one discount has been completely computed or after several discounts have been computed. In explanation, in taking several successive discounts pertaining to several different percentages, such as 14%, 9% and 12%, the machine first effects the complemental multiplication by 4 in the units order, then effects complemental multiplication by "1" in the tens order with the proper column shift after the first computing operation. The control then shifts so that the following complemental multiplication by 9 is effected in the units order and so on.

Before describing the detailed operation of the machine by a description of the circuit diagram, it may be explained that if several discounts, such as 14%, 9% and 12% were to be deducted from the original gross amount of $52.60, the machine would first enter into the MC accumulator, the LH accumulator and into the DC accumulator, the gross amount. The several discount percentages would be entered into the MP receiving means or amount manifesting means. Such entry into the MP receiving means would preferably be as follows: 00120914. The machine then automatically proceeds by complemental multiplication to multiply the gross amount by the first discount of 14%. The result of such complemental multiplication is entered by the machine in the LH accumulator, which already has on it the gross amount as derived from the record. This operation leaves standing in the LH accumulator the first net computed amount. The machine then resets the MC accumulator and transfers over the first computed net amount from the LH accumulator to the multiplicand accumulator after the latter has been reset. The machine then multiplies this first computed net amount by complemental multiplication by the amount of the second discount of 9%, and enters the result of the complemental multiplication into the LH accumulator, which now has standing in it the first computed net amount. This operation is continued until the final result is obtained. After completing all of the complemental multiplications there is a transfer over in complemental form of the computed final net amount to the DC accumulator, so that there is an ultimate setup on this accumulator of the total of the discount deductions, it being remembered that the DC accumulator initially had set up upon the original gross amount. The final operation is then to transfer back to the record from which the orginal data was derived, the final computed net amount and the total of the discount deductions.

Hereinafter in the claims the term "discount percentage" will be used for the amounts read off from the card related to discounts. The term "discount amount" will be used to refer to a computed amount based upon a discount percentage rate. Thus for a computation involving $52 less a 10% discount, the computed discount amount would be $5.20. This amount deducted from $52 would give an amount of $46.80, which amount may aptly be termed a "discounted amount". Such discounted amount may be an intermediate net amount or a final net amount.

*Circuit diagram*

With prepunched record cards in the card magazine, the machine is placed in operation by closure of switch 200, which supplies current from a source to motor M. Motor M drives the A. C.—D. C. generator 52. The D. C. generator supplies direct current to buses 201 and 202. The A. C. generator supplies alternating current impulses to bus 203 and to ground. To initiate a card feed, the start key 204 is depressed. This start key must be held depressed for a short duration of time or until the first record card reaches the first sensing position. The closure of the start key contacts energizes relay coil A and the energization of A closes relay points A—1 and A—2 (Fig. 15f). When points A—2 close, the card feed clutch magnet 169 is energized through the following circuit: from D. C. line 201, cam contacts FC—1 now closed, relay points D—1 now closed, relay points A—2 now closed, card feed clutch magnet 169 and back to bus 202. The energization of the card feed clutch magnet starts the card feed.

At the end of the first card feed cycle, the nines index point position of the first record card is about to pass the advance sensing brushes 83 and in this position card lever contacts 89 will be closed. Closure of these card lever contacts will cause energization of relay coil B. The energization of B will close relay points B—1 and establish a stick circuit for relay coil A through relay points A—1 and stop key contacts 205. At the end of this cycle, cam contacts FC—1 which open after a card feed cycle is initiated, become closed and the card feed clutch magnet 169 is again energized. During the next machine or entry receiving means cycle, a second record card will be fed to the first sensing position and the first record card will be advanced to the second sensing position about to pass brushes 84.

At the end of this second card feed cycle, card lever contacts 90 become closed. The closure of these contacts causes energization of relay coil C and the energization of this coil closes relay points C—1. It may be mentioned that the make and break time of card lever contacts 89 and 90 overlap so that as long as cards are in one or both sensing stations relay coil A will remain energized throughout all operations of the machine.

At the end of this second card feed cycle, the card feed clutch magnet 169 is again energized so that another card feed cycle ensues. During this next cycle, the gross amount for example $52.60, and the one or several of the discounts will be read from the record card. The energization of relay coil C, in the manner previously described, closes relay points C—3 (Fig. 15a) in the second card feed cycle. The closure of cam contacts FC—3 causes energization of magnets 1—R, 2—R and 3—R through the following circuit: from A. C. line 203, relay points C—3 and D—2 now closed, cam contacts FC—3 to ground. The energization of 1—R, 2—R and 3—R allows multi-contacts 1—R 1 to 8, 2—R 1 to 8 (Fig. 15d) and 3—R 1 to 8 (Fig. 15e) to become closed during the third card feed cycle. It should be explained that the circuit just described for the energization of multi-contact relay magnets 1—R, 2—R and 3—R is only used when starting up the machine. During a run of succeeding cards when a record card is fed and the factors read therefrom, an auxiliary circuit, which will be described later, is employed to energize magnets 1—R, 2—R and 3—R.

The energization of relay coil C also closes relay points C—2 (Fig. 15a) and establishes a card reading circuit as follows: from A. C. bus 203 (Fig. 15a), relay points C—2 now closed, cam contacts FC—2, which close at the proper time in the cycle, to impulse distributor 206, thence to contact roll 77 and through the index point perforations of the card, to brushes 84 and to plug board 207. Suitable plug connections at the plug board 207 extend to the magnets of the MP entry receiving means designated 208MP, and permit the entry of the discount percentages into the MP entry receiving means in the proper columnar relation therein. The gross amount is concurrently entered in the MC accumulator, the LH accumulator and the DC accumulator. For entering the gross amounts into these various accumulators, a cable 209 is provided, which connects to certain of the sockets of the plug board 207 and extends to multi-contact points (Fig. 15d) which are designated 1—R 1 to 8 and which are now closed, and to the 208MC accumulator magnets. The cable 209 also extends to contacts 2—R 1 to 8 which are now closed, and to the plug board 210 (Fig. 15d), from which proper plug connections extend to the wiring of the 208LH accumulator magnets. The cable 209 also extends to the DC accumulator (see Fig. 15e). Entries into this accumulator are through multi-contacts 3—R 1 to 8 and plug connections at plug board 211 and to the 208DC accumulator magnets.

The foregoing has described the manner in which the discount percentage or discount percentages and the gross amount have been entered into the machine. The discount percentage or discount percentages are entered into the MP receiving means and the gross amount is entered into the MC accumulator, the DC accumulator and the LH accumulator.

After these various amounts have been read from the card, the card passes into the punching section of the machine. In the punching section the card causes the card lever contacts 91 to close (Fig. 15f). Closure of card lever contacts 91 causes energization of relay coil D, opens relay points D—1 and prevents energization of the card feed clutch magnet 169 upon the reclosure of cam contacts FC—1.

The foregoing control of the circuit to the card feed clutch magnet 169 is only used when starting up the machine on a run of cards. After cards are in the punching section the card feed clutch magnet 169 is differently energized, as will be subsequently explained.

The energization of relay coil D opens relay points D—2 (Fig. 15a) to prevent subsequent unwanted energization of magnets 1—R, 2—R and 3—R after starting up a card run. For further cards in a card run, the control of 1—R, 2—R and 3—R is through a different circuit, viz. via relay points A—3 and cam contacts PC—4, as will be subsequently explained.

After the factors which enter into the computation have been read from a card and entered on the various accumulators and receiving means, the machine is ready to set up the cycle controller and to perform the necessary computing operations. The cycle controller is controlled from the MP readout device, which is designated MPRO on the circuit diagram (Fig. 15a). As shown on Fig. 15a, the zero spots of the MPRO readout are wired to the D. C. bus 201 via cam contacts FC—4 and through relay points C—4. In the cycle controlling section of the machine there are a number of relay coils which are respectively designated 1—Yu, 1—Yt, 2—Yu, 2—Yt and so on. The suffixes "u" and "t" designates the related columnar orders, i. e., "u" designates units and "t" designates tens, and the prefixes 1, 2, 3 and so on designate the first discount, the second discount, third discount and so on. All of the Y coils have four sets of relay points associated therewith. In previous cycle controllers there were two sets of relay points associated with each Y magnet. The stick relay points will be designated 1—Yu—1, 1—Yt—1, 2—Yu—1, etc. One set of transfer relay points will be designated 1—Yu—2, 1—Yt—2, etc. In the cycle controllers certain supplemental transfer relay points are also provided. These are shown on Fig. 15b and are designated 1—Yu—3, 1—Yt—3, etc. Another set of relay points associated with the Y magnets are designated 1—Yu—4, 1—Yt—4, etc. The set of relay points with the suffix "1" are the usual relay points for stick circuit purposes to maintain coils Y energized. The set of relay points with the "2" suffix are for column selection and column shift control purposes. The relay points with the "3" suffix are for the purpose of selectively energizing certain T relay magnets. The points with the "4" suffix are for controlling the reset of the multiplicand accumulator and for also controlling the transfer of amounts from the RH to the LH accumulator. The CS relays have their coils shown upon Fig. 15a and are respectively designated CSu and CSt. There are two CSu relay coils and two CSt coils, as shown on Fig. 15a, and such coils control their related sets of column shifting multi-contacts (see Fig. 15c). Each of the multi-point column shift relay units in addition to the usual multi-point column shifting control contacts, has additional contact pairs which will be given the suffix reference numerals 3, 4 and 5, i. e., CSu—3 and CSu—5 are the extra pairs of contacts which are adapted to be closed upon the energization of CSu. CSu—4 are the extra pair of contacts which are adapted to be opened on the energization of CSu and so on for the other CS relays associated with the other columns. Such extra contacts are shown on Fig. 15b.

For purposes of explanation, it will be assumed that the discount percentages which are set up upon the MP receiving means are 12, 09 and 14. The setting of the MP receiving means would accordingly be 00120914. As with previous cycle controllers, when any brush of the MPRO readout stands upon zero, its corresponding Y magnet will be energized. With the foregoing percentages set up the Y magnets which would be energized would be the 2—Yt, 4—Yu and 4—Yt. The manner in which these magnets are energized, is as follows. Late in the card feed cycle in which the amounts were read from the card, cam contacts FC—4 close and with relay points C—4 closed, a circuit will be established from the 201 side of the D. C. line through cam contacts FC—4, relay points C—4 (Fig. 15a) to relay coil N (Fig. 15b) and back to the 202 side of the D. C. line. The energization of relay coil N closes relay points N—1 and establishes a stick circuit for N through MP reset contacts 169, which are now closed. With cam contacts FC—4 closed and relay points C—4 closed, a circuit is also established to the zero spots of the MPRO readout and down through any of the brushes standing on the zero spots of the readout to the corresponding Y magnets. In the present instance the Y magnets which would be energized would be 2—Yt, 4—Yu and 4—Yt. The return circuit from these Y magnets is via wire 213 back to the 202 side of the D. C. line. The energization of the above mentioned Y magnets will close their stick points 2—Yt—1, 4—Yu—1, 4—Yt—1 and will maintain 2—Yt, 4—Yu and 4—Yt relay coils energized through the following circuit—via wire 212, relay points N—1, MP reset contacts 169 to the D. C. bus 201. The energization of the aforesaid Y magnets will have also shifted their cooperating three groups of transfer and control contacts to reverse position from that shown on the circuit diagram. The contacts which will become shifted are as follows: 2—Yt—2, 4—Yu—2, 4—Yt—2 (Fig. 15a) and 2—Yt—3, 4—Yu—3, 4—Yt—3 (Fig. 15b) and relay points 2—Yt—4, 4—Yu—4 and 4—Yt—4.

It may be explained that the 1—T, 2—T, 3—T and 4—T magnets are discount selection magnets. In the illustrated example there are three discount percentages. The first discount of 14% by its presence controls the energization of 1—T, the second discount of 9% by its presence controls 2—T, the third discount 3—T and if there was a fourth discount in the computation there would be a control of 4—T. It may be further explained that the T magnets are energized by the presence of the discount amount and are de-energized upon the absence of the related discount amount. The T magnets are not, however, concurrently energized, but are successively energized as the computation proceeds. With the illustrated example there is a first discount of 14% to be computed and significant figures are present in both orders of the discount. Accordingly, the 1—Yu and the 1—Yt magnets are not energized and the associated transfer contacts 1—Yu—3 and 1—Yt—3 and control contacts 1—Yu—4 and 1—Yt—4 are not shifted. With the cycle controller set up, with reset contacts 169 and relay points N—1 closed, current at the proper time in the cycle of the machine flows from the D. C. line 201 through 169, relay points N—1, through cam contacts CC—1, through contacts 4—R—18, which are normally closed, to relay coil F, back to the other side of the line 202. The energization of F closes relay points F—3 to maintain F energized upon the subsequent opening of cam contacts CC—1. Energization of relay coil F effects closure of relay points F—2, and upon closure of cam contacts CC—2, a circuit is established from the 201 side of the D. C. line through CC—2, CSt—4 and CSu—4, which are now closed, via wire 215, through the 1—Yu—3 contacts down to the 1—T magnet, back via relay points S—2, now closed, wire 216, through relay points F—2, now closed, to the 202 side of the D. C. line. The energization of relay coil 1—T will close the associated stick contacts 1—T—1 to maintain 1—T energized upon the opening of cam contacts CC—2. The return circuit from the stick contacts 1—T—1 is via line 217. With relay coil 1—T energized, the related multi-contact points will have become shifted to reverse position from that shown on the circuit diagram. Such contacts are 1—T—2, 1—T—3, 1—T—4, 1—T—5, 1—T—8 (Fig. 15a) and contacts 1—T—6 and 1—T—7 (Fig. 15b).

The machine has now selected the first discount for computation, the discount selecting magnet pertaining to the first discount, viz. 1—T having been energized. The machine is now ready to multiply the entered gross amount of $52.60 by the first discount of 14%. The multiplication is first made by the amount of 4—this multiplication being made in a complemental manner. With relay coil F energized in the manner previously explained, relay points F—1 (Figs. 15a) become closed and a circuit is established, traced as follows. When cam contacts CC—3 (Fig. 15b) close, current flows from the A. C. bus 203 through relay points F—1, through 1—Yu—2 contacts, through 1—T—4 contacts now closed, through the two CSu magnets, down through the 1—T—2 contacts now closed and out through the MPRO readout to the fourth line of the group of wires designated 214, and down to the X—4 multiplier magnet.

Energization of the X—4 magnet under the control of the MP readout releases the proper contacts of the multiplying panel plate relays MPR (see Figs. 15b, 4 and 1a) and at the proper time in the cycle of the machine, current flows from the A. C. line 203 to the 124 emitter, which is arranged for an emission of impulses complemented to nine, which emitter impresses the impulses on the set of lines generally designated 218, thence through the proper LH and RH relay points of the multiplying relays MPR to the LH lines generally designated 219LH and the RH lines generally designated as 219RH, thence through the MCRO readout, down through the 220RH and 220LH group of lines, through the closed CSu contacts, out to the 221RH and 221LH lines (Fig. 15c) and to the 208RH accumulator magnets (Fig. 15c) and to the 208LH accumulator magnets (Fig. 15d).

The complementary entries of left hand and right hand components of partial products are effected concurrently in the LH and RH accumulators in the customary manner. The entries into the LH and RH accumulators are entries of the nines complement of the partial products. It has been previously explained that emitter 124 is a complemental emitter, i. e., it is so connected in circuit to the lines 218 that on encountering the nine spot on the emitter an impulse is emitted to the nine line of the 218 group. Such nine line is customarily employed on multiplying machines which embody complemental multiplication. The number 8 spot of the 124 emitter is connected to the line of the 218 group designated "8" and so on.

The result of the complemental arrangement of the emitter and of the wiring and contacts of the MPR relays is such that with the emitter in action the amounts which will be emitted through the multiplier plate panel relay contacts instead of being LH and RH components of partial products will be nines complements of the partial products. For example, with a multiplying computation of say 6×4, the impulses which would be directed in the LH and RH accumulators, instead of representing 2 and 4 respectively, would represent 7 and 5, 7 and 5 being the nines complements of 2 and 4.

With complemental multiplication, it is desired that the machine have ultimately entered in the accumulators not the nines complements of the partial products, but the true tens complements of such partial products. This is effected by entering an additional unit amount in each accumulator to bring the nines complement of each partial product to the true or tens complement of such partial product. If all orders of an amount are complemented to 9, this is a 9's complement. If all orders are complemented to 10, this is a 10's complement. If the lowest orders are complemented to 9, and the highest order where significant figures occur are complemented to 10, this is a true complement.

When nines complemental products are produced, nines must be entered into the accumulator devices in columns which would otherwise receive no entry, i. e., if the machine would otherwise introduce a zero entry in a particular column, when complemental operations are being performed, a nine must be entered in that column. The introduction of such nines into such columns of the accumulators is provided for in several ways—first, the multiplicand readout device is employed to direct the entry of nines into columns to the left of the highest significant figure of the multiplicand and in columns of the multiplicand in which zero appears. The entry of nines by the MCRO readout will now be described.

Referring to the circuit diagram (Fig. 15b), a circuit 227 is shown connected to the number 9 spot of emitter 124. Referring now to Fig. 15c, a branch circuit 228 connects to the circuit 227 and extends to the MCRO readout and is electrically wired to all of the zero spots of such readout. Nines representing impulses will be transmitted over the said circuit 227 and 228 to all of the zero spots and through any brushes of the readout standing on zero to the common segments of the readout and nines representing impulses will be transmitted through any columns of the multiplicand readout in which zero appears and also through any columns to the left of the highest significant figure in the readout to the lines generally designated 220RH and 220LH and thence through the circuits previously traced to the LH and RH accumulators.

With complemental multiplication provision must be made to enter nines to the left and right in unused columns of the accumulator. The entry of these nines in these other columns to the left and right is effected by the column shift device. By reference to Fig. 15c, it will be noted that the line 227 which comes from the nine spot on complemental emitter 124 on Fig. 15b, extends down to and is wired to a number of sets of contacts on the column shift relays. These extra eight contacts on their opposite side connect to eight of the 221RH lines, and accordingly, upon the closure of the CSu relay contacts, nines will be entered into the RH accumulator in the eight columns related to and connected with these lines. A similar arrangement is provided for the LH group of lines, but in this instance, provision must be made for entering nines both to the left and right and the contacts are arranged accordingly.

It now remains to explain how the extra one is added into the accumulators so that in place of providing nines complements of the partial products, true or actual complements will be added. The extra spot 229 of the emitter 124 is wired through the CSu—5 and CSt—5 contacts to two magnets designated 222LH and 222RH. These magnets are arranged respectively in the LH and RH accumulators to trip the carry lever latch pertaining to the lowest order wheel of the respective accumulators. Such carry lever latch which is tripped by these magnets is the carry lever latch customarily used in such accumulators (see part 33 in Hollerith Patent No. 974,272). The effect that the tripping of such carry lever latch has upon the operation of the accumulator is to add an extra "one" in the units order of each accumulator, just as if there had been a previous carry from the still lower order in each accumulator. In this way while there is a nines complement of the partial product entered into both the LH and RH accumulators there is also an additional unit of one added in each of the accumulators in the lowest order so that the final entry into the accumulators becomes the true complement instead of the nines complement of the partial product. It may be explained that such entry of the extra "one" into the accumulators is not effected unless CSu—5 and CSt—5 have become closed and such contacts are provided to prevent repeated and unwanted entry of extra "ones".

The foregoing description has explained the manner in which the complementary partial products are entered into the LH and RH accumulators.

The energization of the CS magnets is effected in the customary manner, i. e., when any of the X magnets is energized the CS magnets will be energized, the same being in a series circuit. Upon the complemental multiplication by 4 the CSu magnets are energized to direct the entries in the proper columnar orders of the RH and LH accumulators. The CSu relay is provided with an extra contact pair CSu—3, which closes concurrently with the other contacts of the relay. Upon the closure of this CSu—3 contact, the following circuit is established. From DC bus 201 (Fig. 15b) through MP reset contacts 169, relay points N—1, wire 212, contacts CSu—3, through contact I—T—6 now closed, through relay magnet I—Yu, wire 213, and back to the other side of the D. C. line 202. The energization of I—Yu closes its stick contacts I—Yu—I to maintain the Y magnet energized and also shifts its associate groups of transfer contacts I—Yu—3, I—Yu—2 (Fig. 15b) and contacts I—Yu—4 (Fig. 15a) to the reverse position from that shown in the circuit diagram. The machine is now ready for the complemental multiplication by 1 which is in the tens order of the first discount. On the next multiplying computation the relay points F—I are closed, I—Yu—2 will be in shifted position and current will be diverted over through the I—Yt—2 contacts, which are in the position shown, through contacts I—T—5 to the two CSt magnets, through contacts I—T—3 now closed to the column of the MPRO readout pertaining to the tens order, through the brush of the readout standing on the one spot, through the "1" line of the 214 group, to the X—I multiplying magnet and nines complementary multiplication again ensues.

The machine has now completed the entry of the complement of the product of the first discount by the gross amount into the LH and RH accumulators, the gross amount being previously entered in the LH accumulator, but before proceeding with the operations pertaining to the next discount, certain preliminary operations are performed. The operations which next occur are the following.

There is a transfer over of amounts from the RH accumulator to the LH accumulator and concurrently with this operation and in the same machine cycle, there is a reset of the MC accumulator to remove from such accumulator the original entry of the original gross amount. During the preceding complementary multiplication by "1", contacts CS*t*—3 (Fig. 15b) become closed. With such contacts closed, current flows in the manner previously traced, through the 212 line, through contacts CS*t*—3, through contacts 1—T—7 to the 1—Y*t* magnet and back through wire 213 to the other side 202 of the D. C. line. The energization of 1—Y*t* closes its stick contacts 1—Y*t*—1 to maintain the Y*t* magnet energized and shift the contacts 1—Y*t*—2 and 1—Y*t*—4 (Fig. 15a) and 1—Y*t*—3 (Fig. 15b) to reverse position from that shown on the diagram.

Towards the end of the computing cycle and upon closure of cam contacts CC—4 (Fig. 15a) a circuit is established from the 203 side of the A. C. line to relay points F—1, through the now shifted 1—Y*u*—2 and 1—Y*t*—2 contacts, through the contacts 1—T—8 (now closed) through any one of several of the Y—4 relay points which remain in closed position to the line 230 and to the 223MC reset magnet and relay magnet 4—R, back through cam contacts CC—4 to ground. It may be explained that with further multiplication on other discounts to be performed, that certain ones of the Y—4 contacts will be closed at this time. According to the computation under consideration, contacts 1—Y*u*—4, 1—Y*t*—4, 2—Y*t*—4, 4—Y*u*—4 and 4—Y*t*—4 will be open and contacts 2—Y*u*—4, 3—Y*u*—4 and 3—Y*t*—4 will be closed. The energization of the reset magnet 223MC will cause reset of the MC accumulator. The energization of 4—R will permit the eventual closure of contacts 4—R—1 to 16 and 4—R—17 (Fig. 15d) and will allow contacts 4—R—18 (Fig. 15b) to open. The emitter 125 emits impulses through the right hand readout device RHRO (Fig. 15d) and such impulses flow through the now closed 4—R—1 to 16 contacts, over the transfer lines to the 208LH counter magnets. The entry standing on the RH accumulator is now transferred over to the LH accumulator and the amount which is now standing on the LH accumulator comprises the first net amount which is a deduction of the computed discount amount from the original gross amount.

Upon the brush of emitter 125 encountering an extra spot, a circuit is established through the 4—R—17 contact now closed, to the 223RH reset magnet pertaining to the RH accumulator. The RH accumulator is now reset in the next machine cycle.

It has been previously explained that contacts 4—R—18 become opened. The opening of such contacts causes de-energization of relay coil F (Fig. 15b) and causes opening of relay points F—1 and F—2 (Fig. 15a) and F—3 (Fig. 15b). Opening of relay points F—2 causes the de-energization of the discount selecting magnet 1—T.

Provision is made to prevent premature energization of the 2—T magnet until the machine is ready to effect the multiplication by the following discount. To prevent such premature energization of 2—T or of the other discount selecting magnets, the following interlocking control is provided. Contacts CS*u*—4 and CS*t*—4 are provided in the circuit 215. Such contacts are normally closed contacts, but become open during multiplying operations and do not reclose until multiplying is completed. It may be explained that even if contacts 1—Y*u*—3 and 1—Y*t*—3 have been shifted to reverse position, such shift will not cause energization of 2—T, even if cam contacts CC—2 close because of the interlocking control provided by CS*u*—4 and CS*t*—4.

Upon reset of the MC accumulator in the manner previously explained, reset contacts 168 (Fig. 15b) become closed. Closure of such contacts energizes relay coil S through a circuit traced as follows. From bus 201, through contacts 169, relay points N—1 now closed, through reset contacts 168 (which become closed during the resetting operation) through relay coil S and back to the other side of the line 202. Upon energization of S, stick circuit contacts S—1 become closed and keep S energized. The energization of S also opens up relay points S—2 and cuts off the return circuit from the T magnets.

The machine is now ready to transfer the first computed net amount which is now standing on the LH accumulator, back to the MC accumulator, this latter accumulator having previously been reset to zero. It will be remembered that the net amount is transferred back so that it can be used as a new gross amount for the succeeding computation. This transfer is effected in the following manner. The energization of relay coil S has closed relay points S—3 (Fig. 15d). Upon closure of cam contacts CC—5, the multi-contact plate relay 5—R is energized, permitting subsequent closure of contacts 5—R—1 to 8. With the 5—R—1 to 8 contacts closed, emitter 126 comes into action and emits impulses through one section of the LHRO readout to transfer the amount standing on the LH accumulator to the MC accumulator. The accumulator magnets 208MC of this accumulator are energized in the usual way.

The machine is now ready to multiply the amount now standing on the MC accumulator by the succeeding discount, by complementary multiplication. The energization of relay coil 5—R (Fig. 15d) will have caused the opening of the relay contacts 5—R—9 (Fig. 15b). The opening of these contacts breaks the stick circuit for relay coil S, which becomes deenergized, permitting the opening of relay points S—1 and S—3 and the reclosure of relay points S—2.

During the cycle in which the amounts were transferred from the LH accumulator to the MC accumulator, relay coil F will have become re-energized upon closure of cam contacts CC—1. Energization of F causes closure of relay points F—2 and a return circuit for the T magnets is again established, S—2 having been also closed. Accordingly, upon the closure of cam contacts CC—2 current will flow to the 2—T magnet and the complementary multiplying operation will then proceed with the second discount amount, which in the computation under consideration, is 09. The complementary multiplying computation for the second discount need not be traced in detail, since it is substantially similar to that previously given for the first multiplication.

The machine then proceeds to compute the second discount and the second net amount and then goes on to the third, and so on. When the last discount multiplication has been completed, all of the Y magnets will have become energized and all their related transfer and control contacts will be in shifted position.

With the complete series of computations effected all of the Y—4 contacts, viz. 1—Yu—4, 1—Yt—4, 2—Yu—4, etc. contacts, shown on Fig. 15a, will now be open. Also the 1—Yu—2, 1—Yt—2, 2—Yu—2, 2—Yt—2, 3—Yu—2, 3—Yt—2, 4—Yu—2 and 4—Yt—2 contacts will be in shifted position. Accordingly, a circuit is established from the 203 side of the A. C. line, through relay points F—1 now closed, through shifted Y—2 contacts and eventually through contacts 4—Yt—2 to the 223MP reset magnet and thence through to the 223MC magnet, the 4—R magnet and back to ground through cam contacts CC—4.

It may be explained that in the diagram the cycle controller and discount selecting device are shown to handle four discounts, each discount comprising up to two columns. The wiring of the machine is such that a less number of discounts may be computed and the computation will be accordingly shortened, e. g. if a first discount and a fourth discount only were to be taken, the 1—T and the 4—T discount selecting magnets only would be energized in succession and there would be no energization of 2—T and 3—T and the machine would not perform idle cycles on such absent discounts. Likewise, if only the first and second discounts were to be taken, 1—T and 2—T would only be energized in succession and immediately following the taking of the second discount, the machine would proceed on the operations which follow the taking of the last discount. In other words, the discount device is selective in its operation according to the number of discount factors which were obtained from the original record. The cycle controller also eliminates idle cycles with zeros appearing in the discount.

The energization of 223MP resets the MP receiving device in the usual way and there is also a resetting of the MC accumulator by the energizing of 223MC which is in series with 223MP. Also relay coil 4—R is energized. The closure of 4—R brings about the final RH to LH transfer.

As has been explained before, it is desired that the machine obtain the total of discount deductions. This total of discount deductions is obtained by subtracting the final computed net amount from the originally entered gross amount. Accordingly, provision is made to transfer over the amount finally standing on the LH accumulator in inverted and complementary form to the DC accumulator, which accumulator in the early part of the computation, received the original gross amount. Such transfer for subtracting purposes is effected in the following manner. Upon reset of the MP accumulator, contacts 170 become closed, causing energization of relay coil 6—R with the following subsequent closure of the multi-contact points 6—R 1 to 16. With the last mentioned multi-contacts closed, the emitter 127 will emit impulses through the IVRO readout section of the LH accumulator and such impulses will flow over and energize the accumulator magnets 208DC pertaining to the DC accumulator. Accordingly, the complement of the amount standing on the LH accumulator will be entered into the DC accumulator, with the result that the final amount standing on the DC accumulator will represent the subtraction of the final computed amount from the original gross amount, or the total of the computed discounts or discount deductions. During reset of the MP accumulator, contacts 169 (Fig. 15b) open to break the control of the cycle controller by de-energization of coil N. Also all the Y controlling magnets are de-energized at this time.

The machine is now ready to punch back upon the record from which the data entered into the computation was derived, the final net amount and the sum of the computed discounts. Provision is therefore made for calling the punch clutch magnet 190 into operation. This is effected in the following manner. The energization of relay coil 10 6—R will bring about subsequent closure of contacts 6—R—17 (Fig. 15f). Accordingly, upon closure of cam contacts CC—6, relay coil E and punch clutch magnet 190 will become energized. The energization of E will close relay points E—1 and will establish a stick circuit for E and the punch clutch magnet 190 through cam contacts PC—1 now closed. The punching section of the machine now is set into operation. It may be explained that the operation of the punching mechanism consumes two machine cycles. During the first cycle the final computed net amount standing upon the LH accumulator will be read out to control the setting of the punch selectors by energization of the punch selector magnets 113. During this first machine cycle, emitter 120 (Fig. 15d) which is driven from the punch drive shaft, will emit impulses from one section of the LHRO readout device and such impulses will flow through cable 224 (Fig. 15e) via plug connections at plug board 225 to the plugged up punch selector magnets 113. It may be explained that the circuit of emitter 120 is completed through cam contacts PC—5, which close during this part of the cycle of operation of the punching mechanism. Concurrently with the emission of impulses through the section of the LHRO readout device by emitter 120, emitter 121 (Fig. 15c) will come into action, current being supplied to this emitter by closure of cam contacts PC—6. Impulses flow through the 121 emitter to the plug board 225 and through the plug connections at a section of this plug board to other of the punch selector magnets 113. The energization of the punch selector magnets will have controlled the position of the punch interposers for subsequent punching of the final computed net amount and the accumulation of computed discounts or discount deductions. After the set up of the interposers is completed, cam contacts PC—3 (Fig. 15e) close, causing energization of the 223LH and the 223DC reset magnets, the LH accumulator and the DC accumulator accordingly becoming reset in the usual way. The actual resetting of these accumulators occurs during the second cycle of operation of the punching mechanism. The actual punching of the amounts on the card occurs at the time shown in the timing diagram (Fig. 16a). After punching, the interposers are restored to normal position in the usual way and late in this cycle cam contacts PC—2 (Fig. 15f) close. The closure of these contacts is adapted to reinitiate a new card feed and cause the previously punched card to be withdrawn and discharged and a new card to be advanced, read and introduced into the punch. The card feed clutch magnet 169 becomes energized upon closure of cam contacts PC—2, relay points A—2 being now closed.

It has been previously explained that in order to read the gross amount into the LH, MC and DC accumulators, that relay coils 1—R, 2—R and 3—R should be energized. Upon a run of cards such magnets are energized through the following circuit.

Referring to Fig. 15a, with relay points A—3 closed, upon closure of cam contacts PC—4, current will be supplied from the 203 side of the A. C. line to the 1—R, 2—R and 3—R magnets. When computing and punching operations have been performed on the last card of a run of cards, the relay coil A (Fig. 15f) will not become energized because relay coils B and C have become de-energized because of the opening up of card lever contacts 89 and 90. Accordingly, upon completion of punching of the last card, when cam contacts PC—2 close the card feed clutch magnet 169 will not become energized since relay points A—2 are now open. Likewise, the opening of contacts A—3 (Fig. 15a) will prevent energization of 1—R, 2—R and 3—R when cam contacts PC—4 close. Accordingly, supplemental provision is made for reinitiating card feed to remove the last card from the die of the punching mechanism. Such supplemental control comprises an auxiliary start key 204a (Fig. 15f) which, when depressed, causes energization of card feed clutch magnet 169, so that the last card can be fed out of the machine to the discharge stack. It has been previously mentioned that if all the discounts read from a card were zero, that unnecessary idle multiplying operations would be eliminated. When all of the discounts are zero, the amounts set up in the MP accumulator will be zero in all orders. Accordingly, when the cycle controller is set up all of the Y magnets will be energized concurrently and all of the related transfer contacts will be concurrently shifted to reverse position from that shown on the circuit diagram.

Following the setup of the cycle controller with all Y magnets concurrently energized, relay coil F (Fig. 15b) becomes energized in the manner previously explained and causes closure of points F—1, so that the current can flow from the 203 side of the A. C. line through all of the shifted Y—2 set of contacts and finally through 4—Yt—2 contacts (Fig. 15a) down to the 223MP reset magnet and the 223MC reset magnet to the 4—R relay magnet, through cam contacts CC—4 to ground. The machine then immediately performs operations which are similar to those described as following the obtaining of the final computed result when discounts are present, i. e. there is an immediate RH and LH transfer and a reset of the MP and MC accumulators and following these operations there is a transfer from the LH accumulator to the D. C. accumulator and a reset of the RH accumulator. Following these operations there is a punching operation and since no discounts are present and none has been computed, the machine punches back zeros in the field of the card which is to receive the sum of the discount deductions and in the computed net amount field there is a punching back of the original gross amount.

Only brief reference may be made to the timing diagram. It may be explained that for purposes of compactness, the timing diagram has been shown for a computation involving only two discount amounts of a single significant figure, because of the excessive length of the diagram which would be required for a more extensive computation. Referring to the timing diagram Fig. 16, the first two counter cycles delineated are those which were used in setting up the machine on a run of cards. These two cycles are the cycles requisite to get the first card up to the reading station. The third counter cycle delineated is the card reading cycle in which the amounts are entered from the card into the entry receiving means and accumulators of the machine. After having started up the machine on a run of cards, the last cycle as shown on Fig. 16a is followed by the beginning of the third cycle as shown on Fig. 16.

The circuit diagram shown on Figs. 15a to 15f inclusive and which was previously explained related to the embodiment of the invention wherein computation was made by complemental multiplication, that is to say the true amount of a discount was read out from the discount entry receiving device and during the multiplying operation the product which was derived by the multiplying operation was converted into a complemental product. In lieu of effecting computations in this manner the machine may effect its computations by reading out from the discount entry receiving device the complement of the discount and thereafter effecting straight multiplication by such complement of the discount. In this embodiment of the invention the entry cycles are somewhat modified. According to the previously described embodiment of the invention the gross amount was entered from the record card into the MC, LH and DC accumulators. According to the alternative embodiment of the invention the gross amount is entered only into the MC accumulator and the DC accumulator, no entry being made into the LH accumulator.

According to the previously described embodiment of the invention the computations were effected by subtracting a product from the entered gross amount whereas in the alternative embodiment of the invention the computed net amounts are obtained directly by multiplication by the complement of the discount or discounts.

Before describing the circuit diagram of the alternative embodiment shown on Figs. 17a to 17f inclusive, it may be explained that the circuit diagram generally follows the diagram shown in Figs. 15a to 15f inclusive with certain exceptions which will be here noted. Parts which are alike on both diagrams will be given similar reference numerals and the description of these like parts will not be repeated in toto in the description of the alternative diagram. The principal changes in the two diagrams are as follows.

On Fig. 17a which generally corresponds to Fig. 15a, the 2—R relay control magnet has been removed. The lines 214 shown on Fig. 15a as extending directly to the multiplier relay magnets on Fig. 15b, have been modified to extend through certain controlling contacts designated 5—T—1 to 10. Such contacts are provided for reading out true complementary amounts from the amount standing upon the MP receiving device. The wiring of the MPRO readout with respect to the zero spots has been somewhat modified and normally closed relay points F—4 to F—7 have been placed in the supply lines to certain of the zero spots. The previously unwired zero spots in Fig. 15a have now been wired to the 5—T—1 to 10 contacts. On Fig. 17a one of the CSu and CSt coils has been eliminated.

On Fig. 17b, which generally corresponds to Fig. 15b, certain supplementary contacts and relay points have been provided, the same being designated 1—T—9, 2—T—9, 3—T—9 and 4—T—9. A supplemental contact controlled by a column shift control relay magnet in the units order has been provided designated CSu—6. Supplemental relay points 5—T—11 have been provided controlled by a relay coil 5—T which coil also controls the shift of the 5—T—1 to 10 contacts shown on Fig. 17a. The 5—R—9 contacts shown on Fig. 15b have been replaced by LH reset contacts 240 which are opened upon the reset of the LH accumulator and which contacts and the operating means therefor are shown in dotted lines on Fig. 1. In the lines leading from the common segments of the MPRO readout to the 1—Yt, 2—Yt, 3—Yt and the 4—Yt magnets, certain supplemental relay contacts have been provided which are designated 1—Yu—5, 2—Yu—5, 3—Yu—5 and 4—Yu—5 on Fig. 17b.

The unwired contact blade of the 4—Yt—3 contacts on Fig. 15b has been wired up to a relay coil designated 6—T and stick relay points 6—T—1 have been provided. In Fig. 17b the multiplying control relay contacts have been changed in their wiring for emitting straight multiplication representing impulses instead of complements of partial products. The emitter designated 124 on Fig. 15b has been changed from a complemental emitter to a straight emitter and has been designated 124a. The wiring to the extra spot 229 of the emitter on Fig. 15b through certain contacts and to magnets for controlling the introduction of an extra one into the LH and RH accumulators has been eliminated. Wire 227 on Fig. 15b has been eliminated on Fig. 17b.

Referring now to Fig. 17c the wire 227 shown on Fig. 15c has been eliminated and all of the contacts controlled by the column shift magnet wired to this 227 line have been eliminated. The wire 228 leading to the zero spots of the MCRO readout on Fig. 15c from the 227 line has been eliminated on Fig. 17c. Plug boards 245 and 246 have been provided on Fig. 17c intermediate its column shift contacts and LH and RH accumulator magnets 208RH and 208LH.

Inasmuch as in the modified embodiment no entry of the original gross amount is made into the LH accumulator the contacts 2—CR 1 to 8 and the plug board 210 shown on Fig. 15d have been wholly eliminated on Fig. 17d. In the circuit leading to the 5—R magnet on Fig. 15d, the RH reset control contacts 241 have been provided on Fig. 17d. Such contacts 241 are shown in dotted lines on Fig. 1 and are adapted to be opened on reset of the RH accumulator.

The circuits on Fig. 15e which lead to the 223LH and 223DC reset magnets have been modified on Fig. 17e by providing contacts 6—R—18 and RH reset contacts 242 in one branch of the circuit leading to the circuit to the 223LH magnet and in the circuit leading to the 223DC magnet contacts PC—3 have been provided, the 223DC coil and the 223LH coil being in series relation with the PC—3 contacts instead of having the coils 223LH and 223DC in parallel as in Fig. 15e.

In place of having the DCRO readout and the 224 cable extend directly to one side of a plug board 225 as shown on Fig. 15e, intermediate three-blade contacts 8—T—1 to 16 and 7—T—1 to 16 have been provided to provide for a diagonal shift of the entries under certain conditions in the operation of the machine as will be hereinafter described. In view of the introduction of these contacts on Fig. 17e, the punch selector magnets 113 and the associated plug board 225 have been transposed from the bottom of the e sheet to the top of the f sheet.

On Fig. 17f, which generally corresponds to Fig. 15f certain supplemental control circuits and contacts have been provided including relay coils 7—T and 8—T and cam contacts PC—7. The supplemental contacts PC—7 are shown in dotted lines on Figs. 1a and 3.

On the timing diagram, Figs. 18 and 18a, an extra cycle has been introduced following the fifth running cycle. On Figs. 16 and 16a the first two counter cycles delineated on Fig. 16 are the counter cycles upon starting up a card run. The following ten counter cycles delineated, the first three of which are in Fig. 16 and the last 7 of which are in Fig. 16a, are counter cycles upon running of a continuous card run. In the modified diagram shown on Figs. 18 and 18a, the starting up of card run cycles has not been shown as these are the same as the starting up cycles shown on the other timing diagram on Fig. 16. In addition an extra cycle has been shown on Fig. 18a, which cycle follows the fifth running counter cycle in the machine. This extra cycle is provided in order to effect the reset of the LH accumulator.

Before explaining in more detail the operation of the modified embodiment of the machine shown in the diagram, Figs. 17a to 17f, inclusive, it may be explained that if the several discounts such as 14%, 9% and 12% were to be deducted from the original gross amount of $52.60, the machine would first enter into the MC accumulator and into the DC accumulator the gross amount of $52.60. The several discount percentages would be entered into the MP entry receiving device as before. The machine then proceeds to read out the complements of the discount percentages standing in the MP entry receiving device. The first discount is 14%, accordingly, in place of multiplying by 14 by complemental multiplication as in the other embodiment, the machine reads out in place of 14 from the MP entry receiving device, the amount of 86 which is the complement of 14 and then proceeds by straight multiplication to multiply the gross amount by such complementary amount of 86. This multiplying operation finally enters into the LH accumulator the first net computed amount. The machine then resets the MC accumulator and transfers over to it the first computed net amount from the LH accumulator. There is then a further multiplication of this first computed net amount by the complement of the second discount or by 91. The product of such multiplication finally appears in the LH accumulator which LH accumulator previously was reset before the entry of the product thereinto. The LH accumulator now has standing upon it the second computed net amount. This kind of an operation is continued until the final net amount is obtained. After completing all of the discounting operations there is a transfer over of the final net amount finally standing upon the LH accumulator in complemental form to the DC accumulator so that there is an ultimate setup on this accumulator of the total of the discount deductions as before. It will be remembered that the DC accumulator initially had set up upon it the original gross amount. The final operation is to transfer back to the record from which the original data was derived, the final net computed amount and the total of the discount deductions.

In the operation of the modified embodiment of the machine, the starting up of the machine operation is accomplished in the same manner as previously explained for the other embodiment of the invention. As previously explained the card feed clutch magnet 169 is again energized at the end of the second card feed cycle so that another card feed may ensue and during the next cycle the gross amount, for example $52.60, and one or several of the discounts will be read from the record card. The energization of relay coil C in the manner explained for the other diagram, closes relay points C—4 (Fig. 17a) in the second card feed cycle. The closure of cam contacts FC—3 causes energization of the magnets 1—R and 3—R through the same circuits which previously energized magnets 1—R, 2—R and 3—R. The energization of 1—R and 3—R allows multi-contacts 1—R—1 to 8 (Fig. 17d) and 3—R—1 to 8 (Fig. 17e) to become closed during the third card feed cycle.

The card reading circuit is established as before and the several discounts are entered into the MP receiving device as before. The gross amount is concurrently entered into the MC and the DC accumulators, no gross amount however, being entered into the LH accumulator.

In the present embodiment the cable 209 extends only to the DC and MC accumulators and does not provide for any entries into the LH accumulator. As before after the amounts have been read from the card, the card passes into the punching section of the machine, closes card lever contacts 91, energizes relay D, opens points D—1 to prevent energization of the card feed clutch magnet 169, etc. Energization of D also opens relay points D—2 (Fig. 17a) to prevent subsequent unwanted energization of 1—R and 3—R after starting up.

The cycle controller is controlled from the MPRO readout (Fig. 17a). As shown on Fig. 17a, certain of the zero spots of this MPRO readout are wired to the DC bus 201, via cam contacts FC—4 and through relay points C—4 and relay points F—4. The cycle controller relay coils 1—Yu, 1—Yt, 2—Yu, 2—Yt and so on are provided as before. The suffixes u and t designate the related columnar orders, i. e. u designates units and t designates tens and the prefixes 1, 2, 3 and so on designate the first discount, the second discount, the third discount and so on. Certain of the Y coils, viz. those which pertain to the units order and which are designated with the suffix u have five sets of relay points associated therewith and those of the Y coils which are associated with the tens order and which are provided with the t suffix, have four sets of points. The stick relay points are designated 1—Yu—1, 1—Yt—1, 2—Yu—1, etc. Certain transfer relay points are designated 1—Yu—2, 2—Yt—2, etc. Other points are designated 1—Yu—3, 2—Yt—3 and so forth. Other points are designated 1—Yu—4, 1—Yt—4, etc. The supplemental and extra relay points which are used in the present embodiment are designated 1—Yu—5, 2—Yu—5, 3—Yu—5, etc. The set of relay points with the suffix 1 are the usual relay points for the stick circuit purposes to maintain the Y coils energized. The set of relay points with the suffix 2 are for column selection and column shift purposes and those relay points with the suffix 3 are for the selective energization of certain T magnets. Those with the suffix 4 are for the selective control of the accumulator reset magnets and for controlling the transfer of amounts from the RH to LH accumulator. The set of points with the suffix 5 and which are associated with the units order Y magnets are for controlling the energization of the Yt magnets under certain types of entry operations. For example, if a given discount be 09 the cycle controller would ordinarily assume that the 0 order would be skipped in the computing operation. However, the complement of 09 is 91 and accordingly with 09 standing upon the MPRO readout the tens order should not be skipped but should be computed and before this computation is made there should be an energization of Yt at the proper time. These extra contacts with the 5 suffix permit such control. The column shift relays have their coils shown on Fig. 17a and such column shift relay coils are respectively designated CSu and CSt. The CSu and CSt magnets have additional contact pairs with the suffix reference numerals 3 and 4, i. e. CSu—3, CSu—4, CSt—3 and CSt—4 and are adapted to be closed upon the energization of their associated coils and CSu—4 and CSt—4 are adapted to be opened upon the energization of their associated coils. The CSu magnet also has extra contact pairs controlled thereby designated CSu—6 and such contacts are adapted to be closed upon the energization of their associated coil CSu.

With the various discount amounts set up on the MP receiving device, certain brushes of the readouts may stand upon zero spots and others may stand upon significant figure spots. With the amount of 00120914 set up upon the MPRO readout the cycle controller must take into account the first two zeros in the set up and it must also take into account that the intermediate zero preceding the 9 represents an order in which computation must not be skipped but in which a multiplication by a complemental amount of 9 must occur. Accordingly, with the foregoing amounts standing on the MP entry receiving device the Y magnets which would be energized would be the 4—Yu and 4—Yt magnets. The 2—Yt magnet would not be energized because the 2—Yu—5 relay points would be open to interrupt the circuit leading to the brush standing on the related zero spot. The manner in which the 4—Yu and 4—Yt magnets are energized is as follows. Late in the card feed cycle in which amounts were read from the card cam contacts FC—4 close and with relay points C—4 closed a circuit will be established from the 201 side of the D. C. line through FC—4, C—4 (Fig. 17a) to relay coil N (Fig. 17b) and back to the D. C. line 202. Energization of N closes N—1 and establishes a stick circuit for N through the 169 contacts now closed. With FC—4 and C—4 and F—4 closed, a circuit is also established to one set of zero spots of the MPRO readout and down through any of the brushes standing on these zero spots to the corresponding Y magnets except to the 2—Yt magnet. The circuit to this magnet is interrupted by the open points 2—Yu—5. Both 4—Yu and 4—Yt would be energized, 4—Yu being energized because its brush stands on a zero spot and 4—Yt being energized because its brush stands on a zero spot and also because 4—Yu—5 has become closed by the energization of 4—Yu. In explanation, assume three discount amounts, one of 00, one of 09 and one of 10. In the first instance with double zeros, computing would be completely suppressed, in the second instance with 09, the complement of this discount would be 91 and computing would not be suppressed in the tens order, in the third instance with the discount of 10, the complement is 90 and computing is suppressed in the units order but permitted in the tens order. With 4—Yu and 4—Yt energized their associated stick points 4—Yu—1 and 4—Yt—1 will be closed and maintain the coils energized through a circuit, via wire 212, relay points N—1, contacts 169 to the bus 201. The energization of the aforesaid Y magnets will have shifted their supplemental control contacts to reverse position from that shown on the circuit diagram. Such contacts which become shifted are as follows—4—Yu—2, 4—Yt—2, (Fig. 17a), 4—Yu—3, 4—Yt—3 (Fig. 17b), 4—Yu—4 and 4—Yt—4 (Fig. 17b) and 4—Yu—5.

As in the previous embodiments the magnets 1—T, 2—T, 3—T, 4—T are discount selection magnets. In the present embodiment supplemental control magnets 5—T, 6—T, 7—T and 8—T are provided. In the illustrative example, the first discount amount of discount of 14 by its presence controls the energization of 1—T. The second discount of 09 by its presence controls 2—T, the third discount 3—T and if there was a fourth discount in the computation there would be a control of 4—T. The lines 214a which extend to the MPRO readout spots are connected to the 214b lines which extend to the X—1 to 9 multiplying relay magnets through contacts 5—T—1 to 10. With these contacts in the position shown in the circuit diagram there is a complement to tens connection intermediate the MPRO readout and the X—1 to 9 multiplier relay magnets, that is a number 2 spot on the MPRO readout connects to an 8 multiplying magnet, a 3 spot to a 7 magnet and so on. With the 5—T—1 to 10 contacts shifted to reverse position from that shown on the circuit diagram under the control of the energization of coil 5—T there is an interconnection between the MPRO readout and the X—1 to 9 multiplier magnets in the nines complementary relation, that is the 2 spot of the MPRO readout would connect to the X—7 magnet and so on. The purpose of the 6—T, 7—T and the 8—T magnets will be subsequently explained. The 1—T, 2—T, 3—T and 4—T magnets are energized by the presence of a discount amount and are de-energized upon the absence of a related discount amount. Such coils are successively energized as the computation proceeds and are not energized concurrently. With the illustrative example, with the first discount of 14 to be computed, significant figures are present in both orders of the discount. Accordingly, the 1—Yu and 1—Yt magnets are not energized and the associated transfer contacts 1—Yu—3 and 1—Yt—3 are not shifted. With the cycle controller set up and cam contacts 169 and relay points N—1 closed, current will flow from the D. C. line through 169, N—1, CC—1, through contacts 4—R—18 to relay coil F and back to line 202. The energization of F closes relay points F—3 to maintain F energized upon a subsequent opening of cam contacts CC—1. Energization of F effects closure of relay points F—2 and upon closure of cam contacts CC—2 a circuit is established from the 201 side of the line through CC—2, CSt—4 and CSu—4 (now closed) via wire 215, through the 1—Yu—3 contacts down to the 1—T magnet back via relay points S—2 now closed, wire 216, through relay points F—2 now closed to the 202 side of the D. C. line. Energization of relay coil 1—T closes stick contacts 1—T—1 and causes the related multi-contact points 1—T—2 to 1—T—9 to shift to reverse position. The energization of relay coil F will also open up relay points F—4 to F—7 for a purpose to be hereinafter explained.

The machine has now selected the first discount for computation, 1—T having been energized, and it is ready to reduce the first gross amount of 5260 by the complement of the first discount, the first discount being 14, the complement is 86. With relay coil F energized, relay points F—1 (Fig. 17a) become closed and when CC—3 (Fig. 17b) closes current flows from 203 through F—1, through the 1—Yu—2 contacts to 1—T—4 contacts through the CSu magnet down through the 1—T—2 contacts now closed and out through the MPRO readout to the fourth line of the group of wires designated 214a, through the 5—T—4 contact in the position shown, to the line of the 214b group which extends to the X—6 multiplying relay magnet. At the proper time in the cycle current flows from the AC line 203 to the 124a emitter, which is arranged for the usual emission of impulses and which impress the impulses on the set of lines generally designated 218, thence through the proper LH and RH relay points of the X—6 multiplying relay generally designated MPR to the LH lines designated 219LH and to the RH lines 219RH, thence through the MCRO readout down through the 220RH and 220LH group of lines through the closed CSu contacts and out to the 221RH and 221LH lines (Fig. 17c) and through plug connections at plug boards 246 and 245 and to the 208RH magnets (Fig. 17c) and to the 208LH magnets (Fig. 17d). Concurrent entries of left hand and right hand components of partial products are effected in the RH and LH accumulators in the usual manner. The energization of the CSu magnet is effected in the customary manner, i. e. when any of the X magnets are energized, the CS magnet will be energized, the same being in a series circuit. Upon the multiplication by the amount in the units order of the first discount, the CSu magnet is energized to direct the entries in the proper columnar orders of the RH and LH accumulators. The CSu relay has contacts CSu—3 which close concurrently with the other contacts of the relay and establish the following circuit: from DC bus 201 (Fig. 17b) through the MP reset contacts 169, relay points N—1, wire 212, contacts CSu—3, through contact 1—T—6 now closed, through relay magnet 1—Yu, wire 213 and back to the other side of the DC line 202. Energization of 1—Yu closes stick contacts 1—Yu—1 and shifts transfer contacts 1—Yu—2 (Fig. 17a) and 1—Yu—3 (Fig. 17b), contacts 1—Yu—4 (Fig. 17a) and 1—Yu—5 (Fig. 17b) to the reverse position from that shown in the diagram.

During multiplication in the units order, contacts CSu—6 (Fig. 17b) will close. Such contacts upon closure establish a circuit to energize relay magnet 5—T, the circuit being as follows: through wire 212, via contacts 1—T—9 now closed, through CS—u—6 now closed, through magnet 5—T and back via wire 213 to the other side of the line. The energization of 5—T brings about a shift of the contacts 5—T—1 to 10 prior to the entry upon the next computing cycle pertaining to the tens order so that upon the next multiplication by the amount in the tens order the connection between the MPRO readout and the X multiplying magnets will be complemented to 9 instead of to 10 as before. The energization of 5—T closes points 5—T—11 to establish a stick circuit for 5—T to hold 5—T energized upon the opening of CSu—6. Upon the next multiplying computation in the tens order, relay points F—1 are closed and 1—Yu—2 will be in shifted position and current will be diverted over through 1—Yt—2 contacts which are in the position shown through contacts 1—T—5 to the CSt magnet through contacts 1—T—3 now closed to the column of the MPRO readout pertaining to the tens order, to the brush of the readout standing on the one spot through the "1" line of the 214a group, through the 5—T—1 contact now in shifted position, through the 8 line of the 214b group to the X—8 multiplying magnet. Multiplication by 8 will proceed as before.

The machine has now completed the entry of the product of the complement of the first discount by the gross amount into the LH accumulator and the RH accumulator. Before proceeding with the operations pertaining to the next discount, certain preliminary operations are performed.

There is a transfer over of amounts from the RH to the LH accumulator and concurrently with this operation and in the same machine cycle, there is a reset of the MC accumulator to remove from such accumulator the original entry of the initial gross amount. During the preceding multiplication by "8" contacts CSt—3 (Fig. 17b) became closed. With such contacts closed, current flows in the manner previously traced through the 212 line (Fig. 17b), through contacts CSt—3, through contacts I—T—1 to the I—Yt magnet and back through wire 213 to the 202 side of the D. C. line. The energization of I—Yt closes its stick contacts I—Yt—I to maintain the Yt magnet energized and shift the contacts I—Yt—2 and I—Yt—4 (Fig. 17a) and I—Yt—3 (Fig. 17b) to reverse position from that shown in the diagram.

Toward the end of the computing cycle in the tens order and upon closure of cam contacts CC—4 (Fig. 17a) a circuit is established from the 203 side of the A. C. line through relay points F—I, through the now shifted I—Yu—2 and I—Yt—2 contacts, through the contacts I—T—8 now closed, through any one of the several Y—4 relay points which remain in closed position to the line 230 and to the 223MC reset magnet and 4—R and back through cam contacts CC—4 to ground.

It may be explained that with further multiplication to be performed on other discounts, that certain ones of the Y—4 contacts will be closed at this time. According to the computation under consideration contacts I—Yu—4, I—Yt—4, 4—Yu—4 and 4—Yt—4 will be opened, and contacts 2—Yu—4 and 2—Yt—4, 3—Yu—4 and 3—Yt—4 will be closed. The energization of the reset magnet 223MC will cause reset of the MC accumulator in the customary way. The energization of 4—R will permit the eventual closure of contacts 4—R—I to 16 and 4—R—17 (Fig. 17d) and will allow contacts 4—R—18 to open. The emitter 125 emits impulses through the right hand readout device RHRO (Fig. 17d) and such impulses flow through the now closed 4—R—I to 16 contacts, over the transfer lines to the 208LH accumulator magnets and the entry standing on the RH accumulator is transferred over to the LH accumulator, the amount finally standing on the LH accumulator comprising the first net computed amount, which net computed amount represents the original gross amount less the amount of the first discount.

Upon the brush of emitter 125 encountering an extra spot, a circuit is established through 4—R—17 to the 223RH reset magnet to initiate reset of the RH accumulator in the customary manner. The opening of contacts 4—R—18 as previously explained cause de-energization of relay coil F (Fig. 17b) and causes opening of relay points F—I and F—2 (Fig. 17a) and reclosure of F—4 to F—7 inclusive, and opening of F—3 (Fig. 17b). Opening of relay points F—2 causes the de-energization of the discount selecting magnet I—T.

Provision is made to prevent premature energization of the 2—T magnet until the machine is ready to effect a multiplication by the following discount. To prevent such premature energization of 2—T or of the other discount selecting magnets, the following interlocking control is provided. The contacts CSu—4 and CSt—4 are provided in the circuit 215 and are normally closed but become open during multiplying operations and do not reclose until multiplying is completed. Even if contacts I—Yu—3 and I—Yt—3 have been shifted to reverse position such shift will not cause energization of 2—T even if contacts CC—2 close because of the interlocking control provided by CSu—4 and CSt—4.

Upon the reset of the MC accumulator, reset contacts 168 (Fig. 17b) become closed and cause energization of relay coil S through a circuit traced as follows: from 201, through 169, through S and back to 202. Upon energization of S stick circuit contacts S—I become closed and a stick circuit is established through S—I, LH reset contacts 240 now closed, back through wire 243, through relay points N—I, reset contacts 169, to D. C. line 201. The energization of S also opens up relay points S—2 and cuts off the return circuit from the T magnets.

The machine now transfers the first computed net amount in the LH accumulator back to the MC accumulator, which accumulator had previously been reset so that the first computed net amount can now be used as a new gross amount for the succeeding computation. This is effected as follows. The energization of S closes relay points S—3 (Fig. 17d) and upon closure of cam contacts CC—5, the multi-contact relay 5—R is energized, the circuit being through RH reset contacts 241 which are now closed. Energization of 5—R permits subsequent closure of contacts 5—R—I to 8 and with these contacts closed and with emitter 126 in action impulses are emitted through one section of the LHRO readout to transfer the amount standing on the LH accumulator to the MC accumulator. Magnets 208MC of this accumulator are energized in the usual manner.

Before beginning the computation pertaining to the second discount, the LH accumulator which now has standing on it the computed first discount amount, must be reset, such reset is brought about in the following manner. During the reset of the RH accumulator contacts 242 (Fig. 17e) become closed and with contacts 6—R—18 closed a circuit is established from the 203 side of the A. C. line to the 223LH reset magnet. Energization of 223LH resets the LH accumulator in the customary manner. During the reset of the LH accumulator reset contacts 240 (Fig. 17b) open to break the stick circuit for relay coil S, which coil thereupon becomes de-energized. De-energization of S permits the opening of relay points S—I and S—3 and the re-closure of relay points S—2.

It may be explained that a double transfer of amounts from the LH accumulator to the MC accumulator is prevented in the following manner. Contacts 241 (Fig. 17d) are opened upon the reset of the RH accumulator at a time when cam contacts CC—5 close so that the 5—R magnet cannot become re-energized to permit a subsequent closure of contacts 5—R—I to 8. During the cycle in which amounts were transferred from the LH accumulator to the MC accumulator, relay coil F will have become re-energized upon closure of cam contacts CC—I. Energization of F causes closure of relay points F—2, but unlike the other embodiment the return circuit for the T magnets will not become again established until later when contacts S—2 close.

In the present embodiment the timing of reclosure of contacts S—2 is later than in the first described embodiment shown in Figs. 15a to 15f inclusive. Upon the eventual closure of S—2 and upon the closure of cam contacts CC—2 current will flow to the 2—T magnet and multiplication by the tens complement of the units order of the second discount will proceed.

In the computation under consideration the second discount is 09, the tens complement of 9 is 1 and multiplication will proceed by "1". This computation need not be traced in detail as it is substantially similar to that previously given for the multiplication of the first discount.

After multiplying by the units order of the second discount the machine proceeds with the computation on the tens order of the second discount. The multiplication in this instance being by 9, the discount being 09. During multiplication by 1 in the units order of the second discount the energization of CSu will have closed CSu—3 and since coil 2—T is energized at this time a circuit will be established from the 202 side of the line through 169, N—1, wire 212, through CSu—3 now closed, contacts 2—T—6, through 2—Yu, wire 213 and back to wire 202. The energization of 2—Yu will close its stick points 2—Yu—1 to keep 2—Yu energized and 2—Yu will shift 2—Yu—2, 2—Yu—3, 2—Yu—4, 2—Yu—5 to reverse position. With the 2—Yu—5 contacts closed there would tend to be an immediate unwanted and premature energization of 2—Yt through the associated brush of the MPRO readout which is standing upon a zero spot. Such energization if it occurred at this time would cause an undesired and too early shift and would cause certain operations to be performed prematurely. To prevent this undesired action the F—7 relay points are provided, such points are open during multiplication by any significant figure and prevent current flow to 2—Yt, through the zero spot and points 2—Yu—5.

During the multiplication by the amount in the units order of the second discount 2—Yu becomes energized under the control of CSu—3 and contacts 2—T—6. Energization of 2—Yu shifts the related transfer points 2—Yu—2, 2—Yu—3, 2—Yu—4 and 2—Yu—5 so that at the proper time in the cycle current will flow through from the 203 side of the line, through the various shifted Y transfer contacts and ultimately through the unshifted 2—Yt—2 contacts, through contacts 2—T—5 now closed, through CSt, through 2—T—3, back through the zero spot of the MPRO readout and out to the zero line of the 214a group and thence down through the contact 5—T—10 (now shifted by the energization of 5—T) and out via the line of the 214b group to the X—9 multiplying magnet. Multiplication now proceeds by 9 following which there is a transfer of LH to RH and the associated resetting operations, the transfer of the second computed net amount to the MC accumulator and the other succeeding resetting operations. After multiplication by nines in the tens order in the second discount has been started, relay 2—Yt becomes energized by the following circuit, from the D. C. line 201, through 169, N—1, wire 212, CSt—3, through 2—T—7 to relay coil 2—Yt, wire 213 and back to bus 202. The energization of 2—Yt will initiate the desired control of operations following the computing of the amount in the tens order of the second discount and ultimately the third discount operation will be initiated. When the third discount operation is initiated 3—T will be energized through the Y—3 group of shifted contacts. In the problem previously considered 12 was the third discount, but for purposes of explanation of certain column shifting action it will be assumed that the third discount was 10 instead of 12. With a discount of 10 the machine would eliminate any computing cycles upon the units order of this third or other discount. If zeros appear in the units order of the third discount at the time the cycle controller was initially set up at the beginning of the operation of the machine and before relay points F—5 open during the first multiplying operation, the coil 3—Yu would have become energized through its associated zero spot control. After such relay coil 3—Yu is energized it will be maintained energized by the stick points 3—Yu—1 in the usual manner and the energization of this coil will accordingly shift its transfer contacts 3—Yu—2 and 3—Yu—3. After multiplication by the second discount is completed the usual transfer of RH amounts to the LH accumulator occurs, the MC accumulator is reset, the second computed net amount is transferred back to the MC accumulator and the LH and RH accumulators are reset as was previously explained in connection with the explanation of the first discount operation. Certain of these operations ultimately bring about an energization of relay coil F upon closure of CC—1 and under the control contacts 4—R—18. With F energized and following its energization, coil S becomes de-energized in the manner previously explained so that upon closure of CC—2 magnet 3—T will become energized causing closure of contacts 3—T—1 to 9. The preceding computing operations will have successively energized all the lower numbered Y magnets, viz. 1—Yu, 1—Yt, 2—Yu and 2—Yt and will have shifted all of their associated contacts to reverse position. The energization of 3—Yu in the manner previously explained, upon initial set up of the cycle controller will have shifted 3—Yu—2, 3—Yu—3, 3—Yu—4 and 3—Yu—5 to reverse position. Accordingly, upon closure of cam contacts CC—3 current will flow through F—1, 1—Yu—2, 1—Yt—2, 2—Yu—2, 2—Yt—2, 3—Yu—2, through the unshifted 3—Yt—2 contacts, through the now closed 3—T—5 contacts, through the column shift magnet CSt, through 3—T—3, through the common segment, via the brush of the readout and out via the "1" line of the group of wires 214, through the 5—T—1 contacts which are in the position shown and out via the line of the 214b group which leads to the X—9 multiplier relay magnet.

The machine has now completed multiplication by the complement of the third discount and obtained the third computed net amount. The operation need not be traced for a fourth discount, since such operation is substantially similar to the preceding operations. When the last discount multiplication has been completed all of the Y magnets will have become energized and all of their related and controlled contacts will be in shifted position.

With all of the Y magnets energized, a circuit will be established from the 203 side of the A. C. line through relay points F—1 now closed, through the shifted Y—2 contacts and eventually through contacts 4—Yt—2 out via wire 234 to the 223MP reset magnet and thence through the 223MC magnet and through the 4—R magnet and back to ground through cam contacts CC—4. The energization of 223MP resets the MP entry receiving device in the usual way and there is also a resetting of the MC accumulator by the energization of reset magnet 223MC which is in series with 223MP. The energization of 4—R brings about the final RH to LH transfer.

As in the other embodiment it is desired that the machine obtain the total of discount deductions. This total of discount deductions is obtained by subtracting the final computed net amount from the originally entered gross amount. This is done in the same manner as with the other embodiment by transferring over the amount finally standing on the LH accumulator in inverted and complementary form to the DC accumulator, such DC accumulator in the earlier part of the operation of the machine having received the original gross amount. Such transfer is effected in the following manner. The reset of the MP entry receiving device causes contacts 170 (Fig. 17e) to become closed causing energization of relay coil 6—R with the following subsequent closure of multi-contact points 6—R—1 to 16. With these contacts closed and with the emitter 127 in action, impulses are emitted through the IVRO readout section of the LHRO readout and such impulses flow over and energize the accumulator magnets 208DC pertaining to the DC accumulator. Accordingly, the complement of the amount standing on the LH accumulator will be entered into the DC accumulator so that the ultimate setting of the DC accumulator will be one showing the total of the discount deductions.

During reset of the MP accumulator or entry receiving device in the manner previously explained, contacts 169 open to break the control of the cycle controller by the de-energization of relay coil N. Upon such action all the Y controlling magnets are deenergized.

After the complement of the amount on the LH accumulator has been entered into the DC accumulator it is desirable that the LH accumulator be not reset until the punching out operation of the final computed net amount has been completed. This is provided for in the following manner. Concurrently with the transfer of complementary amounts from the LH accumulator to the DC accumulator contacts 6—R—18 are open. With these contacts open at a time when the RH accumulator is being reset with the attendant closure of contacts 242, reset of the LH accumulator by the energization of the 223LH reset magnet would be suppressed. The LH accumulator is ultimately reset after punching back of the product amount by the closure of cam contacts PC—3 which contacts upon closure initiate the reset of the DC accumulator by concurrently energizing the 223DC reset magnet and the 223LH reset magnet, the energization of the latter magnet bringing about the desired reset of the LH accumulator.

According to the other embodiment shown in the present invention of the circuit diagram (Figs. 15a to 15f) provision was made for punching back on the record from which the original data was derived the final computed net amount and the total amount of discount deductions and it was further explained that if all of the discounts were zeroes the amounts which would be punched back for the total amount of discount deductions would be zero and the final net computed amount would be the original gross amount. In the first described embodiment it will be recalled that the original gross amount was first entered into the LH accumulator and if this gross amount was transferred over in complemental form into the DC accumulator which also contained the original gross amount, the effect would be to cancel the amount standing in the DC accumulator, giving an ultimate zero setting thereof which when read out to the record would show zeroes in the columns related to discount deductions. With the present embodiment there is no original entry of the gross amount into the LH accumulator and with all discounts zero, the ultimate setting of the LH accumulator would be zero and the ultimate setting of the DC accumulator would be that of the original gross amount. Accordingly, the effect of a transfer over from the LH accumulator to the DC accumulator would be to not effect the DC accumulator in any way and the result would be that upon the punching out of the product the field of the card alloted to the total of discount deductions would in place of showing zeroes for the deductions, would show the original gross amount. Furthermore the final computed net amount would likewise be zero because there would be no amount standing on the LH accumulator at the time preceding the punching operation. To correct such undesired transposition of the discount deductions and the final computed amount on the record card in the event that all of the discounts were zeroes, supplemental transposing relay contacts are provided in the second embodiment. The punching back of the amounts from the DC accumulator and the LH accumulator need not be described in detail as it is substantially the same as for the other embodiment. It is sufficient to state, however, that transposing three-blade contacts 7—T—1 to 16 and 8—T—1 to 16 (Fig. 17e) are provided respectively, intermediate the 224 cable and the 225 plug board and the DCRO readout and the 225 plug board (Fig. 17f) and that such contacts are arranged to be left in unshifted position when one or more of the discounts are not zeroes and that when all of the discounts are zeroes that such three-blade contacts are shifted to reverse position to transpose the readout of amounts to the record card so that the record card will show zeroes in the total of discount deduction field and show the original gross amount in the final computed amount field of the record. The shift of these contacts under all zero discount conditions is provided for in the following manner. Contacts 7—T—1 to 16 are controlled by a relay magnet 7—T and contacts 8—T—1 to 16 are controlled by a relay magnet 8—T. Such coils of such magnets are shown on Fig. 17f in parallel circuits and are adapted to be energized upon the closure of relay points 6—T—2. Upon energization the coils 7—T and 8—T are maintained energized through relay points 7—T—17 and through cam contacts PC—7. The initial energization of these coils under the control of contacts 6—T—2 is provided for in the following manner. If a card is passed into the machine with all the discount zeroes all of the Y—3 group of contacts viz. 1—Yu—3, 1—Yt—3, 2—Yu—3, 2—Yt—3, 3—Yu—3, 3—Yt—3, 4—Yu—3 and 4—Yt—3, will be shifted. With all these contacts shifted there will be an energization of relay coil 6—T which coil will be kept energized by stick contacts 6—T—1. The energization of 6—T will at the proper time cause the closure of contacts 6—T—2 (Fig. 17f) and this will initiate the energization of 7—T and 8—T to effect the desired transposition of entries to the record card under zero discount conditions.

The timing diagram (Figs. 18 and 18a) requires no detailed explanation except to state that there is a supplemental reset cycle introduced into the run of machine cycles to permit the reset of the LH accumulator after the amounts have been read out therefrom and introduced back to the multiplicand counter after each discounting operation. Furthermore when all of the discounts are zero the machine eliminates operating cycles after the second counter cycle on Fig. 18 and resumes operation at the beginning of the third cycle (Fig. 18a).

Heretofore in the specification and hereinafter in the claims, various forms of relay devices have been and will be referred to. Some of these relays are of purely electrical type such as the Y relays used in the controller. Other relays are of the electromagnetically tripped but mechanically controlled and restored multi-contact type. Such relays are those used for multiplier selection and column shift purposes and are of the type shown in Figs. 4 and 5 of the drawings.

Hereinafter in the claims the term "amount manifesting means" will be used to broadly refer to any means upon which an amount may be manifested in any way whatsoever. In the disclosed embodiment, such means are shown in the form of receiving means of the accumulator type, but such accumulator forms of receiving means are not essential for merely manifesting amounts where no other amounts have to be added thereto. Specifically the MP and MC devices need not be of such accumulating type, but may be of other forms. Furthermore, while zeroizing operations are utilized in removing a standing entry in order that another entry may be made or manfested therein, such specific zeroizing is not essential with manifesting means per se, but any equivalent clearing or like means may be used to automatically remove an original manifested amount so that another amount may be manifested. The term "receiving means" when used is not to be construed as limited to an accumulator, but is to be construed to apply broadly to an accumulator type of receiving means or other amount manifesting means.

What I claim is:

1. An accounting machine for taking discounts, including a multiplicand receiving device, a series of multiplier receiving devices, means for multiplying the multiplicand by the complement of the first of the multipliers, a product receiving device receiving the result of the foregoing multiplication, means for automatically resetting the multiplicand receiving device upon the completion of the problem corresponding to the multiplicand set up, means for entering the product just secured into the multiplicand receiving device, and means for thereafter initiating a new multiplication involving such product and the complement of another multiplier.

2. An accounting machine for taking discounts including multiplicand and multiplier entry receiving devices, said multiplier devices receiving a plurality of separate multiplier amounts, multiplying means and a product receiving device capable of successively receiving an intermediate product or products and a final product, means for automatically resetting the multiplicand entry device upon completion of the problem corresponding to the multiplicand set up, readout means associated with the products receiving device, and means cooperating with said readout device for transferring the intermediate product or products back to the multiplicand entry receiving device and means cooperating with the aforesaid readout device for deriving therefrom the final product and recording said product.

3. An accounting machine with a multiplier entry receiving device, a commutator and brush type of readout mechanism associated therewith and having elements for each order of the multiplier, readout lines extending to the segments of the commutator, and means for altering the circuit relations between the commutator and said readout lines according to whether tens complementary values or nines complementary values are to be read out.

4. A successive discount accounting machine with amount manifesting means for several discount percentages, an entry receiving means for multiplicand data, said multiplicand data comprising a gross amount for a first calculation, said entry receiving means being adapted to receive data from the result receiving means, means to clear the entry receiving means for multiplicand data before a new amount is received thereon, discount taking means including computing means which includes a result receiving means, said computing means being controlled by the receiving means for the multiplicand data and successively by the manifesting means for the several separate percentage amounts, and means for controlling the computing means whereby net discounted amounts are set up in the result receiving means and whereby computations of a net final amount equal to the gross amount less successive discount amounts which correspond to the discount percentages and which are successively based on the gross amount and one or more intermediate amounts is secured, means for transferring intermediate results from the result receiving means to the multiplicand receiving means after such multiplicand receiving means is cleared, and controlling means controlled from the discount percentage amount manifesting means for automatically eliminating idle machine cycles upon the presence of a zero in a discount percentage or in the discount percentages, and including supplemental means for automatically adjusting the number of discount taking cycles of the taking means of the machine according to the number of successive discounts to be taken.

5. A successive discount accounting machine with amount manifesting means for several discount percentages, an entry receiving means for multiplicand data, comprising a gross amount for a first calculation, said entry receiving means being adapted to receive data from the result receiving means, means to clear the multiplicand data receiving means before a new amount is received thereon, discount taking means including computing means which includes a result receiving means, said computing means being controlled by the multiplicand data receiving means and successively by the amount manifesting means for the separate percentage means, means for controlling the computing means whereby net discounted amounts are set up in the result receiving means, means for transferring intermediate results from the result receiving means to the multiplicand receiving means after such multiplicand receiving means is cleared, said discount taking means effecting computations of a net final amount equal to the gross amount less successive discount amounts which correspond to the discount percentages and which are successively based on the gross amount and one or more intermediate net amounts, and controlling means controlled by the discount percentage amount manifesting means for automatically adjusting both the number of discount taking cycles of the machine according to the number of discounts to be taken and for also automatically eliminating idle machine cycles upon the presence of a zero or zeros in a discount percentage or in the discount percentages.

6. A successive discount accounting machine with amount manifesting means for several discount percentages, an entry receiving means for a gross amount, said gross amount receiving means being also adapted to receive intermediate calculated means from a result receiving means, means to clear such gross and intermediate amount receiving means of an amount before a new amount is received thereon, means to transfer back intermediate calculated amounts to the receiving means therefor, calculating means under the control of said receiving means and successively under the control of the percentage amount manifesting means, said calculating means including a result receiving means, said calculating means being adapted for effecting computation of a net final amount equal to the gross amount less successive discount amounts which correspond to the discount percentages and which are successively based on the gross amount and one or more intermediate net amounts, and including a cycle controller for eliminating idle machine cycles upon the presence of a zero in a column of the discount percentage amount set up upon the discount percentage amount manifesting means and wherein the entry shift control which is provided to redirect the entry of a computed amount into the entry receiving device which previously contained the amount involved in the preceding discount taking computation is controlled from and interrelated with the cycle controller.

7. A successive discount accounting machine with amount manifesting means for several discount percentages, an entry receiving means for multiplicand data, comprising a gross amount for a first calculation, said entry receiving means being adapted to receive data from the result receiving means, means for clearing the multiplicand data receiving means before a new intermediate amount is received thereon, discount taking means including computing means which includes a result receiving means, said computing means being controlled by the receiving means for multiplicand data, and successively by the amount manifesting means for the separate percentage amounts, and means for controlling the computing means whereby net discount amounts are set up in the result receiving means and means for transferring intermediate results from the result receiving means to, the multiplicand data receiving means after such multiplicand data receiving means is cleared, said discount taking means being adapted for effecting computation of a net final amount equal to the gross amount less successive discount amounts which correspond to the discount percentages and which are successively based on the gross amount and one or more intermediate net amounts, and a cycle controller for controlling the number of computing cycles, control means controlled by the cycle controller for initiating the required changes in the machine operations pertaining to column shift, control of clearing of the gross and intermediate amount receiving means, and discount selection after the taking of one discount and before the beginning of the taking of a succeeding discount.

8. An accounting machine with entry receiving means for successively and individually receiving an original amount and intermediate net amounts, a plurality of entry receiving means for several discount percentages, means cooperating with said last mentioned means for converting the discount percentages to their complemental values, means for multiplying the original amount by the first of these complementary percentages as converted by the foregoing means to obtain an intermediate product net amount, means including an initiating control automatically brought into operation by control means upon completion of the foregoing last mentioned operation for causing the clearing of the original amount entry receiving means, means automatically brought into operation by control means after the last mentioned operation for setting up therein the intermediate product, means for thereafter causing the multiplying of such intermediate product by the next complementary percentage, and means controlling automatic repetition of the foregoing operations until all discount percentages are utilized whereupon the final net amount is secured.

9. A record controlled and record making accounting machine including a main operating mechanism, record controlled receiving means for data representing an amount and several discount percentages which are to be used in computations for deducting from the amount, said receiving means for the amount being adapted to receive data from the result receiving means, means for clearing such amount receiving means before a new amount is received thereon, discount taking means including computing means which includes a result receiving means, said computing means being controlled by the amount receiving means and successively by the discount percentage receiving means for the several separate percentage amounts, means for controlling the computing means whereby net discounted amounts are set up in the result receiving means and means for transferring intermediate results from the result receiving means after such amount receiving means is cleared and controls for the aforesaid discount taking means and computing means operated automatically by the main operating mechanism for taking in succession the successive required plurality of discounts whereby a net final amount is set up in the result receiving means and means controlled automatically by the main operating mechanism and controlled from the receiving means upon which the final net amount is received for recording back upon each record such net final amount.

10. An accounting machine including a receiving device, record controlled means controlling the entry of an original multiplicand amount therein, multiplier entry receiving means for several multiplier amounts, receiving means being provided for each amount, multiplying devices controlled by said receiving device and receiving means and means correlating the multiplying devices with the aforesaid device which receives the original multiplicand entry and the receiving means for the several multiplier amounts in succession for carrying out a succession of multiplications, said correlating means including means to cause the multiplicand device to be cleared after the amount therein has been used in a computation, and means to cause the result obtained by the computation to be entered into the device which previously received the original multiplicand entry for controlling a following computation with a different multiplier.

11. An accounting machine including amount manifesting means for a multiplicand amount (A), amount manifesting means for a multiplier factor (B) which is originally entered as a true number, readout means cooperating with said multiplier amount manifesting means for reading out amounts therefrom, means for converting such amounts into complementary amounts, multiplying means controlled by the amount manifesting means for the multiplicand amount and by the aforesaid readout and by the converting means which obtains complementary amounts whereby the result amount (A—AB) is obtained as a direct result of the multiplication.

12. An accounting machine, including amount manifesting means for a plurality of multiplier amounts, amount manifesting means for multiplicand data, said last named means being adapted to receive data from the product receiving means, means for clearing the amount manifesting means for multiplicand data before a new amount is manifested therein, multiplying means including a result receiving means, said multiplying means being controlled by the means manifesting factor data, readout means for the result receiving means, means controlled by said last mentioned means for deriving amounts from the result receiving means and for re-entering the same into the amount manifesting means for multiplicand data when the result is an intermediate result, after the aforesaid clearing means clears such amount manifesting means of previous data when required, recording means for a final result, and means cooperating with the aforesaid readout means for reading out a final product and for directing the same to the recording means for the final product.

13. A record controlled calculating machine including a plurality of record controlled amount manifesting means for an original amount and for several discount percentages, means to clear said original amount manifesting means of an amount after such amount is used in the calculation, said amount manifesting means after clearing being adapted to receive another amount from the result receiving means, such new amount being thereafter used in further calculating operations, discount taking means including computing means which includes a result receiving means, means operating automatically under the control of the record controlled manifesting means for the original amount and for the first discount percentage for causing the aforesaid discount taking means to take a first discount, means brought into operation automatically by control means after each discount is taken and after a new amount is set up upon the amount manifesting means therefor for initiating the taking of a succeeding discount by the aforesaid discount taking means under the control of the amount manifesting means and in accordance with the next discount percentage manifested therein.

14. A record controlled accounting machine with entry receiving means for an amount and entry receiving means for a plurality of separate discount percentages, means controlling the entry of an original amount and the discount percentages into the entry receiving means from a record, discount taking means including computing means which includes a result receiving means, means to clear the amount receiving means after each amount is used in a calculation, means to transfer to such receiving means from the result receiving means an intermediate calculated amount, the aforesaid computing means being controlled by said amount receiving means and successively by the receiving means for the separate discount percentages and control means cooperatively correlating together and controlling the entry receiving means, the computing means, the result receiving means, the reset means and the transfer means for automatically causing a succession of operations thereof which sets up finally in the result receiving means a final net amount representative of the original entered amount reduced by a first discount amount corresponding to one of the discount percentages to give a discounted amount, and by one or more further discount amounts respectively corresponding to the other discount percentages and each based upon the previously calculated related discounted amount.

15. An accounting machine for taking successive discounts including a main operating mechanism and including a calculating apparatus with receiving means for successive multiplicand amounts and for multiplier factor data consisting of a plurality of multiplier amounts, multiplying means controlled by said multiplicand amount receiving means and being complementarily connected to the multiplier receiving means and control means for said multiplying means, said receiving means, multiplying means and control means being operated by the main operating mechanism for effecting multiplication of multiplicand amounts upon the receiving means therefor by complements of multiplier amounts upon the receiving means therefor, and means automatically operated by the main operating mechanism for clearing the multiplicand receiving means of the amount thereon, means under the control of the control means for the multiplying means for initiating such clearing and means thereinafter effective and controlled by the operation of the main operating mechanism for causing the setting up upon the multiplicand receiving means of a first intermediate product as a new multiplicand for a succeeding computation.

16. A record controlled calculating machine which includes means for handling a series of records in succession automatically, means to derive readings of an original amount and several discount percentages from each record presented successively, means to manifest such readings, said manifesting means for the original amount being also adapted to receive a calculated amount, means for clearing it of one amount before another amount is manifested thereon, discount taking means including computing means which includes a result receiving means, said computing means being controlled by the foregoing amount manifesting means for an original and calculated amount and successively by each of the amount manifesting means for the several discount percentages, control means for controlling the computing means whereby net discounted amounts are set up in the result receiving means and whereby net discount calculations are effected with the data obtained from each record and set up as a net amount upon said result receiving means, said result receiving means having means controlled thereby to cause intermediate calculated amounts to be directed back to the amount manifesting means for the original amounts, means under the control of the result receiving means for the net amount to record the net amount upon each record, and means to thereafter initiate and effect a new record handling net discount calculating and recording cycle upon a succeeding record.

17. A record controlled calculating machine which includes means to handle a series of records in succession automatically, means to derive readings of an amount and several discount percentages from each record presented successively, entry receiving means for such readings, the amount entry receiving means being also adapted to receive intermediate calculated amounts, means to clear such last mentioned receiving means and means to cause intermediate results to be transferred thereto from the result receiving means upon the completion of each intermediate calculation, discount taking means including computing means which includes a result receiving means, said result receiving means being the receiving means for intermediate and final calculated amounts, said computing means being controlled by the receiving means for the amount data and successively by the receiving means for the separate percentage amounts, and means for controlling the computing means whereby net discounted amounts are successively set up in the result receiving means with a final net amount being finally set thereon, means under the control of the receiving means for the net final amount to record the net final amount upon each record, and means to thereafter initiate and effect a new record handling net discount calculating, taking and recording cycle upon a succeeding record.

18. A successive discount accounting machine with amount manifesting means for several discount percentages and entry receiving means for multiplicand data, said last mentioned means being adapted to receive data from the result receiving means, means for clearing the amount manifesting means for multiplicand data before a new intermediate amount is manifested thereon, discount taking means including computing means which includes a result receiving means, said computing means being controlled by the entry receiving means for the multiplicand data, and successively by the amount manifesting means for the separate percentage amounts, means for controlling the computing means whereby net discounted amounts are set up in the result receiving means, means for transferring intermediate results from the result receiving means to the multiplicand amount receiving means after such receiving means is cleared and controlling means controlled from the discount percentage amount manifesting means for automatically adjusting the number of discount taking cycles of the discount taking means of the machine according to the number of discounts to be taken.

19. In a machine for computing successive discounts, entry receiving means for a plurality of successive discounts, a cycle controller controlled thereby for eliminating idle cycles and control means controlled by said cycle controller for sectionalizing the control controlled by the entry receiving means for the successive discounts whereby the discount amounts as entered into the receiving means therefor will be automatically called into operation according to the number of discounts to be taken.

20. A successive discount accounting machine with discount percentage entry receiving means for a plurality of separate discounts, an entry receiving device for a gross amount, which device is also adapted to receive intermediate discounted amounts, means for clearing said receiving device, means including a result receiving means which receives an original gross amount and computing means controlled by the aforesaid receiving device and successively by the discount receiving means for effecting complemental multiplication for entry into the result receiving means whereby a net discounted amount is set up in the result receiving means, means to transfer the intermediate discounted amounts back to the receiving means therefor upon the completion of each intermediate discounting operation, and means to cause repeating of the foregoing computing clearing and transferring operation until the final result is obtained.

21. A successive discount accounting machine including entry receiving means for several separate discount percentages, an entry receiving means for multiplicand data, said multiplicand data comprising a gross amount for a first calculation, said entry receiving means being adapted to receive data from the result receiving means, means for clearing the multiplicand data receiving means before a new amount is received therein, discount taking means including computing means which includes a result receiving means, said computing means being controlled by the receiving means for multiplicand data and successively by the entry receiving means for the several separate percentage amounts, and means for controlling the computing means whereby net discounted amounts are set up in the result receiving means and means for transferring intermediate results from the result receiving means to the multiplicand data receiving means after such multiplicand data receiving means is cleared, said discount taking means and computing means being adapted for effecting computation of a net final amount equal to the gross amount less successive discount amounts which correspond to the discount percentages and which are successively based on the gross amounts and one or more intermediate net amounts, said final net amount being set up upon the result receiving means, an accumulator for the total amount of discount deductions which accumulator also receives the original gross amount, means for entering such gross amount therein and means for transferring the final net amount upon the result receiving means in complemental form to the accumulator for the total amount of discount deductions whereby the complement of the final net amount is algebraically added to the gross amount to obtain a total of discount deductions.

22. An accounting machine with a plurality of entry receiving means for several discount percentages, an entry receiving means for successively and individually receiving a gross amount and adapted to receive intermediate net amounts from the result receiving means, discount taking means including computing means which includes a result receiving means, said computing means being controlled upon its first operation by the aforesaid amount entry receiving means and by one of the discount percentage entry receiving means, means for controlling the computing means whereby net discount amounts are set up in the result receiving means, means brought into operation automatically upon the completion of one complete discount taking operation for clearing the amount receiving means, means under the control of the result receiving means for setting up in the amount receiving means after it is cleared, the computed discounted result as a new multiplicand, and means for thereafter automatically initiating a new discount taking operation with the computing means of the discount taking means under the control of the aforesaid net amount receiving means and under the control of another discount percentage entry receiving means.

23. A record controlled calculating machine including amount receiving means, means to clear it, and a plurality of discount percentage entry receiving means for separate accounts, discount taking means including computing means, which includes a result receiving means, means for controlling the computing means whereby a net discounted amount is set up upon the result receiving means, said computing means being controlled by the amount receiving means and by one of the discount percentage receiving means for one discount taking operation and by the amount receiving means and another discount percentage receiving means for a separate discount for another discount taking operation, means including control means for controlling the aforesaid computing means by the amount entry receiving means and successively by the discount percentage entry receiving means and for bringing the means for controlling the computing means into operation to cause a succession of discounts to be taken, said last mentioned means including means to cause the amount entry receiving means to be cleared by its clearing means and means to transfer to said amount entry receiving means an intermediate computed amount from said result receiving means, whereupon it, in cooperation with another discount percentage receiving means is adapted to control the computing means in accordance with the previously calculated amount set up in the result receiving means, the first discount being taken from the originally entered amount and the succeeding discount being taken from intermediate net computed results, whereby a net final amount is set up in the result receiving means.

24. A record controlled accounting machine, including means for reading an original gross amount and a plurality of separate discount percentages from a record, amount manifesting means for multiplicand data receiving an orginal gross amount under the control of the reading means therefor, amount manifesting means for the plurality of separate percentage amounts receiving such amounts under the control of the reading means therefor, the amount manifesting means for multiplicand data being adapted to receive data from the result receiving means, means for clearing the amount manifesting means for multiplicand data before a new intermediate amount is manifested thereon, discount taking means including computing means which includes result receiving means, said computing means being controlled by the amount manifesting means for the multiplicand data and successively by the amount manifesting means for the separate percentage amounts, and means for controlling the computing means whereby net discounted amounts are set up in the result receiving means and means for transferring intermediate results from the result receiving means to the multiplicand amount manifesting means after such manifesting means is cleared, the aforesaid discount taking computing means and control means being adapted for carrying out a plurality of discounting computations in succession and for finally setting up upon the result receiving means a final net amount representative of the original gross amount minus a plurality of computed discounts based upon the manifested plurality of discounted percentages.

25. An accounting machine including amount manifesting means for a plurality of separate percentage amounts, amount manifesting means for multiplicand data, said last mentioned means being adapted to receive data from the result receiving means, means for clearing the amount manifesting means for multiplicand data before a new intermediate amount is manifested thereon, discount taking means including computing means which includes a result receiving means, said computing means being controlled by the amount manifesting means for the multiplicand data and successively by the amount manifesting means for the separate percentage amounts, and means for controlling the computing means whereby net discounted amounts are set up in the result receiving means and means for transferring intermediate results from the result receiving means to the multiplicand amount manifesting means after such manifesting means is cleared.

26. A machine according to claim 25, wherein a supplemental receiving means is provided for an original gross entry and wherein means is provided to transfer thereto in complemental manner the final net discounted amount from the receiving means therefor whereby the total amount of discount deductions is set up thereon.

27. A machine according to claim 25, wherein a supplemental receiving means is provided for an original gross entry and wherein means is provided to transfer thereto in complemental manner the final net discounted amount from the receiving means therefor whereby the total of discount deductions is set up thereon and recording means controlled from said last mentioned means for recording the total amount of discount deductions.

28. An accounting machine with a receiving device for an original amount, said amount comprising multiplicand data and said device being also adapted to receive at least one calculated amount from a result receiving means as calculations proceed, receiving means for several separate multipliers which are entered therein as real numbers, discount taking means including computing means which includes a result receiving means, said computing means being controlled for all calculations by the receiving device for multiplicand data and successively by the receiving means for the several separate multiplier amounts as the calculations proceed, means for controlling the computing means to set up a first discount amount upon the result receiving means, means to clear the multiplicand data receiving device, means to transfer to such device the intermediate calculated first discounted amount upon the result receiving means, and means for causing the foregoing discount taking computing, controlling, clearing and transferring operations to be repeated until the calculation is complete.

29. An accounting machine for obtaining a net final amount from an original amount reduced by a first discounted amount corresponding to one of several discount percentages to give a discounted amount and by one or more further discount amounts respectively corresponding to other discount percentages and each based upon the previously calculated discounted amount, comprising a receiving device for an amount to be discounted, said receiving device being adapted to receive intermediate discounted net amounts, means to reset said device, receiving means for a plurality of separate discount percentages, discount taking means including computing means which includes a result receiving means, said computing means being controlled by the aforesaid device and successively by said percentage receiving means, means for controlling the computing means whereby net discounted amounts are set up in the result receiving means, means for controlling the computing means for causing successive discounts to be taken and successive discounted amounts to be successively set up upon the result receiving means including control means for causing the aforesaid successive operations, means for bringing into operation the reset means for the receiving device upon the completion of each computing operation, and means for transferring the intermediate discounted amounts from the result receiving means to said receiving device after it is reset upon each discount taking operation.

JAMES W. BRYCE.